United States Patent
Hanson et al.

(10) Patent No.: US 9,473,925 B2
(45) Date of Patent: Oct. 18, 2016

(54) METHOD AND APPARATUS FOR PROVIDING MOBILE AND OTHER INTERMITTENT CONNECTIVITY IN A COMPUTING ENVIRONMENT

(75) Inventors: Aaron D. Hanson, Seattle, WA (US); Emil A. Sturniolo, Medina, OH (US); Anatoly Menn, Seattle, WA (US); Erik D. Olson, Seattle, WA (US); Joseph T. Savarese, Edmonds, WA (US)

(73) Assignee: NetMotion Wireless, Inc., Seattle, WA (US)

( * ) Notice: Subject to any disclaimer, the term of this patent is extended or adjusted under 35 U.S.C. 154(b) by 1345 days.

(21) Appl. No.: 11/781,318

(22) Filed: Jul. 23, 2007

(65) Prior Publication Data

US 2007/0265000 A1    Nov. 15, 2007

Related U.S. Application Data

(60) Division of application No. 09/660,500, filed on Sep. 12, 2000, now Pat. No. 7,293,107, which is a continuation-in-part of application No. 09/330,310, filed on Jun. 11, 1999, now Pat. No. 6,546,425.

(60) Provisional application No. 60/103,598, filed on Oct. 9, 1998.

(51) Int. Cl.
*H04W 8/02* (2009.01)
*H04W 28/08* (2009.01)
(Continued)

(52) U.S. Cl.
CPC ............ *H04W 8/02* (2013.01); *H04L 67/14* (2013.01); *H04L 67/28* (2013.01); *H04L 67/2861* (2013.01);
(Continued)

(58) Field of Classification Search
CPC ... H04L 67/14; H04L 67/28; H04L 67/2861; H04W 28/08; H04W 36/0011; H04W 36/08; H04W 80/04; H04W 88/182; H04W 8/02
USPC .......................................... 709/245, 220, 238
See application file for complete search history.

(56) References Cited

U.S. PATENT DOCUMENTS

| 4,697,281 A | 9/1987 | O'Sullivan |
| 4,799,253 A | 1/1989 | Stern et al. |

(Continued)

FOREIGN PATENT DOCUMENTS

| CA | 2303987 | 3/1999 |
| EP | 0 998 094 A2 | 5/2000 |

(Continued)

OTHER PUBLICATIONS

Columbitech Wireless VPN(TM) Technical Description (Updated Oct. 22, 2007).

(Continued)

*Primary Examiner* — Khaled Kassim
(74) *Attorney, Agent, or Firm* — Nixon & Vanderhye P.C.

(57) ABSTRACT

A seamless solution transparently addresses the characteristics of nomadic systems, and enables existing network applications to run reliably in mobile environments. A Mobility Management Server coupled to the mobile network maintains the state of each of any number of Mobile End Systems and handles the complex session management required to maintain persistent connections to the network and to other peer processes. If a Mobile End System becomes unreachable, suspends, or changes network address (e.g., due to roaming from one network interconnect to another), the Mobility Management Server maintains the connection to the associated peer task—allowing the Mobile End System to maintain a continuous connection even though it may temporarily lose contact with its network medium. An interface-based listener uses network point of attachment information supplied by a network interface to determine roaming conditions and to efficiently reestablish connection upon roaming. The Mobility Management Server can distribute lists to Mobile End Systems specifying how to contact it over disjoint networks.

22 Claims, 38 Drawing Sheets

Disjoint network Roaming

(51) Int. Cl.
  *H04W 36/00* (2009.01)
  *H04W 36/08* (2009.01)
  *H04W 80/04* (2009.01)
  *H04W 88/18* (2009.01)
  *H04L 29/08* (2006.01)

(52) U.S. Cl.
  CPC .......... *H04W 28/08* (2013.01); *H04W 36/0011* (2013.01); *H04W 36/08* (2013.01); *H04W 80/04* (2013.01); *H04W 88/182* (2013.01)

(56) References Cited

U.S. PATENT DOCUMENTS

| | | |
|---|---|---|
| 4,833,701 A | 5/1989 | Comroe et al. |
| 4,837,800 A | 6/1989 | Freeburg et al. |
| 4,893,327 A | 1/1990 | Stern et al. |
| 4,912,756 A | 3/1990 | Hop |
| 4,969,184 A | 11/1990 | Gordon et al. |
| 4,972,457 A | 11/1990 | O'Sullivan |
| 4,989,230 A | 1/1991 | Gillig et al. |
| 5,042,082 A | 8/1991 | Dahlin |
| 5,109,528 A | 4/1992 | Uddenfeldt |
| 5,127,041 A | 6/1992 | O'Sullivan |
| 5,159,592 A | 10/1992 | Perkins |
| 5,166,931 A | 11/1992 | Riddle |
| 5,173,933 A | 12/1992 | Jabs et al. |
| 5,181,200 A | 1/1993 | Harrison |
| 5,212,684 A | 5/1993 | MacNamee et al. |
| 5,212,724 A | 5/1993 | Nazarenko et al. |
| 5,212,806 A | 5/1993 | Natarajan |
| 5,224,098 A | 6/1993 | Bird et al. |
| 5,249,218 A | 9/1993 | Sainton |
| 5,257,401 A | 10/1993 | Dahlin et al. |
| 5,260,988 A | 11/1993 | Schellinger et al. |
| 5,276,680 A | 1/1994 | Messenger |
| 5,291,544 A | 3/1994 | Hecker |
| 5,307,490 A | 4/1994 | Davidson et al. |
| 5,310,997 A | 5/1994 | Roach et al. |
| 5,325,361 A | 6/1994 | Lederer et al. |
| 5,325,362 A | 6/1994 | Aziz |
| 5,327,577 A | 7/1994 | Uddenfeldt |
| 5,349,678 A | 9/1994 | Morris et al. |
| 5,353,334 A | 10/1994 | O'Sullivan |
| 5,367,563 A | 11/1994 | Sainton |
| 5,379,448 A | 1/1995 | Ames et al. |
| 5,404,392 A | 4/1995 | Miller et al. |
| 5,410,543 A | 4/1995 | Seitz et al. |
| 5,412,375 A | 5/1995 | Wood |
| 5,412,654 A | 5/1995 | Perkins |
| 5,420,574 A | 5/1995 | Erickson et al. |
| 5,426,637 A | 6/1995 | Derby et al. |
| 5,434,863 A | 7/1995 | Onishi et al. |
| 5,442,633 A | 8/1995 | Perkins et al. |
| 5,442,791 A | 8/1995 | Wrabetz et al. |
| 5,446,736 A | 8/1995 | Gleeson et al. |
| 5,448,619 A | 9/1995 | Evans et al. |
| 5,452,471 A | 9/1995 | Leopold et al. |
| 5,457,680 A | 10/1995 | Kamm et al. |
| 5,475,819 A | 12/1995 | Miller et al. |
| 5,479,480 A | 12/1995 | Scott |
| 5,481,535 A | 1/1996 | Hershey |
| 5,488,649 A | 1/1996 | Schellinger |
| 5,490,139 A | 2/1996 | Baker et al. |
| 5,491,800 A | 2/1996 | Goldsmith et al. |
| 5,499,343 A | 3/1996 | Pettus |
| 5,502,726 A * | 3/1996 | Fischer .......... 370/392 |
| 5,504,746 A | 4/1996 | Meier |
| 5,504,935 A | 4/1996 | Vercauteren |
| 5,515,508 A | 5/1996 | Pettus et al. |
| 5,530,945 A | 6/1996 | Chavez, Jr. et al. |
| 5,530,963 A | 6/1996 | Moore et al. |
| 5,537,220 A | 7/1996 | Ezumi et al. |
| 5,548,723 A | 8/1996 | Pettus |
| 5,550,893 A | 8/1996 | Heidari |
| 5,555,553 A | 9/1996 | Jonsson |
| 5,559,800 A | 9/1996 | Mousseau et al. |
| 5,559,860 A | 9/1996 | Mizikovsky |
| 5,564,070 A | 10/1996 | Want et al. |
| 5,564,077 A | 10/1996 | Obayashi et al. |
| 5,566,225 A | 10/1996 | Haas |
| 5,566,236 A | 10/1996 | McLampy et al. |
| 5,568,645 A | 10/1996 | Morris et al. |
| 5,572,528 A | 11/1996 | Shuen |
| 5,574,774 A | 11/1996 | Ahlberg et al. |
| 5,594,731 A | 1/1997 | Reissner |
| 5,598,412 A | 1/1997 | Griffith et al. |
| 5,602,843 A | 2/1997 | Gray |
| 5,602,916 A | 2/1997 | Grube et al. |
| 5,610,595 A | 3/1997 | Garrabrant et al. |
| 5,610,905 A | 3/1997 | Murthy et al. |
| 5,610,974 A | 3/1997 | Lantto |
| H1641 H | 4/1997 | Sharman |
| 5,623,601 A | 4/1997 | Vu |
| 5,625,673 A | 4/1997 | Grewe et al. |
| 5,633,868 A | 5/1997 | Baldwin et al. |
| 5,633,873 A | 5/1997 | Kay et al. |
| 5,655,004 A * | 8/1997 | Holbrook .............. H04W 12/12 455/411 |
| 5,657,390 A | 8/1997 | Elgamal et al. |
| 5,659,596 A * | 8/1997 | Dunn .......... 455/456.1 |
| 5,664,007 A | 9/1997 | Samadi et al. |
| 5,666,653 A | 9/1997 | Ahl |
| 5,668,837 A | 9/1997 | Dent |
| 5,673,268 A | 9/1997 | Sharma et al. |
| 5,673,322 A | 9/1997 | Pepe et al. |
| 5,682,534 A | 10/1997 | Kapoor et al. |
| 5,697,055 A | 12/1997 | Gilhousen et al. |
| 5,710,986 A | 1/1998 | Obayashi et al. |
| 5,717,737 A | 2/1998 | Doviak et al. |
| 5,721,818 A | 2/1998 | Hanif et al. |
| 5,724,346 A | 3/1998 | Kobayashi et al. |
| 5,726,984 A | 3/1998 | Kubler et al. |
| 5,732,074 A | 3/1998 | Spaur et al. |
| 5,732,076 A | 3/1998 | Ketseoglou et al. |
| 5,732,359 A | 3/1998 | Baranowsky, II et al. |
| 5,745,850 A | 4/1998 | Aldermeshian et al. |
| 5,748,897 A | 5/1998 | Katiyar |
| 5,752,185 A | 5/1998 | Ahuja |
| 5,754,774 A | 5/1998 | Bittinger et al. |
| 5,754,961 A | 5/1998 | Serizawa et al. |
| 5,758,186 A | 5/1998 | Hamilton et al. |
| 5,761,623 A | 6/1998 | Lupien et al. |
| 5,768,525 A | 6/1998 | Kralowetz et al. |
| 5,771,459 A | 6/1998 | Demery et al. |
| 5,784,643 A | 7/1998 | Shields |
| 5,790,554 A | 8/1998 | Pitcher et al. |
| 5,793,843 A | 8/1998 | Morris |
| 5,796,727 A | 8/1998 | Harrison et al. |
| 5,802,483 A | 9/1998 | Morris |
| 5,812,819 A | 9/1998 | Rodwin et al. |
| 5,825,775 A | 10/1998 | Chin et al. |
| 5,826,188 A | 10/1998 | Tayloe et al. |
| 5,828,659 A | 10/1998 | Teder et al. |
| 5,832,381 A * | 11/1998 | Kauppi ................ H04W 60/04 455/432.1 |
| 5,835,725 A | 11/1998 | Chiang et al. |
| 5,839,075 A | 11/1998 | Haartsen et al. |
| 5,848,064 A | 12/1998 | Cowan |
| 5,856,974 A | 1/1999 | Gervais et al. |
| RE36,078 E | 2/1999 | Uddenfeldt et al. |
| 5,870,673 A | 2/1999 | Haartsen |
| 5,875,400 A * | 2/1999 | Madhavapeddy .... H04W 68/04 455/435.2 |
| 5,878,344 A | 3/1999 | Zicker |
| 5,889,816 A | 3/1999 | Agrawal et al. |
| 5,890,054 A | 3/1999 | Logsdon et al. |
| 5,901,352 A | 5/1999 | St-Pierre et al. |
| 5,909,431 A | 6/1999 | Kuthyar et al. |
| 5,910,951 A | 6/1999 | Pearce et al. |
| 5,915,214 A | 6/1999 | Reece et al. |
| 5,918,016 A | 6/1999 | Brewer et al. |
| 5,935,212 A | 8/1999 | Kalajan et al. |
| 5,941,956 A | 8/1999 | Shirakihara et al. |
| 5,943,333 A | 8/1999 | Whinnett et al. |

(56) References Cited

U.S. PATENT DOCUMENTS

| | | | |
|---|---|---|---|
| 5,956,640 A | 9/1999 | Eaton et al. | |
| 5,968,176 A | 10/1999 | Nessett et al. | |
| 5,978,679 A | 11/1999 | Agre | |
| 5,987,011 A | 11/1999 | Toh | |
| 5,987,611 A | 11/1999 | Freund | |
| 6,006,090 A | 12/1999 | Coleman et al. | |
| 6,032,042 A | 2/2000 | Kauppi | |
| 6,038,230 A | 3/2000 | Ofek | |
| 6,041,166 A | 3/2000 | Hart et al. | |
| 6,052,725 A | 4/2000 | McCann et al. | |
| 6,061,650 A * | 5/2000 | Malkin | H04L 63/083 370/401 |
| 6,078,575 A | 6/2000 | Dommety et al. | |
| 6,081,711 A * | 6/2000 | Geulen | H04W 88/02 455/432.1 |
| 6,081,715 A | 6/2000 | LaPorta et al. | |
| 6,091,951 A | 7/2000 | Sturniolo et al. | |
| 6,112,085 A | 8/2000 | Garner et al. | |
| 6,122,514 A | 9/2000 | Spaur et al. | |
| 6,131,121 A | 10/2000 | Mattaway et al. | |
| 6,147,986 A | 11/2000 | Orsic | |
| 6,148,197 A * | 11/2000 | Bridges et al. | 455/432.3 |
| 6,154,461 A | 11/2000 | Sturniolo et al. | |
| 6,161,123 A | 12/2000 | Renouard et al. | |
| 6,167,513 A | 12/2000 | Inoue et al. | |
| 6,170,057 B1 | 1/2001 | Inoue et al. | |
| 6,185,184 B1 | 2/2001 | Mattaway et al. | |
| 6,195,705 B1 | 2/2001 | Leung | |
| 6,198,920 B1 | 3/2001 | Doviak et al. | |
| 6,201,962 B1 | 3/2001 | Sturniolo et al. | |
| 6,201,967 B1 * | 3/2001 | Goerke | H04B 7/18545 455/12.1 |
| 6,212,563 B1 | 4/2001 | Beser | |
| 6,230,004 B1 | 5/2001 | Hall et al. | |
| 6,233,616 B1 | 5/2001 | Reid | |
| 6,233,617 B1 | 5/2001 | Rothwein et al. | |
| 6,233,619 B1 | 5/2001 | Narisi et al. | |
| 6,236,652 B1 | 5/2001 | Preston et al. | |
| 6,240,514 B1 | 5/2001 | Inoue et al. | |
| 6,243,749 B1 | 6/2001 | Sitaraman et al. | |
| 6,243,753 B1 | 6/2001 | Machn et al. | |
| 6,249,818 B1 | 6/2001 | Sharma | |
| 6,252,884 B1 | 6/2001 | Hunter | |
| 6,256,300 B1 | 7/2001 | Ahmed et al. | |
| 6,256,739 B1 | 7/2001 | Skopp et al. | |
| 6,259,405 B1 | 7/2001 | Stewart et al. | |
| 6,263,213 B1 | 7/2001 | Kovacs | |
| 6,263,214 B1 * | 7/2001 | Yazaki | H04W 8/183 455/410 |
| 6,278,881 B1 * | 8/2001 | Balck | 455/444 |
| 6,286,052 B1 | 9/2001 | McCloghrie et al. | |
| 6,308,273 B1 | 10/2001 | Goertzel et al. | |
| 6,308,281 B1 | 10/2001 | Hall, Jr. et al. | |
| 6,327,470 B1 * | 12/2001 | Ostling | 455/437 |
| 6,336,135 B1 | 1/2002 | Niblett et al. | |
| 6,400,722 B1 | 6/2002 | Chuah et al. | |
| 6,412,025 B1 | 6/2002 | Cheston et al. | |
| 6,415,329 B1 | 7/2002 | Gelman et al. | |
| 6,418,324 B1 | 7/2002 | Doviak et al. | |
| 6,438,594 B1 | 8/2002 | Bowman-Amuah | |
| 6,446,200 B1 | 9/2002 | Ball et al. | |
| 6,449,259 B1 | 9/2002 | Allain et al. | |
| 6,477,543 B1 | 11/2002 | Huang et al. | |
| 6,484,261 B1 | 11/2002 | Wiegel | |
| 6,501,767 B1 | 12/2002 | Inoue et al. | |
| 6,510,153 B1 | 1/2003 | Inoue et al. | |
| 6,546,425 B1 | 4/2003 | Hanson et al. | |
| 6,597,671 B1 | 7/2003 | Ahmadi et al. | |
| 6,611,864 B2 | 8/2003 | Putzolu et al. | |
| 6,614,774 B1 | 9/2003 | Wang | |
| 6,615,267 B1 | 9/2003 | Whalen et al. | |
| 6,621,793 B2 | 9/2003 | Widegaren et al. | |
| 6,636,502 B1 | 10/2003 | Lager et al. | |
| 6,661,780 B2 | 12/2003 | Li | |
| 6,694,366 B1 | 2/2004 | Gernert et al. | |
| 6,714,515 B1 | 3/2004 | Marchand | |
| 6,714,987 B1 | 3/2004 | Amin et al. | |
| 6,732,177 B1 | 5/2004 | Roy | |
| 6,757,734 B1 | 6/2004 | Resenius et al. | |
| 6,769,000 B1 | 7/2004 | Akhtar et al. | |
| 6,778,836 B2 * | 8/2004 | Kawakami | H04W 8/02 455/404.2 |
| 6,798,757 B2 | 9/2004 | Mizutari | |
| 6,804,720 B1 | 10/2004 | Vilander et al. | |
| 6,839,755 B1 | 1/2005 | Kumpf et al. | |
| 6,854,014 B1 | 2/2005 | Amin et al. | |
| 6,856,676 B1 | 2/2005 | Pirot et al. | |
| 6,970,434 B1 | 11/2005 | Mahany et al. | |
| 7,065,047 B2 | 6/2006 | Boxall et al. | |
| 7,502,339 B1 * | 3/2009 | Pirkola | H04L 12/66 370/310 |
| 2001/0009025 A1 | 7/2001 | Ahonen | |
| 2001/0042201 A1 | 11/2001 | Yamaguchi et al. | |
| 2001/0047474 A1 | 11/2001 | Takagi et al. | |
| 2001/0052081 A1 | 12/2001 | McKibben et al. | |
| 2002/0066036 A1 | 5/2002 | Makineni et al. | |
| 2002/0069278 A1 | 6/2002 | Forsi | |
| 2002/0075812 A1 | 6/2002 | Corwin | |
| 2002/0091855 A1 | 7/2002 | Yemini et al. | |
| 2002/0093956 A1 | 7/2002 | Gurin | |
| 2002/0098840 A1 | 7/2002 | Hanson et al. | |
| 2002/0122394 A1 | 9/2002 | Whitmore et al. | |
| 2002/0147843 A1 | 10/2002 | Rao | |
| 2002/0167922 A1 | 11/2002 | Inoue et al. | |
| 2002/0168969 A1 * | 11/2002 | Koskinen et al. | 455/424 |
| 2002/0176383 A1 | 11/2002 | Inoue et al. | |
| 2003/0017845 A1 | 1/2003 | Doviak et al. | |
| 2003/0028612 A1 | 2/2003 | Lin et al. | |
| 2003/0061384 A1 | 3/2003 | Nakatani | |
| 2003/0120811 A1 | 6/2003 | Hanson et al. | |
| 2003/0163567 A1 | 8/2003 | McMorris et al. | |
| 2003/0191848 A1 | 10/2003 | Hesselink et al. | |
| 2003/0223439 A1 | 12/2003 | O'Neill | |
| 2003/0228874 A1 | 12/2003 | Mallette | |
| 2004/0202128 A1 | 10/2004 | Hovmark et al. | |
| 2012/0289258 A1 * | 11/2012 | Hofstaedter | G06F 15/173 455/456.5 |

FOREIGN PATENT DOCUMENTS

| | | |
|---|---|---|
| EP | 1089495 | 4/2001 |
| EP | 1150521 | 10/2001 |
| JP | 63224422 | 9/1988 |
| JP | 3-32125 | 2/1991 |
| WO | WO 00/33189 | 6/2000 |
| WO | WO 01/28185 | 4/2001 |
| WO | WO 01/31472 | 5/2001 |
| WO | WO 02/19636 | 3/2002 |
| WO | WO 02/23362 | 3/2002 |
| WO | WO 03/061188 | 7/2003 |

OTHER PUBLICATIONS

"Actualité/En bref," Le Journal du Net, Mar. 28, 2000.

"Cast Your Vote for 'Wireless Survivor'," Wireless Week, Sep. 11, 2000.

"Computerworld's Emerging Companies to Watch in 2002," Computerworld, Nov. 26, 2001.

"Draadloos het netwerk op," VNUnet.nl, May 25, 2000.

"First Things First: Top 10 Things to Know About Wireless," Network Computing, Jul. 10, 2000.

"Microvision Teams With WRQ to Pursue Opportunities for Mobile Computing in Wireless LAN and WAN Markets," PR Newswire (Company News on Call), Jun. 1, 2000.

"NetMotion Increases Features," CE city (now dba Pocket PC city), Dec. 12, 2000.

"NetMotion lands $8 million in spinoff," PSBJ Online (Puget Sound Business Journal), Apr. 3, 2001.

"NetMotion Mobility 3.0 Beta Extends Continuous Wireless Connections to Windows 2000," Wireless Developer Network-Daily News, Jul. 10, 2001.

(56) References Cited

OTHER PUBLICATIONS

"NetMotion, a WRQ spinoff, closes a round of funding," Seattle Times, Business Digest, Apr. 3, 2001.
"NetMotion: Curing the Wireless LAN at St. Luke's Episcopal Hospital," NetMotion Wireless, Inc., Feb. 26, 2001.
"Networld+Interop 2000 Las Vegas," [German] LANline, Jul. 2000.
"New Products," Wireless Week (Wireless Review via NewsEdge Corporation), Feb. 5, 2001.
"Past is prologue; expand data access," Government Computer News, telephone interview with Doug Walker by GCN chief technology editor Susan M. Menke (www.gcn.com), Aug. 20, 2001.
"PEAR Wireless, NetMotion Collaborate to Offer Secure, High Performance WLAN," TMCnet.com, Nov. 13, 2001.
"Top Wireless Specialists Offer NetMotion Wireless Solution," PR Newswire (Today's News), Apr. 18, 2001.
"WRQ Creates NetMotion Wireless," eAI Journal, Apr. 10, 2001.
"WRQ Creates NetMotion Wireless," The Unstrung Stringer (www.unstrung.com), Apr. 4, 2001http://www.unstrung/.
"WRQ Spins off its Mobile Access Business Unit," Mobileinfo.com, News section, Issue #2001—16, Apr. 2001 (Updated Apr. 18, 2001).
"WRQ Takes Wraps of NetMotion Connectivity Manager," Xephon, Mar. 24, 2000.
"WRQ's mobile access unit now NetMotion," Seattle P-I, Tech Digest, Business section, Apr. 3, 2001.
"3G TS 23.171, V3.1.0, 3$^{rd}$ Generation Partnership Project; Technical Specification Group Services and System Aspects; Functional stage 2 description of location services in UMTS (Release 1999)," pp. 1-48, XP002269105 (Jul. 2000).
3GPP SA: "Technical Specification Group Services and Systems Aspects: Architecture for an 1 IP Network, 3GPP TR 23.922", 3GPP Standard, Oct. 1, 1999, XP002144276.
3GPP: "TR23 923 V3.0.0: Combined GSM and Mobility Handling in UMTS IP CN", May 2000, pp. 1-75 XP002282368.
"Breaking News," Wireless Week (Apr. 23, 2001).
"Dealflow," Red Herring Communications, Apr. 5, 2001.
"Debugging Applications", John Robbins, Microsoft Press (2000).
ETSI: "3G TS 23.107 Universal Mobile Telecommunications System (UMTS) QoS Concept and Architecture", ETSI TS 123 107 V.3.3.0, Jun. 2000, pp. 1-36, XP002201573.
"ETSI TS 123 060, V3.3.0, Digital cellular telecommunications system (Phase 2+)(GSM); Universal Mobile Telecommunications System (UMTS); General Packet Radio Service (GPRS); Service description; Stage 2 (3G TS 23.060 version 3.3.0 Release 1999)," pp. 1-186 (Apr. 2000).
"Going Mobile: Are Apps to Go the Way to Go?" Application Planet (Feb. 1, 2001).
"How WRQ's TCP Connection Reduces Costs and Improves Reliability in Mobile/Wireless Computing" (WRQ Jan. 1995).
"Mowgli, Mobile Office Workstations using GSM Links," University of Helsinki Dept. of Computer Science, Helsinki, Finland (Feb. 2000).
"NetMotion Keeps Wireless Connections Going, No Matter What," The Jerusalem Post, Internet Edition (Apr. 2, 2000).
"NetMotion Puts Mobility 3.0 into Open Beta," Midrange Computing (Jul. 11, 2001).
"NetMotion Wireless Makes $8 Million," Deal Watch Daily, Apr. 3, 2001.
"Questions and Answers for TCP/IP for CDPD Wireless Communications" (WRQ Nov. 1994).
"TCP Connection stacks up as #1 in InfoWorld Comparison." WRQ Quarterly No. 30 Quarter 4 (1994).
Top Wireless Specialists Offer NetMotion Wireless Solution, Wireless Week, Apr. 4, 2001.
"WRQ NetMotion—A Solution for IT Wanderlust," Mobile Insights (Sep. 2, 2000).
"WRQ Spins Off Mobile Business as NetMotion Wireless," Midrange Computing Apr. 3, 2001.
"WRQ's NetMotion raises $8M," MSNBC.com, Apr. 3, 2001.

"WRQ's Reflection Network Series Supports New Wireless Mobile Computing: McCaw Dubs WRQ's TCP Well-Suited fbr Cellular," McCaw chooses WRQ's TCP Connection: calls Reflection "well-suited for cellular" (WRQ Oct. 11, 1994 Press Release).
Ala-Laurila, Juha, et al., "*Implementation of the wireless ATM access terminal*," Computer Networks 31, pp. 959-973 (1999).
Alanko T., Kojo M., Liljeberg M., Raatikainen K.: Mowgli: Improvements for Internet Applications Using Slow Wireless Links. Proc. 8th IEEE International Symposium on Personal, Indoor and Mobile Radio Communications, Helsinki, Finland, Sep. 1997.
Alanko, T., et al., "Mobile computing based on GSM: The Mowgli approach," IFIP '96 World Conference—Mobile Communications, Canberra, Australia (Sep. 2-6, 1996).
Alanko, T., Kojo, M., Laamanen, H., Liljeberg, M., Moilanen, M., Raatikainen, K: Measured Performance of Data Transmission Over Cellular Telephone Networks. Computer Communications Review, 24(1994)5. Published also as Technical Report: University of Helsinki, Department of Computer Science, Series of Publications C, No. C-1994-53.
Almquist, P. RFC 1716 "Towards Requirements for IP Routers" (IETF Nov. 1994).
Almquist, P., "Ruminations on Next-Hop" (Mar. 25, 1993).
Anderson, T.E., et al., "Serverless Network File Systems," ACM Transactions on Computer Systems, vol. 14, No. 1, pp. 41-79 (Feb. 1996).
ANSI/IEEE Std. 802.11, 1999 Edition, Part 11: Wireless LAN Medium Access Control (MAC)and Physical Layer (PHY) Specifications (1999).
Atkinson, "IP Authentication Header," Networking Working Group RFC 1826 (Aug. 1995).
Atkinson, "IP Encapsulating Security Payload (ESP)," Networking Working Group RFC 1827 (Aug. 1995).
Atkinson, "Security Architecture for the Internet Protocol," Networking Working Group RFC 1825 (Aug. 1995).
B. Tuch, Development of WaveLAN, an ISM band wireless LAN, Lucent Technical Journal, 27-37 (Jul./Aug. 1993).
Badrinath, B.R., et al., "Handling Mobile Clients: A Case for Indirect Inteaction," Department of Computer Science, Rutgers University, 7 pages (Oct. 1993).
Baker, F. RFC 1812 "Requirements for IP Version 4 Routers" (IETF Jun. 1995).
Bakre, A.; Badrinath, B.R., "I-TCP: Indirect TCP for Mobile Hosts," Department of Computer Science, Rutgers University, Piscataway,NJ 08855, DCS-TR-314, Oct. 1994.
Bakre, Ajay et al., "M-RPC: A Remote Procedure Call Service for Mobile Clients," ACM Presents MobiCom '95, Proceedings of the First Annual International Conference on Mobile Computing and Networking, pp. 97-110 (Nov. 13-15, 1995).
Balakrishnan, Hari, et al., XP-000734405, "A Comparison of Mechanisms for Improving TCP Performance over Wireless Links," IEEE/ACM Transactions on Networking, vol. 5, No. 5,(Aug. 1996).
Benesh, Peter, "Hospital Cuts Errors With Wireless Data," Investor's Business Daily, Aug. 22, 2001.
Berners-Lee et al., "Hypertext Transfer Protocol-HTTP/1.0": May 1996; http://www.cis.ohio-state.edu/htbin/rfc/rfc1945.html.
Bordan, Jonathan, Power Point Presentation "Wireiess WAN Extensions to NDIS Mobitex NDIS driver" (Ericsson Communications Canada Connectivity Lab (Jul. 17, 1996).
Braden, R., RFC 1009 "Requirements for Internet Gateways" (IETF Jun. 1987).
Braden, R., RFC 1123, "Requirements for Internet Hosts—Application and Support" (Oct. 1989).
Brodsky, Ira, "PDAs will usher in the next net revolution," Special Focus, Wireless Networks, Network World (Nov. 7, 1994).
Brown, Kevin, et al., "M-TCP: TCP for Mobile Cellular Networks," Department of Computer Science, University of South Carolina, 25 pages (Jul. 29, 1997).
Brown, Kevin, et al., "M-UDP: UDP for Mobile Cellular Networks," Department of Computer Science, University of South Carolina, 19 pages (Sep. 4, 1996).
C. Perkins and J. Tangirala, "DHCP for Mobile Networking with TCP/IP," Proc. IEEE Int'l Symp. Systems and Comm., Jun. 1995, pp. 255-261.

(56) References Cited

OTHER PUBLICATIONS

Cáceres, R., et al., "Improving the Performance of Reliable Transport Protocols in Mobile Computing Environments".
Caporuscio, Maurio, et al., "Design and Evaluation of a Support Service for Mobile, Wireless Publish/Subscribe Applications," *IEEE Transactions on Software Engineering*, vol. 29, No. 12, pp. 1059-1071 (Dec. 2003).
Castineyra, I., RFC 1992, "The Nimrod Routing Architecture" (IETF Aug. 1996).
Cerf, V., RFC 829, "Packet Satellite Technology Reference Sources" (Nov. 1982).
Chan, Sharon Pian, and Tricia Duryee, "Computers: Protection sought against disruption from hackers," Seattle Times, Sep. 30, 2001.
Datability Software Systems Inc., New York, NY "Proposal Presented to Digital Equipment Corporation Large System Group, Marlboro, Massachusetts" (Jul. 7, 1983).
Datability Software Systems Inc., New York, NY, CONTROL-PC, Information Management System, System Builder Manual, Draft Version (Apr. 1986).
Datability Software Systems Inc., New York, NY, "Remote Access Facility, User's Guide" (copyright 1985, 1986, 1987, 1988).
Dragan, Richard V. "Getting Real With Wireless," PC Magazine, Aug. 1, 2001.
Droms, R. Network Working Group, Request for Comments memo, "Dynamic Host Configuration Protocol," Bucknell University, 39 pages (Oct. 1993).
DTMF—Common Information Model (CIM), http://www.dmtf.org/standards/clm/.
Durham, D., et al., Networking Group Request for Comments 2748, The COPS (Common Open Policy Service) Protocol.
Dynamic Host Configuration Protocol, RFC 2131 (IETF Mar. 1997), http://people.nokia.net/charliep/.
Elachi, Joanna, "WRQ Ships NetMotion 2.0," CommWeb, Dec. 12, 2000.
Elad, Barry, "The Money is Back in Motion," Seattle.Internet.com.
Franklin, Curtis, "Wireless Works: NetMotion makes the difference in wireless networks," Internet Week, May 7, 2001.
Gibbs, Mark, "Non-stop wireless," Network World Web Applications Newsletter, Jun. 20, 2001.
Glascock, Stuart, "Intel Debuts NetStructure Appliances at N+I," CMPnet, the Technology Network, Sep. 26, 2000.
Glascock, Stuart, "Vendors Get Early Start on Showcasing Wares," TechWeb News, May 9, 2000.
Harkins, et al., "The Internet Key Exchange (IKE)", Networking Working Group RFC 2409 (Nov. 1998).
Harris, Siän, "Standards debate entangles wireless local-area networks," Wireless Web, Jan. 2001.
Housley, et al., "Internet X.509 Public Key Infrastructure Certificate and CRL Profile," Networking Working Group RFC 2459 (Jan. 1999).
IBM, Leading the Way for wireless data communication, ARTour, Research Triangle Park, NC 4 pages (Sep. 1995).
Information Sciences Institute, "Transmission Control Protocol-DARPA Internet Program Protocol Specification," Sep. 1981; http://www.csl.sony.co.jp/cgi-bin/hyperrfc?rfc793.txt.
Inouye, Jon et al., "Dynamic Network Reconfiguration Support for Mobile Computers," MOBICOM 97 Budapest Hungary, pp. 13-22 (1997).
Internet Draft Piscitello, D., Phifer, L. Core Competence, Wang, Y., Hovey, R. Bellcore: "Mobile Network Computing Protocol (MNCP)," Sep. 3, 1997.
Internet Mobility 4x4, Cheshire, S. & Baker, M., SIGCOMM '96, Computer Science Dept., Stanford Univ., AC<ISBN: 0-201-37928-7, p. 1-12.
IP Mobility Support (RFC 2002, IETF Oct. 1996).
Jacobson, V. et al., Networking Working Group Request for Comments: 1072, "TCP extensions for long-delay paths" (Oct. 1988).
Jacobson, V., et al., "Congestion Avoidance and Control" (Nov. 1988).
Jacobson, V., Networking Working Group Request for Comments: 1144, "Compressing TCP/IP headers for low-speed serial links" (Feb. 1990).
Jaeger, Trent, et al., "A Role-based Access Control Model for Protection Domain Derivation and Management," RBAC97 Fairfax Va USA (1997).
Johnson, Amy Helen, "Persistence Pays Off for Wireless Vendor," Computerworld, Jul. 2, 2001.
Johnson, D.B., "Mobility Support in IPv6," Internet Draft, IETF Mobile IP Working Group, XP-002951077 (Jul. 2, 2000).
Julien, Shelly, "Bringing Down the Barriers to Wireless Computing," Wireless Design Online: News and Analysis, Jul. 24, 2000.
Julien, Shelly, "Smooth Wireless Glitches," ComNews.com, Oct. 2000.
Katz, "Transmission of IP and ARP over FDDI Networks" (Internet Draft Sep. 14, 1992).
Katz, D., Network Working Group Internet Draft, "Transmission of IP and ARP over FDDI Networks," (Sep. 14, 1992).
Katz, R.H., et al., The Bay Area Research Wireless Access Network (BARWAN).
Kei, Lee Man, et al., "An Efficient RPC Scheme in Mobile CORBA Environment," IEEE (2000).
Kiiskinen J., Kojo, M., Liljeberg, M., Raatikainen, K: Data Channel Service for Wireless Telephone Links. University of Helsinki, Department of Computer Science, Series of Publications C, No. C-1996-1. Jan. 1996. Published also in Proceedings of the 2nd International Mobile Computing Conference, Hsinchu, Taiwan, ROC, Mar. 25-27, 1996.
Kleinrock, Leonard, Nomadix, Inc., "On Some Principles of Nomadic Computing and Multi-Access Communications," *IEEE Communications Magazine*, pp. 46-50 (Jul. 2000).
Kobielus, James, "Prospects are golden for Wireless Data Services," Special Focus, Wireless Networks, Network World (Nov. 7, 1994).
Kojo M., Raatikainen K., Liljeberg M., Kiiskinen J., Alanko T.: An Efficient Transport Service for Slow Wireless Telephone Links. IEEE Journal on Selected Areas in Communications, vol. 15, No. 7, Sep. 1997.
Kojo, M., Alanko, T., Liljeberg, M., Raatikainen, K: Enhanced Communication Services for Mobile TCP/IP Networking. University of Helsinki, Department of Computer Science, Series of Publications C, No. C-1995-15. Apr. 1995.
Kojo, M., Raatikainen, K., Alanko, T: Connecting Mobile Workstations to the Internet over a Digital Cellular Telephone Network. University of Helsinki, Department of Computer Science, Series of Publications C, No. C-1994-39. Sep. 1994. Published also in Proceedings of the Mobidata Workshop, Rutgers University, NJ, Nov. 1994.
Laamanen, H: An Experiment of Dependability and Performance of GSM Access to Fixed Data Network. University of Helsinki, Department of Computer Science, Series of Publications C, No. C-1995-41. Sep. 1995.
Liljeberg, M., Alanko, T., Kojo, M., Laamanen, H., Raatikainen, K: Optimizing World-Wide Web for Weakly Connected Mobile Workstations: An Indirect Approach. In Proc. 2nd International Workshop on Services in Distributed and Networked Environments (SDNE'95) Jun. 5-6, 1995, Whistler, Canada.
Liljeberg, M., Helin, H., Kojo, M., Raatikainen, K: Enhanced Service for World-Wide Web in Mobile WAN Environment. University of Helsinki, Department of Computer Science, Series of Publications C, No. C-1996-28. Apr. 1996. (Revised version published in Proceedings of the IEEE Global Internet 1996 Conference, London, England, Nov. 20-21, 1996.).
M3i RadioLink, Overview, Management through instant interactive information, 7 pages (Jun. 1995).
Mailing list at http://www.citi.umich.edu/projects/mobile/mobile-ip-mail (Jun. 1992-Jul. 1995).
Maltz, David A., Bhagwat, Pravin, "MSOCKS: An Architecture for Transport Layer Mobility," 1998 IEEE, 0-7803-4386-7/98.
Mannion, Patrick, "IP mobility to run seamless course," EE Times, Sep. 25, 2001.
Marek, Sue, "Wireless' Weakest Link," Wireless Week, Oct. 24, 2001.

(56) References Cited

OTHER PUBLICATIONS

Martin, Jean-Christophe, "Policy-Based Networks," XP-002271561, Sun BluePrints OnLine (Oct. 1999).
Mathias, Craig et al., "The ABCs of PCS," Special Focus, Wireless Networks, Network World (Nov. 7, 1994).
Medhi, D., et al., "Network Dimensioning and Performance of Multiservice, Multirate Loss Networks with Dynamic Routing," IEEE/ACM Transactions on Networking, vol. 5, No. 6, pp. 944-957 (Dec. 1997).
Microsoft Support Online Knowledge Base Search Results, "DHCP (Dynamic Host Configuration Protocol) Basics," Article ID: Q120829, (Revision Date Sep. 24, 1996).
Mink, S. et al., "Towards Secure Mobility Support for IP Networks," IEEE Publication, vol. 1, pp. 555-562, SP101526810 (Aug. 21, 2000).
Molta, Dave, "Mobile & Wireless Technology (NetMotion Mobility Keeps Wireless Apps Grounded)," Network Computing, Oct. 1, 2001.
Molta, Dave, "WLAN Security on the Rise," Network Computing, Feb. 4, 2002.
Montenegro, G., Sun Microsystems, Inc., Internet Draft, "Reverse Tunneling for Mobile IP," Jan. 12, 1997.
Nasarre, Christophe, "Debug Detect and Plug GDI Leaks in Your Code withTwo Powerful Tools for Windows XP," MSDN Magazine, (Jan. 2003).
Nelson, Matthew G., "WRQ Plans Wireless Spin-off," Information Week Via Comm Web, Apr. 4, 2001.
NetMotion Wireless Product Documentation on CD; with 2 page printout of contents.
Ohlhorst, Frank, "Seamless Wireless Connectivity," Computer Reseller News (CRN), Aug. 9, 2001.
Ohta, "Conventional IP over ATM" (Internet Draft Mar. 1995).
Ohta, M. et al., Internet Draft draft-ohta-ip-over-atm-02.txt, Conventional IP over ATM (Mar. 1995.
O'Reilly Online Catalog, "Windows NT TCP/IP Network Administration," Chapter 6, 25 pages (undated).
Other papers authored by Charles Perkins posted at http://people.nokia.net/charliep/.
PCCA STD-201 Extensions to NDIS for Wireless WANs, Official Standard, Appendices A-F, (Mar. 18, 1997).
PCCA STD 201, Extensions to NDIS for Wireless WANs, Revision 1.1 (Oct. 29, 1996).
PCCA STD-201 "Extensions to NDIS for Wireless WANs" Version 1.1 (Jul. 7, 2000).
PCCA-STD-201, Extensions to NDIS for Wireless WANs, Revision 1.1 (May 9, 1997).
PCCA-XSTD-201, Extensions to NDIS 3 for Wireless WANs, Draft Version 0.09 (Aug. 31, 1995).
PCCA-XSTD-201, Extensions to NDIS 3 for Wireless WANs, Version 1.1 (Jan. 3, 1996).
PCCA-XSTD-201, Extensions to NDIS 3 for Wireless WANs, Version 1.2 (Jan. 17, 1996).
PCCA-XSTD-201, Extensions to NDIS 3 for Wireless WANs, Version 1.0 (Oct. 25, 1995).
PCCA-XSTD-201, Wireless Extensions to NDIS 3 Proposal, Draft Version 0.08 (Jul. 5, 1995).
PCCA-XWPDS, Draft Proposed PCCA Standard, "PCCA Extensions for the PC/TCP Packet Driver Specification," Revision 1.03a (Dec. 11, 1994).
Peretz, Matthew, "PEAR Shaped WLAN Products Unveiled," 802.11-Planet.com, Nov. 12, 2001.
Perkins et al, DHCP for IPv6, The Third IEEE Symposium on Computers and Communications (ISCC'98) Athens, Greece Jun. 30-Jul. 2, 1998.
Perkins et al., DHCP for Mobile Networking with TCP/IP (ISCC 1995), http://people.nokia.net/charliep/.
Perkins et al., "Using DHCP with Computers that Move" (Wireless Networking 1993), http://people.nokia.net/charliep/.
Perkins, "IP Mobiiity Support for the IPv4," RFC 3220 (Jan. 2002).
Perkins, "IP Mobility Support," Network Working Group RFC 2002 (Oct. 1996).
Perkins, C., "Mobile Networking Through Mobile IP," Copyright 1997 Institute of Electrical and Electronics Engineers, Inc., 15 pages.
Perkins, Internet Draft: "IP Encapsulation Within IP" (IETF May 31, 1996).
Perkins, C., RFC 2003, "IP Encapsulation within IP," (IETF Oct. 1996).
Perkins, Internet Draft: "IP Mobility Support" (IETF May 31, 1996).
Phifer, Lisa, "Improving WLAN Security," 802.11-Planet.com, Nov. 26, 2001.
Pietrik, Matt, "Learn System-Level Win32 Coding Techniques by Writing an API Spy Program", MSJ, (Dec. 1994).
Piscitello, D., Internet Draft, "Mobile Network Computing Protocol (MNCP)," 55 pages (Aug. 28, 1997).
Piscitello, D., Phifer, Internet Draft L. Core Competence Wang Y. Hovey, R. Bellcore: "Mobile Network Computer Protocol (MNCP)" Sep. 3, 1997.
Piscitello, D., Phifer, Internet Draft, L. Core Competence, Wang, Y., Hovey, R. Bellcore: "Mobile Network Computing Protocol (MNCP)," Aug. 28, 1997.
Poropudas, Timo, "Mainframe emulator skills come in handy for wireless roaming," WOW! Wireless, Dec. 8, 2000.
Portable Computer and Communications Association (PCCA) "Extensions to NDIS for Wireless WANs" (Version 1.0 1996).
Power Point Presentation "Advantages of WRQ's TCP" (WRQ 1994).
Press Release, "Bethlehem, Penn.—(Business Wire) via Individual Inc.—Designed for businesses with mobile workers, PADCOM, Inc. today introduced SmartPath . . . " (Sep. 22, 1997).
Press release, "WRQ Licenses AtGuard to Symantec and ASCII Network Technology" (copyright 1999).
Product Information, PadCom, Inc, PadCom Connectivity Suite, "Connectivity Suite Technical Overview".(2001, 2002).
Published Internet Standards: Request for Comment No. 1122, "Requirements for Internet Hosts—Communications Layers" (IETF Oct. 1989).
R. Droms, "Dynamic: Host Configuration Protocol," IETF RFC 2131, Mar. 1997.
Ramanathan, "Nimrod Mobility Support" (Internet Draft Jul. 1994).
Ranch, "Transmitting IP Traffic over LocalTalk Networks" (Internet Draft Jul. 1992).
Rash, Wayne, "All Networks are Insecure," ZDNet, Jan. 18, 2002.
Rash, Wayne, "Wireless Networks are Great, But Don't Forget the Security", Internet Week, Jan. 22, 2001.
Rash, Wayne, "Wireless Security Gets a Jumpstart," ZDNet (www.zdnet.com/enterprise), Oct. 25, 2001.
Request for Comment (RFC) 1674 "A Cellular Industry View of IPng" (IETF Aug. 1994).
Richter, Jeffrey, "Programming Applications for Microsoft Windows", Fourth Edition, Chapter 22, Microsoft Press, (1999).
Rist, Oliver, "A Wonderful Wireless World at Fall N+I," Planet IT (NetMotion Wireless), Oct. 18, 2000.
Rist, Oliver, "Where's the Killer App?" SD Times, Nov. 1, 2001.
Rist, Oliver, and Brian Ghee, "Look, Ma . . . No Wires," Internet Week Online, Mar. 14, 2000.
Robbins, John, "Bugslayer", MSJ, Feb. 1998, http://www.microsoft.com/msj/0298/bugslayer0298.htm (Feb. 1998).
Robbins, John, "Bugslayer", MSJ, Jun. 1999, http://www.microsoft.com/msj/0699/BugSlayer/Bugslayer0699.htm (Jun. 1999).
Rysavy, Peter, "Break Free With Wireless LANs," Network Computing, Oct. 29, 2001.
S. Alexander and R. Dromes, "DHCP Options and BOOTP Vendor Extensions," IETF RFC 2132, Mar. 1997.
Savarese, Joe, "Wireless: Security Standards Improve," ComNews.com, Jan. 7, 2002.
Savarese, Joe, "Security standards improve," reprinted from Communications News (Jan. 2002).
Schroeder, Max, "Adaptation and Evolution," Communications Convergence, Jul. 5, 2001.

(56) References Cited

OTHER PUBLICATIONS

Schuurmans, Jos, "NetMotion Wireless spun off as version 2 available," WOW! Wireless, Mar. 6, 2001.
Sharer, R.J., "Applying Policy Management to Reduce Support Costs for Remote and Mobile Computing," International Journal of Network Management, 8, 211-218 (1998).
Solomon, Internet Draft, "Mobile IP Working Group," (May 24, 1996).
Stevenson, H., et al., Network Working Group Internet Draft, "A Method for the Transmission of IP Datagrams Over SNA Networks Using LU6.2 Conversations" (May 11, 1992).
Technical Report, 3G TR 23.923 V.3.0.0, XP-002282368, 3rd Generation Partnership Project; Technical Specification Group Services and System Aspects; Combined GSM and Mobile IP Mobility Handling in UMTS IP CN (May 2000).
Technical Report, 3GPP TR 23.922 V1.0.0 (Oct. 1999) XP-002144276, , 3rd Generation Partnership Project, Technical Specification Group Services and Systems Aspects; Architecture for an All IP network.
Technical Specification, ETSI TS 123 107 V3.3.0 (Jun. 2000), XP-002201573, Universal Mobile Telecommunication System (UMTS); QoS Concept and Architecture (Release 1999).
Teknique, Data Sheet, Optimized TCP/IP over Wireless, Schaumburg, IL, 5 pages.
Teknique, Data Sheet, TransNet II Wireless Gateway Services, Schaumburg, IL, 2 pages.
Teknique, Data Sheet, TransNet II Wireless Gateway, Wireless—A Wide Area Viewpoint, Schaumburg, IL, 2 pages.
Teknique, Data Sheet, TransNet II Wireless Gateway, Wireless—A Wide Area Viewpoint, Schaumburg, IL, 3 pages. [ ?pc doc# 631729].
Teknique, Data Sheet, TransRMail, Schaumburg, IL, 2 pages.
Teknique, Data Sheet, TX1000 High Performance Communication Processor, Schaumburg, IL, 2 pages (1994).
Teknique, Data Sheet, TX2000 High Performance Communication Processor, Schaumburg, IL, 2 pages.
Teknique, Data Sheet, TX5000 High Performance Communication Processor, Schaumburg, IL, 2 pages (1994).
The UC Berkeley BARWAN Research Project CDROM, with Index, http://daedalus.cs.berkeley.edu/.
Valko, A., et al., XP-002133539, Internet Draft, "Cellular IP" (Nov. 18, 1998).
Veldkamp, Tania, "Roaming over routers nu ook met Pocket PC's," [Dutch] VNUnet.nl, Dec. 21, 2000.
Web site information, WRQ AtGuard, www.atguard.com (copyright 1999).
Weber, Chris, "Using IPSec in Windows 2000 and XP, Part One," http://www.securityfocus.com/infocus/1519 (Dec. 5, 2001).
Westerinen, A., et al., Networking Group Request for Comments 3198, "Terminology for Policy-Based Management," 13 pages (Nov. 2001).
Wexler, Joanie, "Big-picture approaches to security," Network World Fusion, Jan. 2, 2002.
Wexler, Joanie, "Mobile IP gotcha," Network World Wireless in the Enterprise Newsletter, Dec. 4, 2000.
Wexler, Joanie, "Pick a network, any network," Network World Wireless Newsletter, Sep. 17, 2001.
White Paper, "TCP/IP: The Best Protocol for Remote Computing," www.rvsavy.com/Articles/remote.htm (1996).
Wright, Michele, XP-002116275, "Using Policies for Effective Network Management," International Journal of Network Management, 9, 118-125 (1999).
WRQ Reflection Network Series TCP Connection Version 4 (1994).
WRQ White Paper, "How WRQ's TCP/IP Reduces Costs and Improves Reliability in Remote and Mobile Computing," 5 pages (Nov. 14, 1996).
WRQ White Paper, "Reducing the Cost of PC Connectivity," 7 pages (Nov. 25, 1996).
WRQ White Paper, "TCP Kernel Architecture—The Silent TCP/IP Issue," 4 pages (Nov. 14, 1996).
WRQ White Paper, "TCP/IP: The Best Protocol for Remote Computing," 8 pages (Nov. 14, 1996).
www.geckil.com search engine results using, for example, search terms "DHCP" and "Mobility".
www.ka9q.net/code/ka9gnos/ (last updated Mar. 15, 2002).
Zenel, Bruce et al., "A General Purpose Proxy Filtering Mechanism Applied to the Mobile Envirorirnent," 12 pages (undated).
Zenel, Bruce, Thesis Proposal, "A Proxy Based Filtering Mechanism for the Mobile Environment," Dept. of Computer Science, Columbia University, New York, NY, (Feb. 1998).
Zetie, Carl, "WRQ NetMotion Provides a Simple Solution to Mobility," Giga information Group, Sep. 6, 2000.
Wong, Daniel, "Soft Handoffs in CDMA Mobile Systems," IEEE Personal Communications, Dec. 1997.
Netmotion Wireless: "Extending Mobile Solutions Without Middleware." White Paper Online!. XP002324100 (Aug. 6, 2001).
Internetweek.com, "Wireless Works, Netmotion makes the difference in wireless networks." Internetweek, Online!, XP002(May 7, 2001).
Yongguang Zhang et al: "A 'Persistent connection' Model for Mobile and Distributed Systems." Computer Communications and Networks, 1995, Proceedings, Fourth International Conference, Las Vegas, NV., USA Sep. 20-23, 1995, IEEE Comput.Soc.US. XP010200337 (Sep. 20, 1995).
Logue, et al., "The Unofficial @Guard FAQ" (Jul. 30, 1998).
Pahlavan, K., et al., "Wideband Local Access: Wireless LAN and Wireless ATM", IEEE Comm. Magazine, Nov. 1997, p. 3-38.
"KeyWareTM—A Wireless Distributed Computing Environment", Racotek White Paper, Racotek, Inc., Minneapolis, MN, 1995.
"MAVRIC 2000: Integrated Data and Voice Communications System", MAVRIC 2000 Performance Specifications Brochure, Metric Systems Corp., Acton, MA, 1991.
"RacoNet: Mobile Data Communication Services Product Catalog," Rev. 1.03, Racotek, Inc., Minneapolis, MN, 1993.
"Racotek: Design Considerations for Mobile Data Applications", Racotek 400-0054-00, Racotek, Inc., Minneapolis, MN, Jan. 1993.
"RacoNet: Mobile Data Communications Services Price List", Rev. 1.03, Racotek, Inc., Minneapolis, MN, 1993.
"MPS II System Component: Mobile System Printer", Racotek Sales Brochure, Racotek, Inc., Minneapolis, MN, Feb. 1990.
"MPS II System Component: Mobile System Data Terminal", Racotek Sales Brochure, Racotek, Inc., Minneapolis, MN, Feb. 1990.
"MPS II Component: Adaptive Network Modem", Racotek Sales Brochure, Racotek, Inc., Minneapolis, MN, Feb. 1990.
"Racotek Overview", Racotek, Inc., Minneapolis, MN, 1993.
"Unify Your Mobile Data Communications with RacoNet", Racotek Sales Brochure, Racotek, Inc., Minneapolis, MN, 1992.
"The Race is Won by the Fleet", Racotek Sales Brochure, Racotek, Inc., Minneapolis, MN, publication date unknown.
Datalines, vol. 5, No. 2, Racotek, Inc., Minneapolis, MN, Apr. 1993.
Datalines, vol. 5, No. 3, Racotek, Inc., Minneapolis, MN, Sep. 1993.
Datalines, vol. 6, No. 1, Racotek, Inc., Minneapolis, MN, Feb. 1994.
"Racotek/HDC: Operations Booklet for Mobile Data Terminals", Racotek, Inc., Minneapolis, MN, 1993.
Shpancer et al., "Open Data-On-Voice Systems for SMRs", Racotek—Radio Computer Technologies, presented at NABER's 1990 Annual Meeting, May 9-12, Tampa, FL, 1990.
"How to Hold Together a Business that Heads Off in Every Direction", RaCoNet Networking Software, Racotek Sales Brochure, Racotek, Inc., Minneapolis, MN, publication date unknown.
Robert J. Fraser, "The MTS-Part II", Communications, pp. 52-55, Aug. 1991.
"Wireless Data Communications and RAM Mobile Data", RAM Mobile Data Sales Brochure, RAM Mobile Data U.S.A., 1992.
"RAM Mobile Data: Field Service", RAM Mobile Data Sales Brochure, RAM Mobile Data U.S.A., 1992.
"Market Opportunities for System Integrators, Mobile Data Terminal Manufacturers, Radio and Modem Manufacturers, and Software Developers", RAM Mobile Data Sales Brochure, RAM Mobile Data U.S.A., publication date unknown.
On the Air, a quarterly publication of ARDIS, Lincolnshire, IL, vol. 3, Spring 1993.

(56) References Cited

OTHER PUBLICATIONS

On the Air, a quarterly publication of ARDIS, Lincolnshire, IL, vol. 4, Jul. 1993.
On the Air, a quarterly publication of ARDIS, Lincolnshire, IL, vol. 5, Fall 1993.
Robert B. Euler, "Making the Mobile Communications Connection", MSM Magazine, Jun. 1990.
"ARDIS Marks First Birthday of Network Operation", ARDIS News Release, ARDIS, Lincolnshire, IL, Apr. 1991.
"ARDIS Extends its Reach into Canada", ARDIS News Release, ARDIS, Lincolnshire, IL, Feb. 1992.
"ARDIS Focuses on Sales Force Automation", ARDIS News Release, ARDIS, Lincolnshire, IL, Oct. 1993.
"ARDIS Sets the Standard for Wireless Data Communications", ARDIS News Release, ARDIS, Lincolnshire, IL, publication date unknown.
"How Does One Overnight Delivery Service Guarantee Overnight Success?", ARDIS Sales Advertisement, ARDIS, Lincolnshire, IL, publication unknown.
"ServiceXpress", ARDIS Sales Brochure, ARDIS, Lincolnshire, IL, publication date unknown.
"ARDIS is the First Radio Frequency Network for the Motorola Envoy Wireless Personal Communicator", Communication by Ardis, ARDIS Sales Brochure, Ardis, Lincolnshire, IL, publication date unknown.
"ARDIS", Company Profile Brochure, ARDIS, Lincolnshire, IL, publication date unknown.
"ARDISmailSM 100: The Wireless E-Mail Package", ARDIS Sales Brochure, ARDIS, Lincolnshire, IL, publication date unknown.
"Congratulations. You Have the Sale!", ARDIS Sales Brochure, ARDIS, Lincolnshire, IL, publication date unknown.
"Wireless Solutions Can Mean the Difference . . . ", ARDIS Sales Brochure, ARDIS, Lincolnshire, IL, publication date unknown.
"Achieving the Highest Level of Productivity with New Thinking and a New Vision", ARDIS Sales Brochure, ARDIS, Lincolnshire, IL, publication date unknown.
Form S-1 Registration Statement of Racotek Inc. (with exhibits), as filed with the Securities and Exchange Commission on Oct. 22, 1993.
Amendment No. 1 to Form S-1 Registration Statement of Racotek Inc., as filed with the Securities and Exchange Commission on Nov. 4, 1993.
Ericsson GE, "Mobile Data System Evolution", publication date unknown.
Ericsson GE, "Mobile Data Questions & Answers", dated Mar. 3, 1994.
Ericsson GE, "Private Radio Systems EDACS.RTM. Data Advantage.TM. Technical Description", publication date unknown.
Motorola, Inc., "Integrated Voice and Data System Description", publication date unknown.
Motorola, Inc., "VRM-100 Vehicular Radio Modem", publication date unknown.
Motorola Private Systems Division Land Mobile Products Sector, "VRM 100 Vehicular Radio Modem for Integrated Voice; and Data Operation on Smartnet and SmartZone Trunked Radio Systems and Conventional Radio Systems—Product Description", Apr. 5, 1994.
Motorola Mobile Data Division, "RPM Native Mode Interface R1.1 Reference Manual", published Sep. 1992.
English Language Abstract of JP 63-224422.
English Lansuase Abstract of JP 3-32125.
Hills, Alex et al., "Seemless Access to Multiple Wireless Data Networks: A Wireless Data Network Infrastructure at Carnegie Mellon University", IEEE Personal CommunicationsMagazine, 3(1):56-63, Feb. 1996.
Johnson, David B., "Scalable Support for Transparent Mobile Host Internetworking", Wireless Networks, vol. 1, No. 3, pp. 311-321 (1995).
Johnson, David B., "Scalable and Robust Internetwork Routing for Mobile Hosts", 14th International Conference on Distrbuted Computing Systems, Jun. 21-24, 1994, Pozman, Poland.
Johnson, David B., "Ubiquitous Mobile Host Internetworking", Proceedings of the Fourth Workshop on Workstation Operating Systems, IEEE Computer Society, Oct. 1993.
Perkins, Charles et al., "IMHP: A Mobile Host Protocol for the Internet", Computer Networks and ISDN Systems, vol. 27, No. 3, pp. 479-491 (1994).
Johnson, David B., "Mobile Host Internetworking Using IP Loose Source Routing", Carnegie Mellon University, School of Computer Science (1993).
Perkins, Charles et al., "Mobility Support in IPv6", Proceedings of the Second Annual International Conference on Mobile Computing and Networking (MobiCom '96), Nov. 10-12, 1996.
Solomon, J., "Applicability Statement for IP Mobility Support", The Internet Engineering Taskforce, RFC 2005, Oct. 1996.
Thyfault, M., "Wireless has a Support Act—Carriers at Comdex Tout Applications for Cellular Digital Packet Data," Information Week (1993). Available from DIALOG Corporation.
Wexler, J., "CDPD Spec Could Embrace Analog Nets," Network World vol. 12, No. 13 (Mar. 1995): pp. 17, 24. Available from DIALOG Corporation.
"Hybrid Cellular Data Technology in Works," Telecommunications Alert vol. 12, No. 222 (Nov. 1995). Available from Lexis.
Schwartz, J., "GTE Mobilnet Retrofits CDPD Network to Connect with Analog Cellular," Communications Week (1996): p. 53. Available from DIALOG Corporation.
"GTE Closer to Installing Circuit Switched-CDPD Gateway;Plans to Offer National 'CDPD Access'via '800' Number Service," Wireless Data News, vol. 4, Issue 6 (Mar. 1996). Available from DIALOG Corporation.
Washburn, B., "CDPD: The Tower of Power," America's Network (Aug. 1996): p. 42. Available from Lexis.
Steward, S., "A circuitous Route to CDPD Expansion; Cellular Digital Packet Data," Cellular Business vol. 13, No. 9 (Sep. 1996): p. 102. Available from Lexis.
"Sierra Wireless Adds CS-CDPD," Business Wire (Jan. 1997), Available from World Wide Web: (http://www.sierrawireless.com/news/cdpd.html), downloaded Mar. 12, 2002.
Sukow, R., "GTE Wireless's CS-CDPD Technology Will Be Commercially Available Feb. 3" Communications Today (Jan. 1997). Available from DIALOG Corporation.
"Wireless: GTE, Hughes Network Systems and PCSI Join to Provide Nationwide Wireless Access for 'Super Phones,' Other Intelligent Devices," EDGE, on & about AT&T (Feb. 1997). Available from DIALOG Corporation.
Pate, K.,"CS-CDPD May Solve Wireless Data User Problem with Coverage (Circuit Switched-Cellular Digital Packet Data is Launched to Allow Data Users to Access CDPD Functionality Across an Entire Network)," RCR Radio Communications Report vol. 16, No. 5 (Feb. 1997):p. 2. Available from DIALOG Corporation.
"GTE Wireless Launches Long-Anticipated CS-CDPD Service; Other Cellular Carriers Continue to Reject Hybrid Approach," Wireless Data News, vol. 5, Issue 3 (Feb. 1997). Available from DIALOG Corporation.
"Industry News: CS-CDPD Goes Nationwide," Advanced Transportation Industry Review. (May 1997). Available from DIALOG Corporation.
"Dueling Realities: Cellular Data Developers Struggle to Build Business, Yet Foresee Future Consumer, Ad-Supported Market," Wireless Data News, vol. 5, Issue 11 (May 1997). Available from DIALOG Corporation.
"GTE Wireless Offers National Access for 'Super Phones'," Cellular Business (Jun. 1997). Available from DIALOG Corporation.
Morris, J., "Guide to Wireless Data Networks," Sierra Wireless, (Jul. 1997), available on the World Wide Web: (http://www.ofb.net/heath/ardis/2110152.pdf).
"GTE, Sierra Announce CDPD Solution (GTE Wireless and Sierra Wireless Introduced a Circuit Switched Cellular Digital Packet Data Solution)," RCR Radio Communications Report (Jun. 1998):p. 8. Available from DIALOG Corporation.
"GTE, Sierra Wireless Bring Circuit-Switched CDPD to Indiana Law Enforcement," Wireless Data News, vol. 6, Issue 15 (Jul. 1998). Available from DIALOG Corporation.

(56) References Cited

OTHER PUBLICATIONS

"Sierra Modem Adds Coverage (Indiana State Police Department is the First in US to Use New Circuit-Switched CDPD Modem from Sierra Wireless," Wireless Week (Jul. 1998):p. 14. Available from DIALOG Corporation.
"GTE and Sierra Wireless Extend Reach of Cellular Digital Packet Data Networks Nationwide," Available from World Wide Web: (http://www.sierrawireless.com/news/gte&swi.html), downloaded Mar. 12, 2002.
"MP215: The First Ever CS-CDPD 3W Modem. (End-to-end wireless IP anywhere—Automatically)," Tri-M Systems, Coquitlam, B.C., Canada.
"CS-CDPD," Available from World Wide Web: (http://www.sierrawireless.com/alliance/nettech_cscdpd.asp.), downloaded Mar. 12, 2002.
"Circuit Switch Cellular Digital Packet Data," Available from World Wide Web: http://www.leapforum.org/published/internetworkMobility/split/node91. html), downloaded Mar. 18, 2002.
"MP215 Modem Installation,Configurarion, and User's Guide,"Revision 1.0, Part No. 2110036, Sierra Wireless, Jun. 1998.
"Where There's Voice, There's Now Cost-effective Data with Lucent Technologies' New Circuit Switched CDPD Capability," Lucent Technologies, Jun. 1996.
Hunt, Craig, "TCP/IP Network Administration" O'Reilly & Associates, Inc., pp. 28-35 (1992).
Chen, J.B. et al., "MOSS: A Mobile Operating System Substrate", Harvard University Division of Applied Sciences, May 1995.
Baker, M., "Changing Communication Environments in MosquitoNet," Proceedings of the IEEE Workshop on Mobile Computing Systems and Applications, Dec. 1994.
Cheshire, S. et al., "Experiences with a Wireless Network in MosquitoNet", Proceedings of the IEEE Hot Interconnects Symposium '95, Aug. 1995.
Zhao, X. et al., "Flexible Network Support for Mobility," Proceedings of the Fourth Annual ACM/IEEE International Conference on Mobile Computing and Networking (MobiCom 1998), Dallas Texas, Oct. 1998.
Baker, M. et al., "Supporting Mobility in MosquitoNet," Proceedings of the 1996 USENIX Technical Conference, San Diego, California, Jan. 1996.
Alzona, M., et al., "Project Octopus, A Framework for Ubiquitous Mobile Computing", Technical Report 1994-96, Carnegie Mellon University Information Network Institute, Sep. 17, 1994.
Bruegge, B., et al., "Applications of Mobile Computing and Communications", IEEE Personal Communications Magazine, 3(1):64-71, Feb. 1996.
Johnson, D., et al., "Truly seamless wireless and mobile host networking, Protocols for adaptive wireless and mobile networking", IEEE Personal Communications Magazine, 3(1):34-42, Feb. 1996.
Katz, R., et al., "The Case for Wireless Overlay Networks", Proceedings of SPIE Conference on Multimedia and Networking vol. 2667, Mar. 1996.
Stemm, M., "Vertical Handoffs in Wireless Overlay Networks", Technical Report CSD-96-903, University of California, Berkeley, May 1996.
Caceres, R., et al., "Fast and Scalable Handoffs for Wireless Internets", Proceedings of the Second Annual International Conference on Mobile Computing and Networking, Nov. 1996.
Time Bounded Services and Mobility Management in IEEE 802.11 Wireless LANs, Kuo, W.K., IEEE 0-7803-4298-4, Apr. 1997.
Locating Object in Wide-Area Systems, Maarten van Steen, et al., IEEE Communications Magazine, vol. 36, No. 1, Jan. 1998, pp. 104-109.
International Standard, ISO 9542, ed. $1^{st}$, 1988.
Implementation of OSI-IP router for LAN-LAN interconnection, Srivathsan, K.R., et al., TENCON '91, 1991 IEEE Region 10 International Conference on EC3-Energy, Computer, Communication and Control Systems, Aug. 28-30, 1991, pp. 46-50.

\* cited by examiner

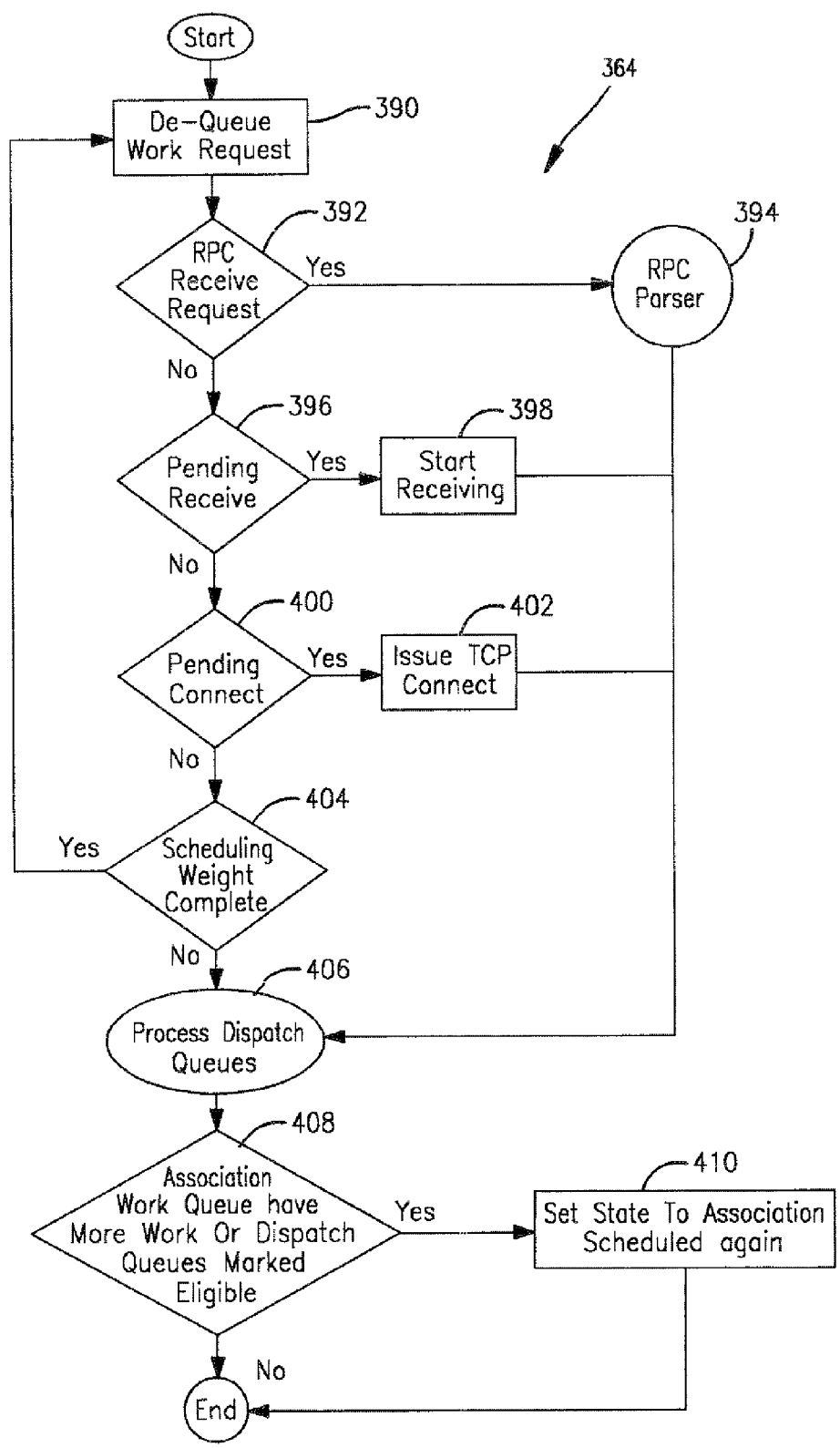
FIG. 5 Process Association Work

Process Priority Dispatch Queues

Proxy Generated RPC Calls

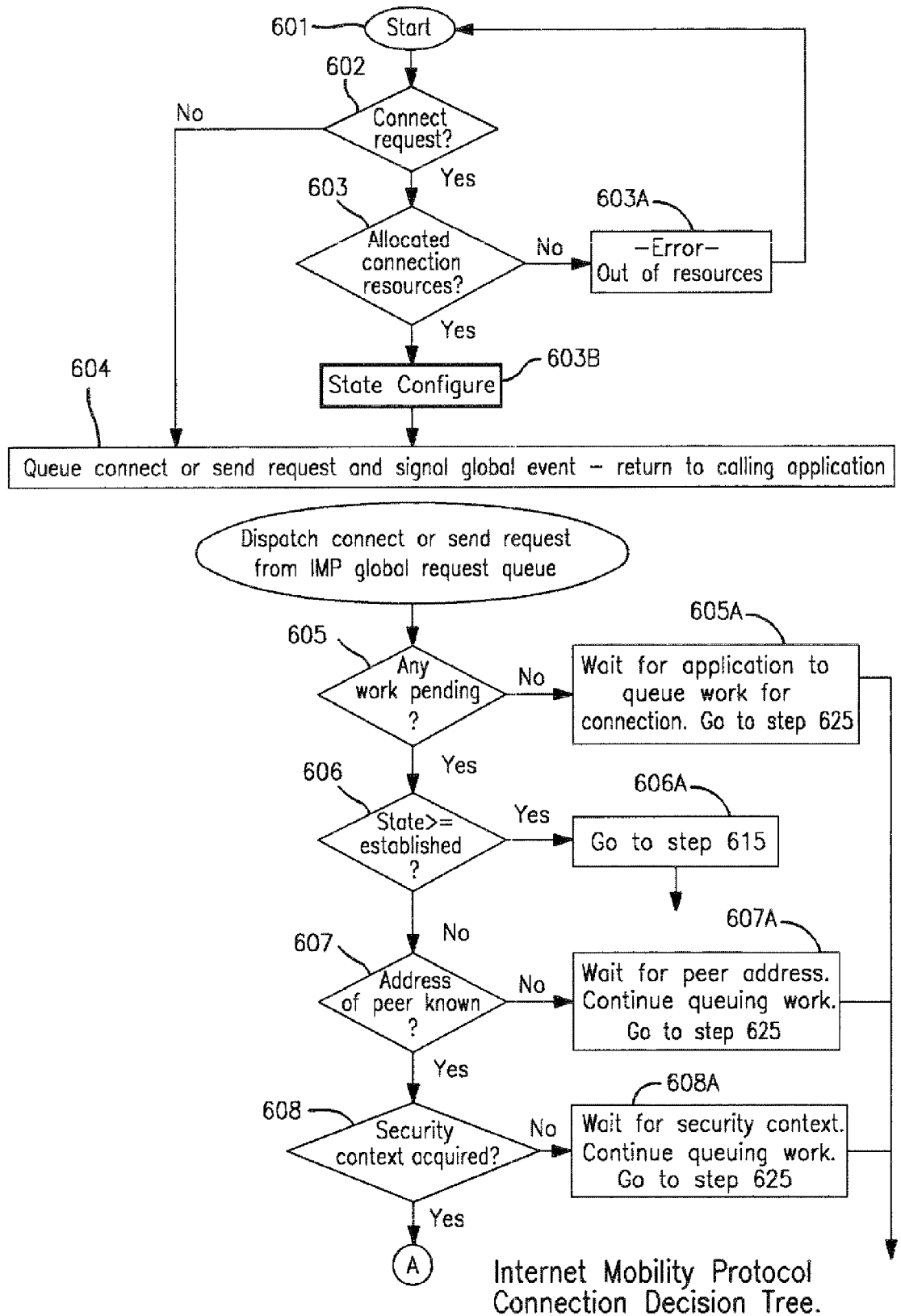
FIG. 10A  Connect and Send request logic
Internet Mobility Protocol Connection Decision Tree.

Terminate Connection request logic

Retransmit Event Logic

Retransmission of IMP Frame

Receive Event Logic

Passive Connection request logic

Abort Connection request logic

DHCP Listener Data Structures

ROAMING CONTROL CENTER—
Mobile End System

Interface Assisted Roaming
(IAR) Decision Tree

| Next Table Element | Previous Table Element | NPOA Unique Identifier | Network Level Address | Network Mask | Flags (i.e. Static Dynamic, etc.) | Timeout | Etc. |
|---|---|---|---|---|---|---|---|
| Next Table Element | Previous Table Element | NPOA Unique Identifier | Network Level Address | Network Mask | Flags (i.e. Static Dynamic, etc.) | Timeout | Etc. |

· · ·

| Next Table Element | Previous Table Element | NPOA Unique Identifier | Network Level Address | Network Mask | Flags (i.e. Static Dynamic, etc.) | Timeout | Etc. |
|---|---|---|---|---|---|---|---|

FIG. 20
Interface Assisted Roaming
Topology Node

Disjoint network Roaming

Example Secure Disjoint Coordination

METHOD AND APPARATUS FOR PROVIDING MOBILE AND OTHER INTERMITTENT CONNECTIVITY IN A COMPUTING ENVIRONMENT

CROSS-REFERENCE TO RELATED APPLICATIONS

This application is a divisional of application Ser. No. 09/660,500 filed Sep. 12, 2000 entitled "Method And Apparatus For Providing Mobile And Other Intermittent Connectivity In A Computing Environment, now U.S. Pat. No. 7,293,107; which application is a continuation-in-part of application Ser. No. 09/330,310 filed Jun. 11, 1999 entitled "Method And Apparatus For Providing Mobile And Other Intermittent Connectivity In A Computing Environment" now U.S. Pat. No. 6,546,425, which claims priority from provisional application No. 60/103,598 filed Oct. 9, 1998 entitled "Method and Apparatus For Providing Wireless Connectivity In A Computing Environment"; all of which are incorporated by reference herein in their entirety.

FIELD

The technology herein relates to connectivity between networked computing devices. More particularly, the technology herein relates to methods and systems that transparently address the characteristics of nomadic systems, and enable existing network applications to run reliably in the associated mobile environments. Still more particularly, the technology herein relates to techniques and systems for providing a continuous data stream connection between intermittently-connected devices such as handheld data units and personal computing devices.

BACKGROUND AND SUMMARY

Increasingly, companies are seeing rapid access to key information as the way to maintaining a competitive advantage. To provide immediate access to this information, mobile and other intermittently-connected computing devices are quietly and swiftly becoming an essential part of corporate networks—especially with the proliferation of inexpensive laptops and hand-held computing devices. However, integrating these nomadic devices into existing network infrastructures has created a challenge for the information manager.

Many problems in mobile networking parallel the difficulties in early local area networks (LANs) before the adoption of Ethernet. There are a variety of mobile protocols and interfaces, and because standards are just developing, there is little interoperability between systems. In addition, performance over these network technologies has been typically slow and bandwidth limited. Implementation costs to date have been high due the specialized nature of deployed systems.

Along with these issues, mobile technologies present a category of problems unto their own. Interconnects back into the main network may travel over and through a public network infrastructure, thus allowing sensitive information to possibly be tapped into. Furthermore, if any of the intermediary interconnects are via a wireless interface, the information is actually broadcast, and anyone with a similar interface can eavesdrop without much difficulty.

But, perhaps even more significantly, mobile networking has generally in the past been limited to mostly message-oriented or stateless applications—and thus has not been readily adaptable for existing or new corporate applications that use client/server, host-terminal, web-based or shared file systems models. This is because such commonly used applications need stateful sessions that employ a continuous stream of data—not just a stateless packet exchange—to work effectively and reliably.

To this end, many or most popular off-the-shelf networking applications require TCP/IP sessions, or private virtual circuits. These sessions cannot continue to function if they encounter network interruptions, nor can they tolerate roaming between networks (i.e., a change of network addresses) while established. Yet, mobile networking is, by its nature, dynamic and unreliable. Consider these common scenarios encountered in mobile networks:

Disconnected or Out of Range User

When a mobile device disconnects from a given network or loses contact (e.g., through an outage or "hole" in the coverage of a wireless interconnect), the session-oriented application running on the mobile device loses its stateful connection with its peer and ceases to operate. When the device is reattached or moves back into contact, the user must re-connect, log in again for security purposes, find the place in the application where work was left off, and possibly re-enter lost data. This reconnection process is time consuming, costly, and can be very frustrating.

Moving to a Different Network or Across a Router Boundary (Network Address Change)

Mobile networks are generally segmented for manageability purposes. But the intent of mobile devices is to allow them to roam. Roaming from one network interconnect to another can mean a change of network address. If this happens while the system is operational, the routing information must be changed for communications to continue between the associated peers. Furthermore, acquiring a new network address may require all of the previously established stateful application sessions to be terminated—again presenting the reconnection problems noted above.

Security

As mentioned before, companies need to protect critical corporate data. Off-the-shelf enterprise applications are often written with the assumption that access to the physical network is controlled (i.e., carried within cables installed inside a secure facility), and security is maintained through an additional layer of authentication and possible encryption. These assumptions have not been true in the nomadic computing world—where data is at risk for interception as it travels over public airways or public wire-line infrastructures.

SUMMARY

It would be highly desirable to provide an integrated solution that transparently addresses the characteristics of nomadic systems, and enables existing network applications to run reliably in these mobile environments.

The present invention solves this problem by providing a seamless solution that extends the enterprise network, letting network managers provide mobile users with easy access to the same applications as stationary users without sacrificing reliability or centralized management. The solution combines advantages of present-day wire-line network standards with emerging mobile standards to create a solution that works with existing network applications.

In accordance with one aspect of the present invention, a Mobility Management Server (MMS) coupled to the mobile interconnect maintains the state of each of any number of Mobile End Systems (MES) and handles the complex session management required to maintain persistent connections to the network and to peer application processes. If a Mobile End System becomes unreachable, suspends, or changes network address (e.g., due to roaming from one network interconnect to another), the Mobility Management Server maintains the connection to the associated peer—allowing the Mobile End System to maintain a continuous virtual connection even though it may temporarily lose its actual physical connection.

The present invention also provides the following (among others) new and advantageous techniques and arrangements:
a Mobility Management Server providing user configurable session priorities for mobile clients;
per-user mobile policy management for managing consumption of network resources;
a roaming methodology making use of the industry standard Dynamic Host Configuration Protocol (DHCP) in coordination with a Mobility Management Server;
automatic system removal of unreliable datagrams based on user configurable timeouts; and
automatic system removal of unreliable datagrams based on user configurable retries.

In more detail, the present invention in one of its aspects provides a Mobility Management Server that is coupled to the mobile interconnect (network). The Mobility Management Server maintains the state of each of any number of Mobile End Systems and handles the complex session management required to maintain persistent connections to the network and to other processes (e.g., running on other network-based peer systems). If a Mobile End System becomes unreachable, suspends, or changes network address (e.g., due to roaming from one network interconnect to another), the Mobility Management Server maintains the connection to the associated peer, by acknowledging receipt of data and queuing requests. This proxying by the Mobility Management Server allows the application on the Mobile End System to maintain a continuous connection even though it may temporarily lose its physical connection to a specific network medium.

In accordance with another aspect of the present invention, a Mobility Management Server manages addresses for Mobile End Systems. Each Mobile End System is provided with a proxy address on the primary network. This highly available address is known as the "virtual address" of the Mobile End System. The Mobility Management Server maps the virtual addresses to current "point of presence" addresses of the nomadic systems. While the point of presence address of a Mobile End System may change when the mobile system changes from one network interconnect to another, the virtual address stays constant while any connections are active or longer if the address is statically assigned.

In accordance with yet another aspect of the present invention, a Mobility Management Server provides centralized system management of Mobile End Systems through a console application and exhaustive metrics. The present invention also provides user configurable session priorities for mobile clients running through a proxy server, and per-user mobile policy management for managing consumption of network resources.

In accordance with yet another aspect of the present invention, a Remote Procedure Call protocol and an Internet Mobility Protocol are used to establish communications between the proxy server and each Mobile End System.

Remote procedure calls provide a method for allowing a process on a local system to invoke a procedure on a remote system. The use of the RPC protocol allows Mobile End Systems to disconnect, go out of range or suspend operation without losing active network sessions. Since session maintenance does not depend on a customized application, off-the-shelf applications will run without modification in the nomadic environment.

The Remote Procedure Call protocol generates transactions into messages that can be sent via the standard network transport protocol and infrastructure. These RPC messages contain the entire network transaction initiated by an application running on the Mobile End System—enabling the Mobility Management Server and Mobile End System to keep connection state information synchronized at all times—even during interruptions of the physical link connecting the two. In the preferred embodiment of the present invention providing RPC's, the proxy server and the Mobile End Systems share sufficient knowledge of each transaction's state to maintain coherent logical database about all shared connections at all times.

The Internet Mobility Protocol provided in accordance with the present invention compensates for differences between wired local area network interconnects and other less reliable networks such as a wireless LAN or WAN. Adjusted frame sizes and protocol timing provide significant performance improvements over non-mobile-aware transports—dramatically reducing network traffic. This is important when bandwidth is limited or when battery life is a concern. The Internet Mobility Protocol provided in accordance with the present invention also ensures the security of organizational data as it passes between the Mobile End System and the Mobility Management Server over public network interconnects or airways. The Internet Mobility Protocol provides a basic firewall function by allowing only authenticated devices access to the organizational network. The Internet Mobility Protocol can also certify and encrypt all communications between the Mobility Management Server and the Mobile End System.

In accordance with yet another aspect of the present invention, mobile inter-connectivity is built on standard transport protocols (e.g., TCP/IP, UDP/IP and DHCP, etc) to extend the reach of standard network application interfaces. The present invention efficiently integrates transport, security, address management, device management and user management needs to make nomadic computing environments effectively transparent. The Internet Mobility Protocol provides an efficient mechanism for multiplexing multiple streams of data (reliable and unreliable) through a single virtual channel provided by such standard transport protocols over standard network infrastructure.

With the help of the RPC layer, the Internet Mobility Protocol coalesces data from different sources targeted for the same or different destinations, together into a single stream and forwards it over a mobile link. At the other end of the mobile link, the data is demultiplexed back into multiple distinct streams, which are sent on to their ultimate destination(s). The multiplexing/demultiplexing technique allows for maximum use of available bandwidth (by generating the maximum sized network frames possible), and allows multiple channels to be established (thus allowing prioritization and possibly providing a guaranteed quality of service if the underlying network provides the service).

The Internet Mobility Protocol provided in accordance with the present invention provides the additional features and advantages, for example:
Transport protocol independence.
Allows the network point of presence (POP) or network infrastructure to change without affecting the flow of data (except where physical boundary, policy or limitations of bandwidth may apply).

Minimal additional overhead.

Automatic fragment resizing to accommodate the transmission medium. (When the protocol data unit for a given frame is greater then the available maximum transmission unit of the network medium, the Internet Mobility Protocol will fragment and reassemble the frame to insure that it can traverse the network. In the event of a retransmit, the frame will again be assessed. If the network infrastructure or environment changes, the frame will be refragmented or in the case that the maximum transmission unit actually grew, sent as a single frame.)

Semantics of unreliable data are preserved, by allowing frames to discard unreliable data during retransmit.

Provides a new semantic of Reliable Datagram service. (Delivery of datagrams can now be guaranteed to the peer terminus of the Internet Mobility Protocol connection. Notification of delivery can be provided to a requesting entity.)

Considers the send and receive transmission path separately, and automatically tailors its operating parameters to provided optimum throughput. (Based on hysteresis, it adjusts such parameters as frame size/fragmentation threshold, number of frames outstanding (window), retransmit time, and delayed acknowledgement time to reduce the amount of duplicate data sent through the network.)

Network fault tolerant (since the expected usage is in a mobile environment, temporary loss of network medium connectivity does not result in a termination of the virtual channel or application based connection).

Provides an in-band signaling method to its peer to adjust operating parameters (each end of the connection can alert its peer to any changes in network topology or environment).

Employs congestion avoidance algorithms and gracefully decays throughput when necessary.

Employs selective acknowledgement and fast retransmit policies to limit the number of gratuitous retransmissions, and provide faster handoff recovery in nomadic environments. (This also allows the protocol to maintain optimum throughput in a lossy network environment.)

Employs sliding window technology to allow multiple frames to be outstanding. (This parameter is adjustable in each direction and provides for streaming frames up to a specified limit without requiring an acknowledgement from its peer.)

Sequence numbers are not byte oriented, thus allowing for a single sequence number to represent up to a maximum payload size.

Security aware. (Allows for authentication layer and encryption layer to be added in at the Internet Mobility Protocol layer.)

Compression to allow for better efficiency through bandwidth limited links.

Balanced design, allowing either peer to migrate to a new point of presence.

Either side may establish a connection to the peer.

Allows for inactivity timeouts to be invoked to readily discard dormant connections and recover expended resources.

Allows for a maximum lifetime of a given connection (e.g., to allow termination and/or refusal to accept connections after a given period or time of day).

The present invention also allows a system administrator to manage consumption of network resources. For example, the system administrator can place controls on Mobile End Systems, the Mobility Management Server, or both. Such controls can be for the purpose, for example, of managing allocation of network bandwidth or other resources, or they may be related to security issues. It may be most efficient to perform management tasks at the client side for clients with lots of resources. However, thin clients don't have many resources to spare, so it may not be practical to burden them with additional code and processes for performing policy management. Accordingly, it may be most practical to perform or share such policy management functions for thin clients at a centralized point such as the Mobility Management Server. Since the Mobility Management Server proxies the distinct data streams of the Mobile End Systems, it provides a central point from which to conduct policy management. Moreover, the Mobility Management Server provides the opportunity to perform policy management of Mobile End Systems on a per user and/or per device basis. Since the Mobility Management Server is proxying on a per user basis, it has the ability to control and limit each user's access to network resources on a per-user basis as well as on a per-device basis.

As one simple example, the Mobility Management Server can "lock out" certain users from accessing certain network resources. This is especially important considering that interface network is via a mobile interconnect, and may thus "extend" outside of the boundaries of a locked organizational facility (consider, for example, an ex-employee who tries to access the network from outside his former employer's building). However, the policy management provided by the Mobility Management Server can be much more sophisticated. For example, it is possible for the Mobility Management Server to control particular Web URL's particular users can visit, filter data returned by network services requests, and/or compress data for network bandwidth conservation. This provides a way to enhance existing and new application-level services in a seamless and transparent manner.

A further embodiment of the invention provides an interface-assisted roaming listener that allows Mobile End Systems to take advantage of interfaces supporting generic signaling, to enable interface-assisted roaming. In accordance with one feature provided in accordance with the invention, the Mobile End System interface-based listener determines in response to an event (e.g., a callback, a timer timeout or a network activity hint indicating data loss), whether the Mobile End System's media connectivity status has changed. For example, the listener signals to the interface when it detects that the Mobile End System has become detached and is no longer in communication with the network. Upon re-attachment, the listener uses previously recorded network point of attachment identification information to determine whether the Mobile End System has been reattached to the same or different network point of attachment. If the reattachment is to the same network point of attachment, the listener signals to alert the mobile clients that they need to take steps to reestablish transport level communications. If the reattachment is to a different network point of attachment, the listener signals a "roam" condition and prompts the Mobile End System to acquire an address that is usable on the current network segment (this may entail, for example, registering the current address to be valid on a new subnet, for example). The listener may maintain a network topology map (which may be learned through operation) to assist it in deciding the correct signal (e.g., "roam same subnet" or "roam") to generate to its clients.

A still further aspect provided by our invention allows access to a Mobility Management Server (MMS) in a "disjoint networking" mode. The new algorithm allows for dynamic/static discovery of alternate network addresses that can be used to establish/continue communications with an MMS—even in a disjoint network topology in which one network infrastructure may have no knowledge of network addresses for another network infrastructure. In accordance with this arrangement, a list of alternate addresses that the MMS is available at is preconfigured, forwarded to an MES (Mobile End System) during the course of a conversation/connection. In one embodiment, the MMS can use a connection over one network to send the MES one or more MMS network addresses or other MMS identities corresponding to other networks. This list can sent during circuit creation or at any other time during the connection.

If/when the MES roams to a second network, it uses the list of MMS "alias" addresses/identifications to contact the MMS over the new network connection on the second network. This allows the MES to re-establish contact with the MMS over the new network connection even though the first and second networks may not share any addresses, routes or other information.

The present invention thus extends the enterprise network, letting network managers provide mobile users with easy access to the same applications as stationary users without sacrificing reliability or centralized management. The solution combines advantages of existing wire-line network standards with emerging mobility standards to create a solution that works with existing network applications.

BRIEF DESCRIPTION OF THE DRAWINGS

These, as well as other features and advantages of this invention, will be more completely understood and appreciated by careful study of the following more detailed description of presently preferred example embodiments of the invention taken in conjunction with the accompanying drawings, of which:

FIG. 20 shows an example interface assisted roaming topology node data structure;

DETAILED DESCRIPTION

Figure 1:
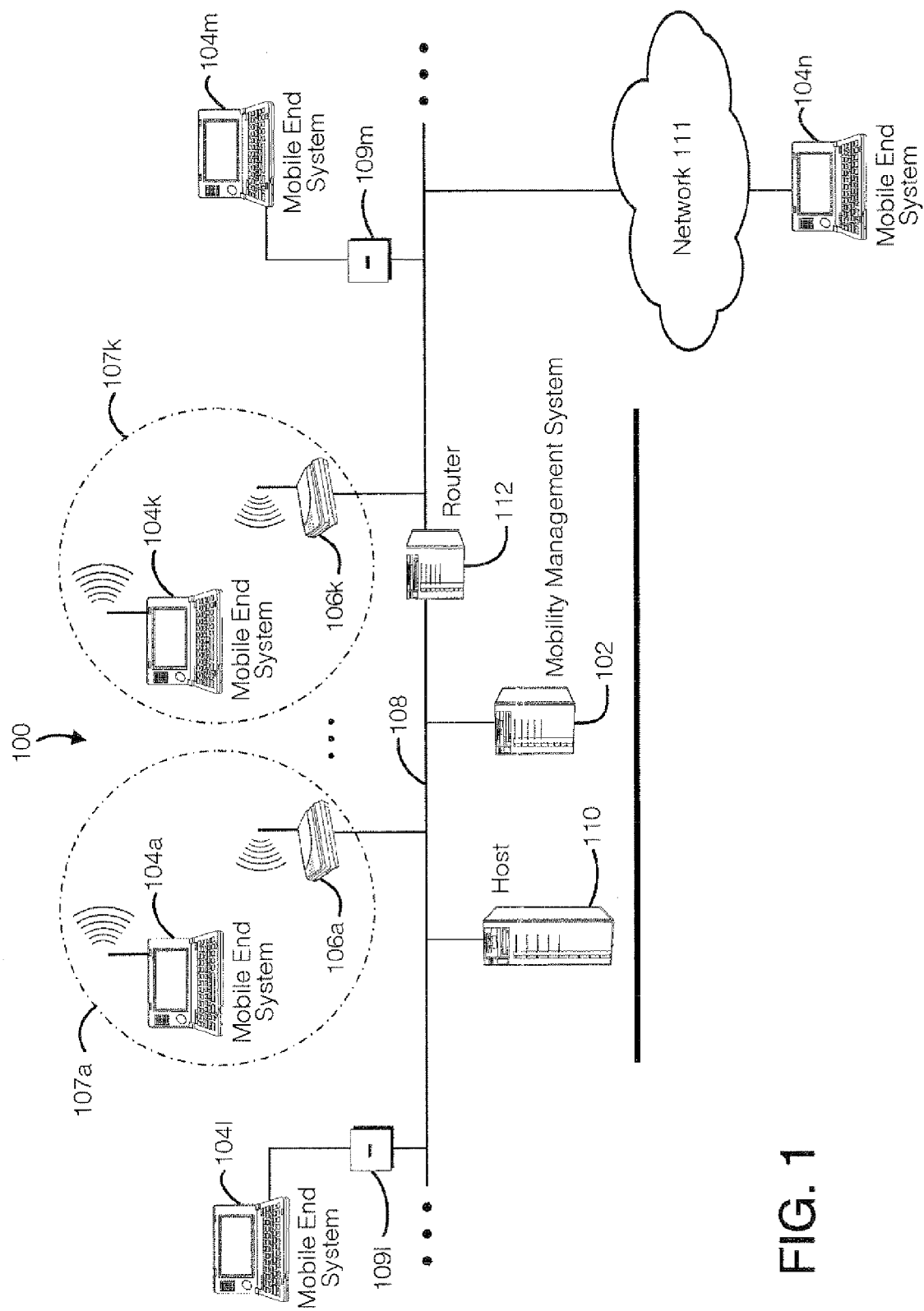
FIG. 1 is a diagram of an overall mobile computing network provided in accordance with the present invention.

FIG. 1 is an example of mobile enhanced networked computer system 100 provided in accordance with the present invention. Networked computer system 100 includes a Mobility Management Server 102 and one or more Mobile End Systems 104. Mobile End Systems 104 can communicate with Mobility Management Server 102 via a local area network (LAN) 108. Mobility Management Server 102 serves as network level proxy for Mobile End Systems 104 by maintaining the state of each Mobile End System, and by handling the complex session management required to maintain persistent connections to any peer systems 110 that host network applications—despite the interconnect between Mobile End Systems 104 and Mobility Management Server 102 being intermittent and unreliable. In the preferred embodiment, Mobility Management Server 102 communicates with Mobile End Systems 104 using Remote Procedure Call and Internet Mobility Protocols in accordance with the present invention.

In this particular example, Mobile End Systems 104 are sometimes but not always actively connected to Mobility Management Server 102. For example:

Some Mobile End Systems 104a-104k may communicate with Mobility Management Server 102 via a mobile interconnect (wirelessly in this case), e.g., conventional electromagnetic (e.g., radio frequency) transceivers 106 coupled to wireless (or wire-line) local area or wide area network 108. Such mobile interconnect may allow Mobile End Systems 104a-104k to "roam" from one cover area 107a to another coverage area 107k. Typically, there is a temporary loss of communications when a Mobile End System 104 roams from one coverage area 107 to another, moves out of range of the closest transceiver 106, or has its signal temporarily obstructed (e.g., when temporarily moved behind a building column or the like).

Other Mobile End Systems 104l, 104m, . . . may communicate with Mobility Management Server 102 via non-permanent wire-based interconnects 109 such as docking ports, network cable connectors, or the like. There may be a temporary loss of communications when Mobile End Systems 104 are temporarily disconnected from LAN 108 by breaking connection 109, powering off the Mobile End Systems, etc.

Still other Mobile End Systems (e.g., 104n) may be nomadically coupled to Mobility Management Server 102 via a further network topography 111 such as a wide area network, a dial-up network, a satellite network, or the Internet, to name a few examples. In one example, network 111 may provide intermittent service. In another example, Mobile End Systems 104 may move from one type of connection to another (e.g., from being connected to Mobility Management Server 102 via wire-based interconnect 109 to being connected via network 111, or vice versa)—its connection being temporarily broken during the time it is being moved from one connection to another.

Mobile End Systems 104 may be standard mobile devices and off the shelf computers. For example, Mobile End System 104 may comprise a laptop computer equipped with a conventional radio transceiver and/or network cards available from a number of manufacturers. Mobile End Systems 104 may run standard network applications and a standard operating system, and communicate on the transport layer using a conventionally available suite of transport level protocols (e.g., TCP/IP suite.) In accordance with the present invention, Mobile End Systems 104 also execute client software that enables them to communicate with Mobility Management Server 102 using Remote Procedure Call and Internet Mobility Protocols that are transported using the same such standard transport level protocols.

Mobility Management Server 102 may comprise software hosted by a conventional Windows NT or other server. In the preferred embodiment, Mobility Management Server 102 is a standards-compliant, client-server based intelligent server that transparently extends the enterprise network 108 to a nomadic environment. Mobility Management Server 102 serves as network level proxy for each of any number of Mobile End Systems 104 by maintaining the state of each Mobile End System, and by handling the complex session management required to maintain persistent connections to any peer systems 110 that host network applications—despite the mobile interconnect between Mobile End Systems 104 and transceivers 106 being intermittent and unreliable.

For example, server 102 allows any conventional (e.g., TCP/IP based) network application to operate without modification over mobile connection. Server 102 maintains the sessions of Mobile End Systems 104 that disconnect, go out of range or suspend operation, and resumes the sessions when the Mobile End System returns to service. When a Mobile End System 104 becomes unreachable, shuts down or changes its point of presence address, the Mobility Management Server 102 maintains the connection to the peer system 110 by acknowledging receipt of data and queuing requests until the Mobile End System once again becomes available and reachable.

Server 102 also extends the management capabilities of wired networks to mobile connections. Each network software layer operates independently of others, so the solution can be customized to the environment where it is deployed.

As one example, Mobility Management Server 102 may be attached to a conventional organizational network 108 such as a local area network or wide area network. Network 108 may be connected to a variety of fixed-end systems 110 (e.g., one or most host computers 110). Mobility Management Server 102 enables Mobile End Systems 104 to communicate with Fixed End System(s) 110 using continuous session type data streams even though Mobile End Systems 104 sometimes lose contact with their associated network interconnect or move from one network interconnect 106, 109, 111 to another (e.g., in the case of wireless interconnect, by roaming from one wireless transceiver 106 coverage area 107 to another).

A Mobile End System 104 establishes an association with the Mobility Management Server 102, either at startup or when the Mobile End System requires network services. Once this association is established, the Mobile End System 104 can start one or more network application sessions, either serially or concurrently. The Mobile End System 104-to-Mobility Management Server 102 association allows the Mobile End System to maintain application sessions when the Mobile End System, disconnects, goes out of range or suspends operation, and resume sessions when the Mobile End System returns to service. In the preferred embodiment, this process is entirely automatic and does not require any intervention on the user's part.

In accordance with an aspect of the present invention, Mobile End Systems 104 communicate with Mobility Management Server 102 using conventional transport protocols such as, for example, UDP/IP. Use of conventional transport protocols allows Mobile End Systems 104 to communicate with Mobility Management Server 102 using the conventional routers 112 and other infrastructure already existing on organization's network 108. In accordance with the present invention, a higher-level Remote Procedure Call protocol generates transactions into messages that are sent over the mobile enhanced network 108 via the standard transport protocol(s). In this preferred embodiment, these mobile RPC messages contain the entire network transaction initiated by an application running on the Mobile End System 104, so it can be completed in its entirety by the Mobility Management Server. This enables the Mobility Management Server 102 and Mobile End System 104 to keep connection state information synchronized at all times—even during interruptions of network medium connectivity.

Each of Mobile End Systems 104 executes a mobility management software client that supplies the Mobile End System with the intelligence to intercept all network activity and relay it via the mobile RPC protocol to Mobility Management Server 102. In the preferred embodiment, the mobility management client works transparently with operating system features present on Mobile End Systems 104 (e.g., Windows NT, Windows 98, Windows 95, Windows CE, etc.) to keep client-site application sessions active when contact is lost with the network.

Mobility Management Server 102 maintains the state of each Mobile End System 104 and handles the complex session management required to maintain persistent connections to associated peer 108 such as host computer 110 attached to the other end of the connection end point. If a Mobile End System 104 becomes unreachable, suspends, or changes network address (e.g., due to roaming from one network interconnect to another), the Mobility Management Server 102 maintains the connection to the host system 110 or other connection end-point, by acknowledging receipt of data and queuing requests. This proxy function means that the peer application never detects that the physical connection to the Mobile End System 104 has been lost—allowing the Mobile End System's application(s) to effectively maintain a continuous connection with its associated session end point (by simply and easily resuming operations once a physical connection again is established) despite the mobile system temporarily losing connection or roaming from one network interconnect 106A to another network interconnect 106K within coverage area 107K.

Mobility Management Server 102 also provides address management to solve the problem of Mobile End Systems 104 receiving different network addresses when they roam to different parts of the segmented network. Each Mobile End System 104 is provided with a virtual address on the primary network. Standard protocols or static assignment determine these virtual addresses. For each active Mobile End System 104, Mobility Management Server 102 maps the virtual address to the Mobile End System's current actual ("point of presence") address. While the point of presence address of a Mobile End System 104 may change when the device changes from one network segment to another, the virtual address stays constant while any connections are active or longer if the address is assigned statically.

Thus, the change of a point of presence address of a Mobile End System 104 remains entirely transparent to an associated session end point on host system 110 (or other peer) communicating with the Mobile End System via the Mobility Management Server 102. The peer 110 sees only the (unchanging) virtual address proxied by the server 102.

In the preferred embodiment, Mobility Management Server 102 can also provide centralized system management through console applications and exhaustive metrics. A system administrator can use these tools to configure and manage remote connections, and troubleshoot remote connection and system problems.

The proxy server function provided by Mobility Management Server 102 allows for different priority levels for network applications, users and machines. This is useful because each Mobility Management Server 102 is composed of finite processing resources. Allowing the system manager to configure the Mobility Management Server 102 in this way provides enhanced overall system and network performance. As one example, the system manager can configure Mobility Management Server 102 to allow real time applications such as streaming audio or video to have greater access to the Mobility Management Server 102's resources than other less demanding applications such as email.

In more detail, Mobility Management Server 102 can be configured via an application or application interface; standard network management protocols such as SNMP; a Web-based configuration interface; or a local user interface. It is possible to configure association priority and/or to configure application priority within an association. For example, the priority of each association relative to other associations running through the Mobility Management Server 102 is configurable by either the user name, or machine name (in the preferred embodiment, when the priority is configured for both the user and the machine that a user is logged in on, the configuration for the user may have higher precedence). In addition or alternatively, each association may have several levels of application priority, which is configured based on network application name. The system allows for any number of priority levels to exist. In one particular implementation, three priority levels are provided: low, medium and high.

Server and Client Example Software Architecture

Figure 2:
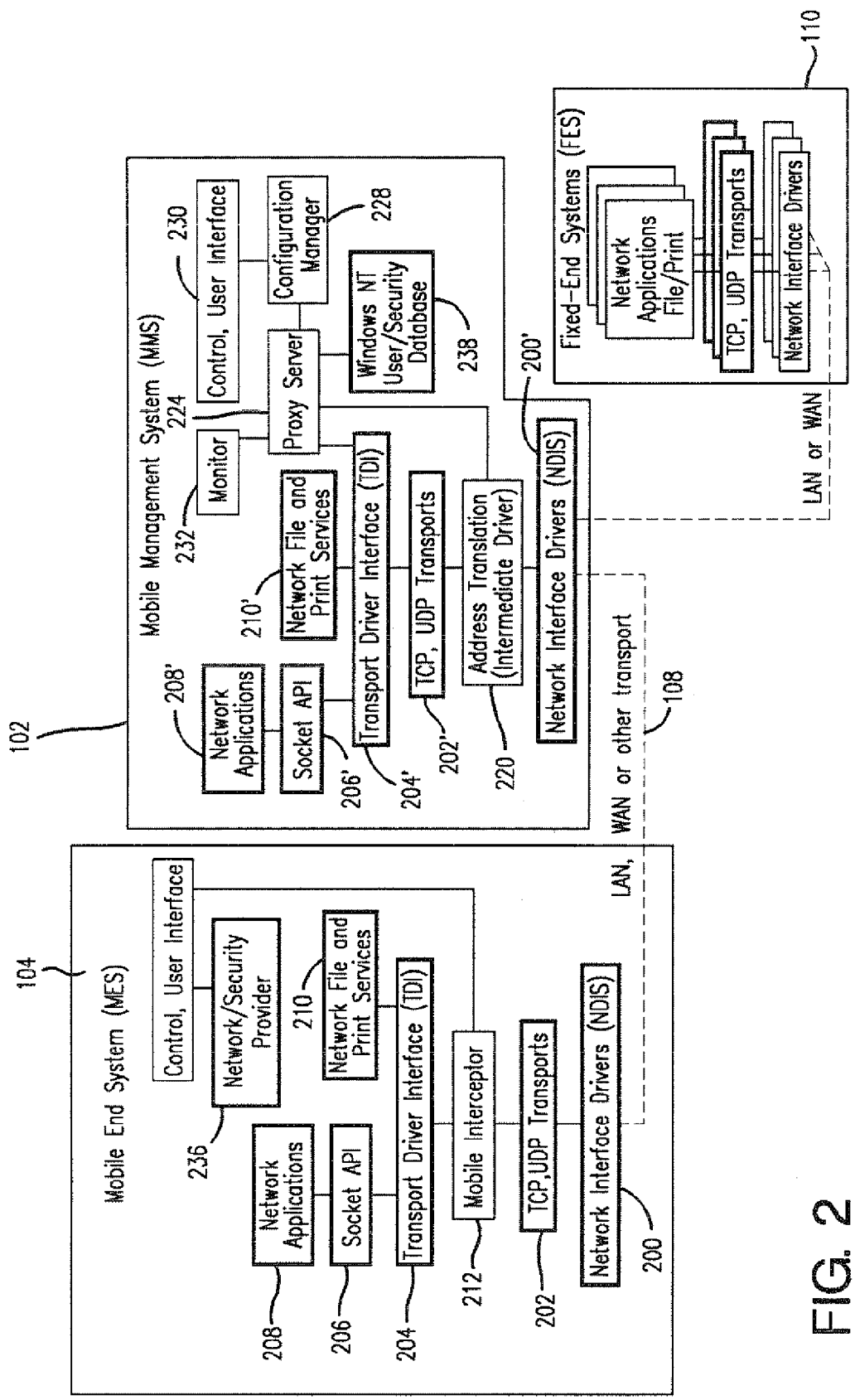
FIG. 2 shows an example software architecture for a Mobile End System and a Mobility Management Server.

FIG. 2 shows an example software architecture for Mobile End System 104 and Mobility Management Server 102. In accordance with one aspect of the present invention, Mobile End System 104 and Mobility Management Server 102 run standard operating system and application software—with only a few new components being added to enable reliable and efficient persistent session connections over an intermittently connected mobile network 108. As shown in FIG. 2, Mobile End System 104 runs conventional operating system software including network interface drivers 200, TCP/UDP transport support 202, a transport driver interface (TDI) 204, and a socket API 206 used to interface with one or more conventional network applications 208. Conventional network file and print services 210 may also be provided to communicate with conventional TDI 204. Server 102 may include similar conventional network interface drivers 200', TCP/UDP transport support 202', a transport driver interface (TDI) 204', and a socket API 206' used to interface with one or more conventional network applications 208'. Mobile End System 104 and Mobility Management Server 102 may each further include conventional security software such as a network/security provider 236 (Mobile End System) and a user/security database 238 (server).

In accordance with the present invention, a new, mobile interceptor component 212 is inserted between the TCP/UDP transport module 202 and the transport driver interface (TDI) 204 of the Mobile End System 104 software architecture. Mobile interceptor 212 intercepts certain calls at the TDI 204 interface and routes them via RPC and Internet Mobility Protocols and the standard TCP/UDP transport protocols 202 to Mobility Management Server 102 over network 108. Mobile interceptor 212 thus can intercept all network activity and relay it to server 102. Interceptor 212 works transparently with operating system features to allow client-side application sessions to remain active when the Mobile End System 104 loses contact with network 108.

While mobile interceptor 212 could operate at a different level than the transport driver interface 204 (e.g., at the socket API level 206), there are advantages in having mobile interceptor 212 operate at the TDI level. Many conventional operating systems (e.g., Microsoft Windows 95, Windows 98, Windows NT and Windows CE, etc.) provide TDI interface 204—thus providing compatibility without any need to change operating system components. Furthermore, because the transport driver interface 204 is normally a kernel level interface, there is no need to switch to user mode—thus realizing performance improvements. Furthermore, mobile interceptor 212 working at the level of TDI interface 204 is able to intercept from a variety of different network applications 208 (e.g., multiple simultaneously running applications) as well as encompassing network file, print and other kernel mode services 210 (which would have to be handled differently if the interceptor operated at the socket API level 206 for example).

Figure 2A:
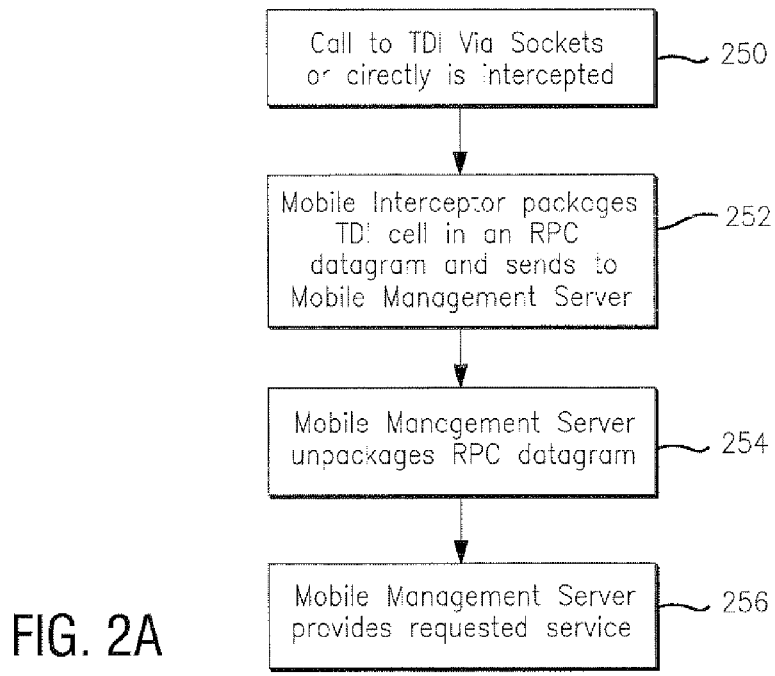
FIG. 2A shows example steps performed to transfer information between a Mobile End System and a Mobility Management Server.

FIG. 2A shows an example high level flowchart of how mobile interceptor 212 works. A call to the TDI interface 204 of Mobile End System 104 (block 250) is intercepted by mobile interceptor 212 (block 252). Mobile interceptor 212 packages the intercepted RPC call in a fragment in accordance with an Internet Mobility Protocol, and sends the fragment as a datagram via a conventional transport protocol such as UDP or TCP over the LAN, WAN or other transport 108 to Mobility Management Server 102 (block 252). The Mobility Management Server 102 receives and unpackages the RPC datagram (block 254), and provides the requested service (for example, acting as a proxy to the Mobile End System application 208 by passing data or a response to a application server process running on Fixed End System 110).

Referring once again to FIG. 2, Mobility Management Server 102 includes an address translator 220 that intercepts messages to/from Mobile End Systems 104 via a conventional network interface driver 222. For example, address translator 230 recognizes messages from an associated session peer (Fixed End System 110) destined for the Mobile End System 104 virtual address. These incoming Mobile End System messages are provided to proxy server 224, which then maps the virtual address and message to previously queued transactions and then forwards the responses back to the current point of presence addresses being used by the associated Mobile End System 104.

As also shown in FIG. 2, Mobility Management Server 102 includes, in addition to address translation (intermediate driver) 220, and proxy server 224, a configuration manager 228, a control/user interface 230 and a monitor 232. Configuration management 228 is used to provide configuration information and parameters to allow proxy server 224 to manage connections. Control, user interface 230 and monitor 232 allow a user to interact with proxy server 224.

Mobile Interceptor

Figure 3:
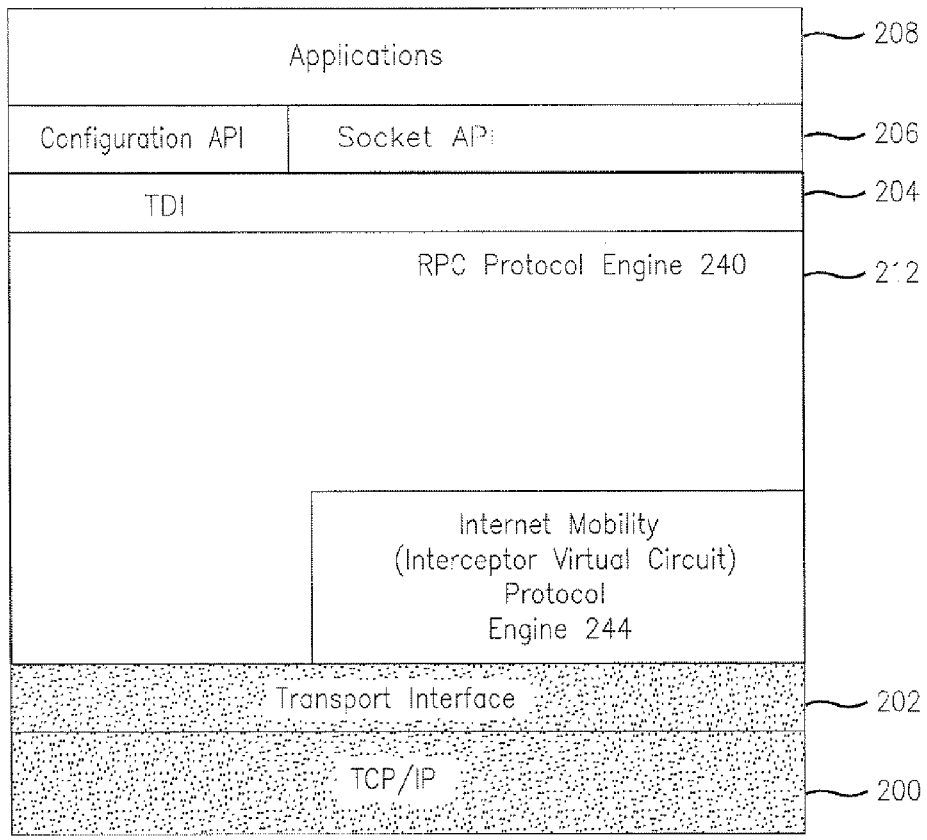
FIG. 3 shows an example mobile interceptor architecture.

FIG. 3 shows an example software architecture for mobile interceptor 212 that support the RPC Protocol and the Internet Mobility Protocol in accordance with the present invention. In this example, mobile interceptor 212 has two functional components:

a Remote Procedure Call protocol engine 240; and
an Internet Mobility Protocol engine 244.

Proxy server 224 running on Mobility Management Server 102 provides corresponding engines 240', 244'.

Mobile interceptor 212 in the preferred embodiment thus supports Remote Procedure Call protocol and Internet Mobility Protocol to connect Mobility Management Server 102 to each Mobile End Systems 104. Remote procedure calls provide a method for allowing a process on a local system to invoke a procedure on a remote system. Typically, the local system is not aware that the procedure call is being executed on a remote system. The use of RPC protocols allows Mobile End Systems 104 to go out of range or suspend operation without losing active network sessions. Since session maintenance does not depend on a customized application, off-the-shelf applications will run without modification in the mobile environment of network 108.

Network applications typically use application-level interfaces such as Windows sockets. A single call to an application-level API may generate several outgoing or incoming data packets at the transport, or media access layer. In prior mobile networks, if one of these packets is lost, the state of the entire connection may become ambiguous and the session must be dropped. In the preferred embodiment of the present invention providing RPCs, the Mobility Management Server 102 and the Mobile End Systems 104 share sufficient knowledge of the connection state to maintain a coherent logical link at all times—even during physical interruption.

The Internet Mobility Protocol provided in accordance with the present invention compensates for differences between wire-line and other less reliable networks such as wireless. Adjusted frame sizes and protocol timing provide significant performance improvements over non-mobile-aware transports—dramatically reducing network traffic. This is important when bandwidth is limited or when battery life is a concern.

The Internet Mobility Protocol provided in accordance with the present invention also ensure the security of organization's data as it passes between the Mobile End System 104 and the Mobility Management Server 102 on the public wire-line networks or airway. The Internet Mobility Protocol provides a basic firewall function by allowing only authenticated devices access to the organizational network. The Internet Mobility Protocol can also certify and encrypt all communications between the mobility management system 102 and the Mobile End System 104.

The Remote Procedure Call protocol engine 240 on Mobile End System 104 of FIG. 3 marshals TDI call parameters, formats the data, and sends the request to the Internet Mobility Protocol engine 244 for forwarding to Mobility Management Server 102 where the TDI Remote Procedure Call engine 240' executes the calls. Mobile End Systems 104 martial TDI call parameters according to the Remote Procedure Call protocol. When the Mobility Management Server 102 TDI Remote Procedure Call protocol engine 240' receives these RPCs, it executes the calls on behalf of the Mobile End System 104. The Mobility Management Server 102 TDI Remote Procedure Call protocol engine 240' shares the complete network state for each connected Mobile End System with the peer Mobile End System 104's RPC engine 240. In addition to performing remote procedure calls on behalf of the Mobile End Systems 104, the server RPC engine 240' is also responsible for system flow control, remote procedure call parsing, virtual address multiplexing (in coordination with services provided by address translator 220), remote procedure call transaction prioritization, scheduling, and coalescing.

The Internet Mobility Protocol engine 244 performs reliable datagram services, sequencing, fragmentation, and re-assembly of messages. It can, when configured, also provide authentication, certification, data encryption and compression for enhanced privacy, security and throughput. Because the Internet Mobility Protocol engine 244 functions in power-sensitive environments using several different transports, it is power management aware and is transport independent.

Figure 3A:
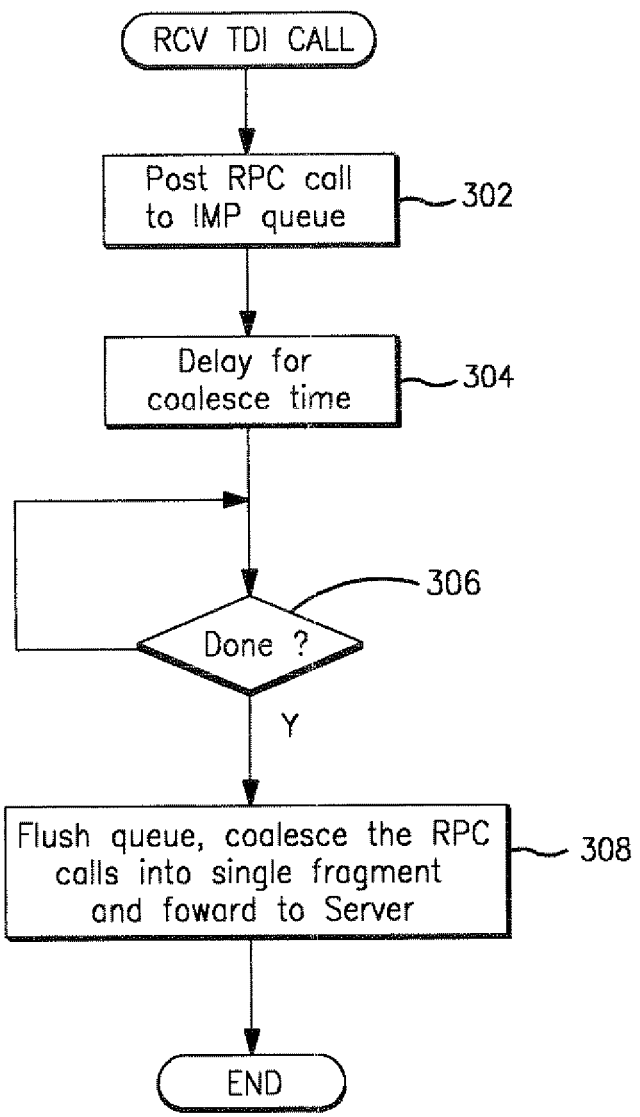
FIG. 3A is a flowchart of example steps performed by the mobile interceptor.

FIG. 3A shows an example process mobile interceptor 212 performs to communicate a TDI call to Mobility Management Server 102. Generally, the mobile interceptor RPC protocol engine 240 forwards marshaled TDI calls to the Internet Mobility Protocol engine 244 to be transmitted to the Mobility Management Server 102. RPC protocol engine 240 does this by posting the RPC call to a queue maintained by the Internet Mobility Protocol engine 244 (block 302). To facilitate bandwidth management, the Internet Mobility Protocol engine 244 delays sending received RPC calls for some period of time ("the RPC coalesce time out period") (block 304). Typically, the RPC coalesce timeout is set between five and fifteen milliseconds as one example but is user configurable. This delay allows the RPC engine 240 to continue posting TDI calls to the Internet Mobility Protocol engine 244 queue so that more than one RPC call can be transmitted to the Mobility Management Server 102 in the same datagram (fragment).

When the coalesce timer expires, or the RPC protocol engine 240 determines that it will not be receiving more RPC calls (decision block 306), the RPC engine provides the Internet Mobility Protocol engine 244 with a request to flush the queue, coalesce the RPC calls into a single frame, and forward the frame to its peer (block 308). This coalescing reduces the number of transmissions—enhancing protocol performance.

Figure 3B:
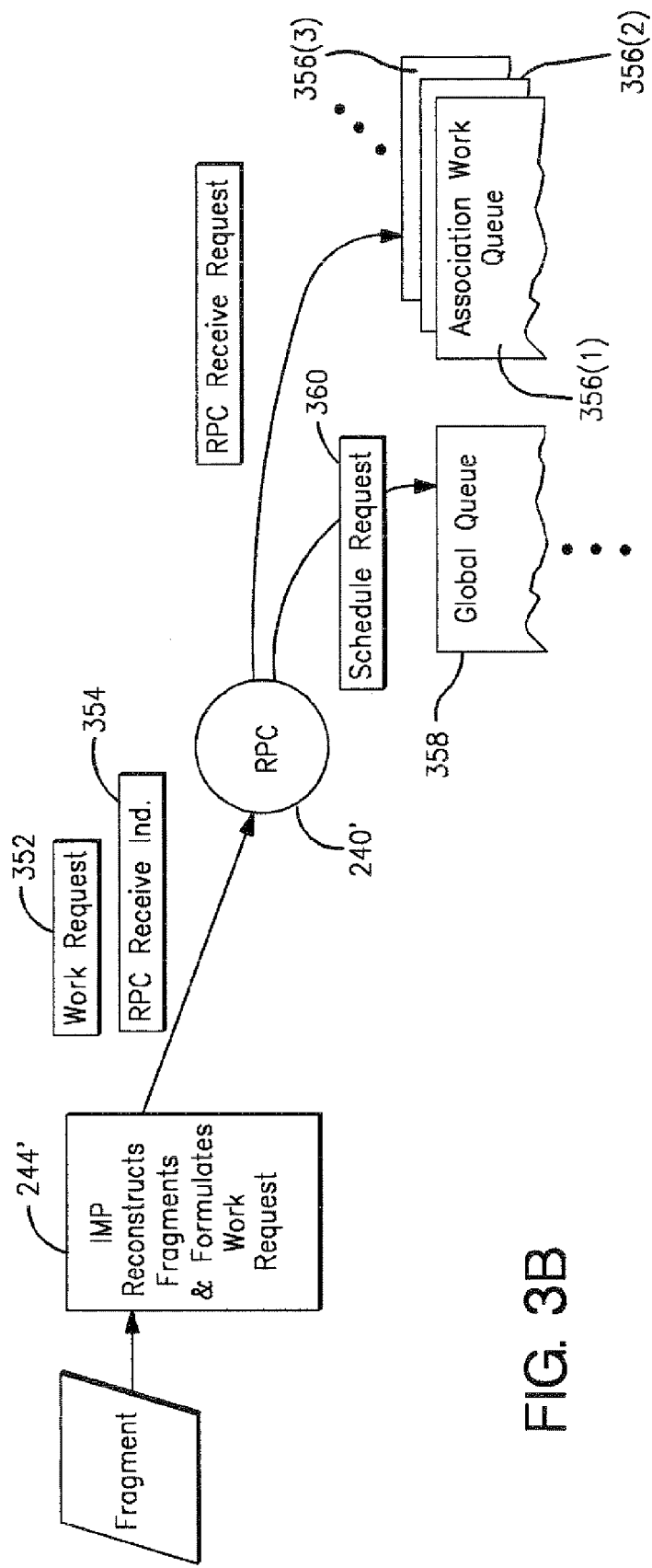
FIG. 3B is a flowchart of example steps performed by an RPC engine to handle RPC work requests.

As mentioned above, Mobility Management Server 102 proxy server also has an RPC protocol engine 212' and an Internet Mobility Protocol engine 244'. FIG. 3B shows an example process performed by Mobility Management Server 102 upon receipt of an Internet Mobility Protocol message frame from Mobile End System 104. Once the frame is received by the Mobility Management Server 102, the Internet Mobility Protocol engine 244' reconstructs the frame if fragmented (due to the maximum transmission size of the underlying transport) and then demultiplexes the contents of the message to determine which Mobile End System 104 it was received from. This demultiplexing allows the Internet Mobility Protocol 244' to provide the Remote Procedure Call engine 240' with the correct association-specific context information.

The Internet Mobility Protocol engine 244' then formulates the received message into a RPC receive indication system work request 354, and provides the Mobility Management Server 102 RPC engine 240' with the formulated work request and association-specific context information. When RPC protocol engine 240' receives work request 352, it places it into an association-specific work queue 356, and schedules the association to run by providing a scheduled request to a global queue 358. The main work thread of RPC engine 240' is then signaled that work is available. Once the main thread is awake, it polls the global queue 358 to find the previously queued association scheduled event. It then de-queues the event and beings to process the association-specific work queue 356.

On the association specific work queue 356 it finds the previously queued RPC receive indication work request The main thread then de-queues the RPC receive indication work request 356 and parses the request. Because of the coalescing described in connection with FIG. 3A, the Mobility Management Server 102 often receives several RPC transactions bundled in each datagram. It then demultiplexes each RPC transaction back into distinct remote procedure calls and executes the requested function on behalf of Mobile End System 104. For performance purposes RPC engine 240' may provide a look ahead mechanism during the parsing process of the RPC messages to see if it can execute some of the requested transactions concurrently (pipelining).

How RPC Protocol Engine 240' Runs RPC Associations

Figure 4:
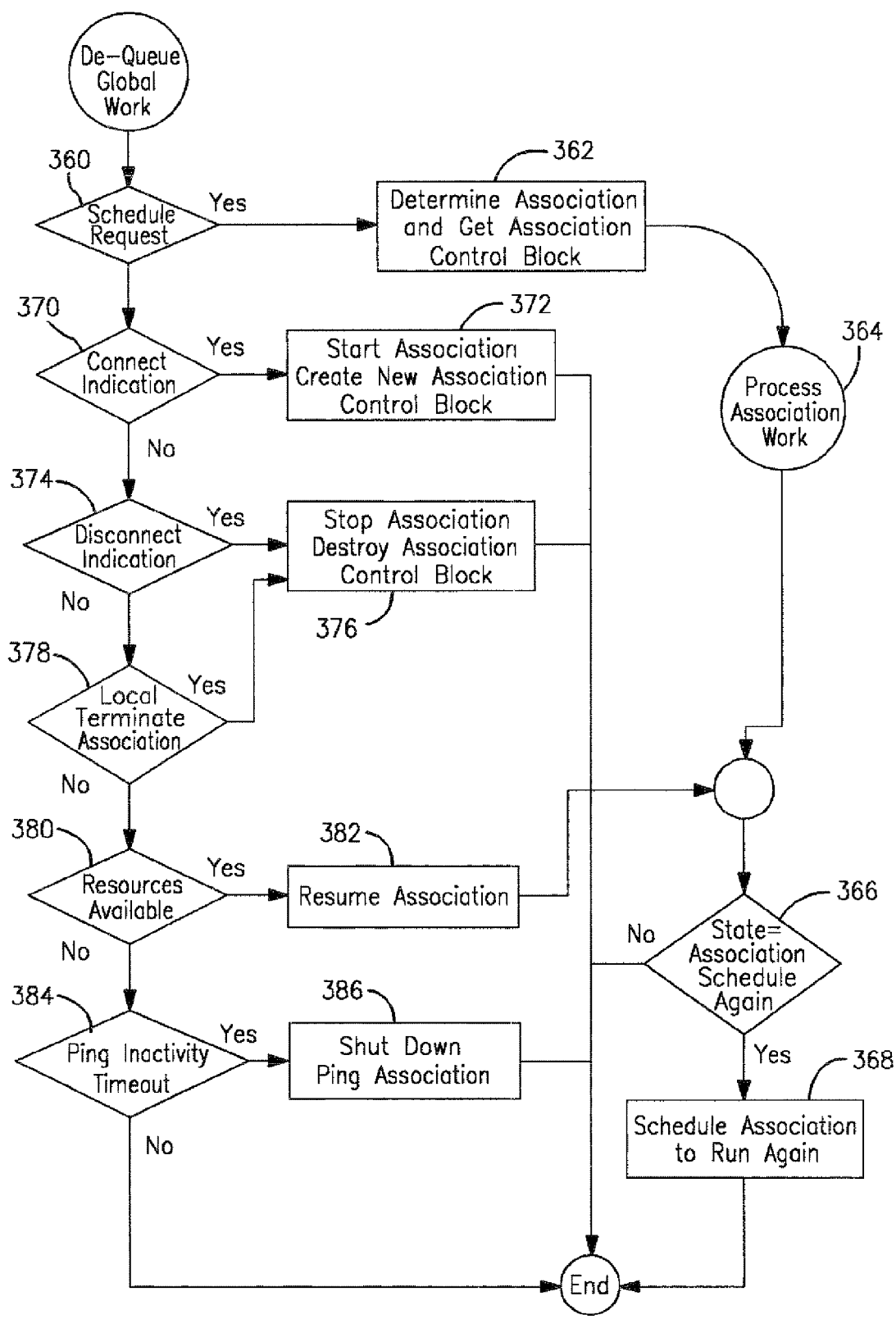
FIGS. 4-5C are flowcharts of example steps to process RPC work requests.

FIG. 4 is a flowchart of an example process for running RPC associations placed on an association work queue 356. When an RPC association is scheduled to run, the main thread for the RPC protocol engine 240' (which may be implemented as a state machine) de-queues the work request from global work queue 358 and determines the type of work request.

There are six basic types of RPC work requests in the preferred embodiment:
  schedule request;
  connect indication
  disconnect indication
  local terminate association
  "resources available" request; and
  ping inactivity timeout.

RPC protocol engine 240' handles these various types of requests differently depending upon its type. RPC protocol engine 240' tests the request type (indicated by information associated with the request as stored on global queue 358) in order to determine how to process the request.

If the type of work request is a "schedule request" (decision block 360), the RPC engine 240' determines which association is being scheduled (block 362). RPC engine 240' can determine this information from what is stored on global queue 358. Once the association is known, RPC engine 240' can identify the particular one of association work queues 356(1) . . . 356(n) the corresponding request is stored on. RPC engine 240 retrieves the corresponding association control block (block 362), and calls a Process Association Work task 364 to begin processing the work in a specific association's work queue 356 as previously noted.

FIG. 5 shows example steps performed by the "process association work" task 364 of FIG. 4. Once the specific association has been determined, this "process association work" task 364 is called to process the work that resides in the corresponding association work queue 356. If the de-queued work request (block 390) is an RPC receive request (decision block 392), it is sent to the RPC parser to be processed (block 394). Otherwise, if the de-queued work request is a pending receive request (decision block 396), the RPC engine 240' requests TDI 204' to start receiving data on behalf of the application's connection (block 398). If the de-queued work request is a pending connect request (decision block 400), RPC engine 240' requests TDI 204' to issue an application specified TCP (or other transport protocol) connect request (block 402). It then waits for a response from the TDI layer 204'. Once the request is completed by TDI 204', its status is determined and then reported back to the original requesting entity. As a performance measure, RPC engine 240' may decide to retry the connect request process some number of times by placing the request back on the associations-specific work queue (356) before actually reporting an error back to the requesting peer. This again is done in an effort to reduce network bandwidth and processing consumption.

The above process continues to loop until a "scheduling weight complete" test (block 404) is satisfied. In this example, a scheduling weight is used to decide how many work requests will be de-queued and processed for this particular association. This scheduling weight is a configuration parameter set by configuration manager 228, and is acquired when the association connect indication occurs (FIG. 4, block 372). This value is configurable based on user or the physical identification of the machine.

Once the RPC engine is finished with the association work queue 356 (for the time at least), it may proceed to process dispatch queues (block 406) (to be discussed in more detail below). If, after processing work on the association's work queue 356, more work remains in the association work queue, the RPC engine 240' will reschedule the association to run again at a later time by posting a new schedule request to the global work queue 358 (FIG. 4, decision block 366, block 368; FIG. 5, decision block 408, block 410).

Referring once again to FIG. 4, if the RPC work request is a "connect indication" (decision block 370), RPC engine 240' is being requested to instantiate a new association with a mobile peer (usually, but not always, the Mobile End System 104). As one example, the connect indication may provide the RPC engine 240' with the following information about the peer machine which is initiating the connection:
  physical identifier of the machine,
  name of the user logged into the machine,
  address of the peer machine, and
  optional connection data from the peer RPC engine 240.

Figure 5A:
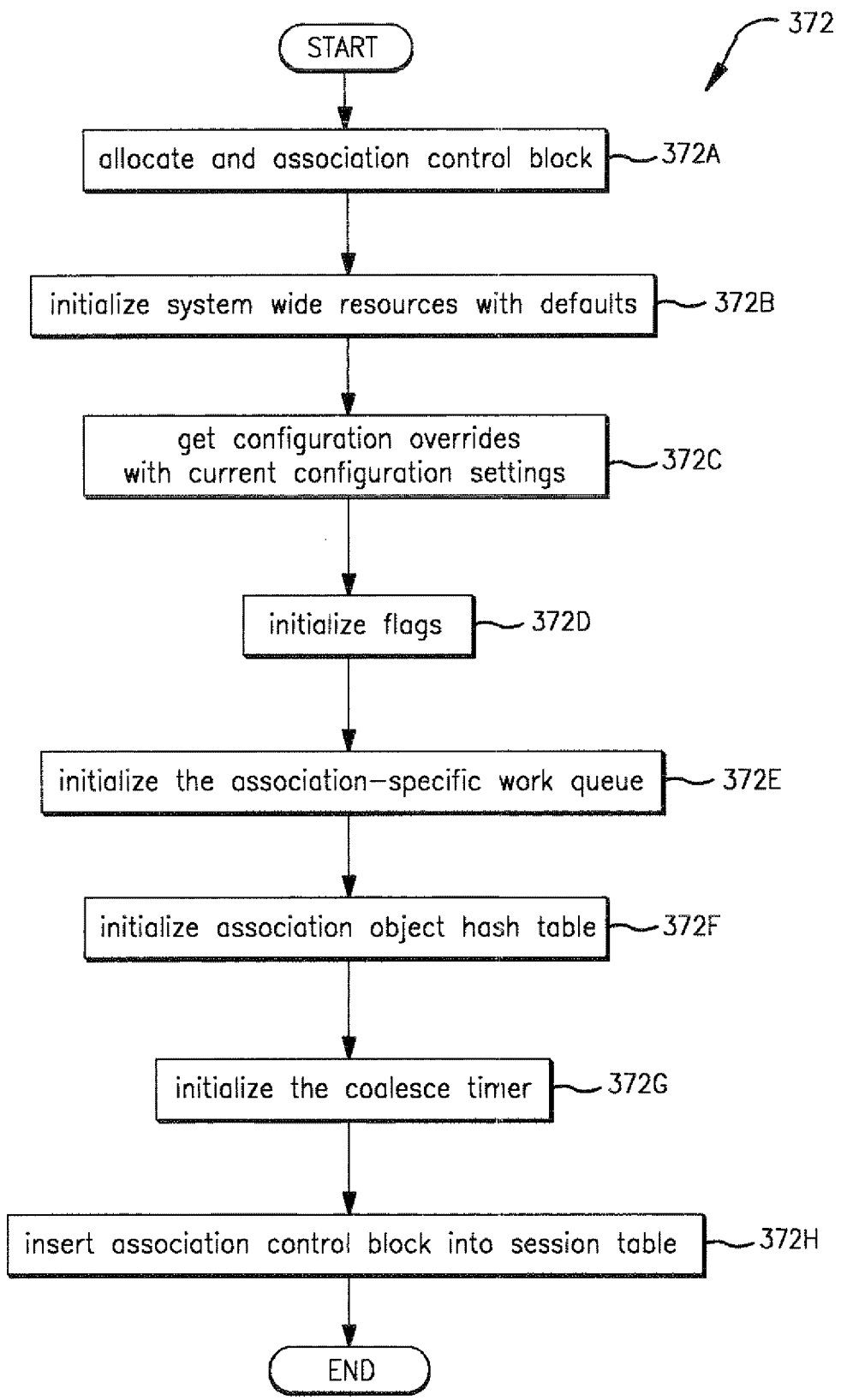

In response to the connect indication (decision block 370), the RPC engine 240 calls the configuration manager 228 with these parameters. Configuration manager 228 uses these parameters to determine the exact configuration for the new connection. The configuration (e.g., association scheduling weight and the list of all applications that require non-default scheduling priorities along with those priorities) is then returned to the RPC engine 240' for storage and execution. RPC engine 240' then starts the new association, and creates a new association control block (block 372). As shown in FIG. 5A the following actions may be taken:
  allocate an association control block (block 372A);
  initialize system wide resources with defaults (block 372B);
  get configuration overrides with current configuration settings (block 372C);
  initialize flags (block 372D);
  initialize the association-specific work queue (block 372E);
  initialize association object hash table (block 372F);
  initialize the coalesce timer (block 372G); and
  insert association control block into session table (block 372H).

Figure 5B:
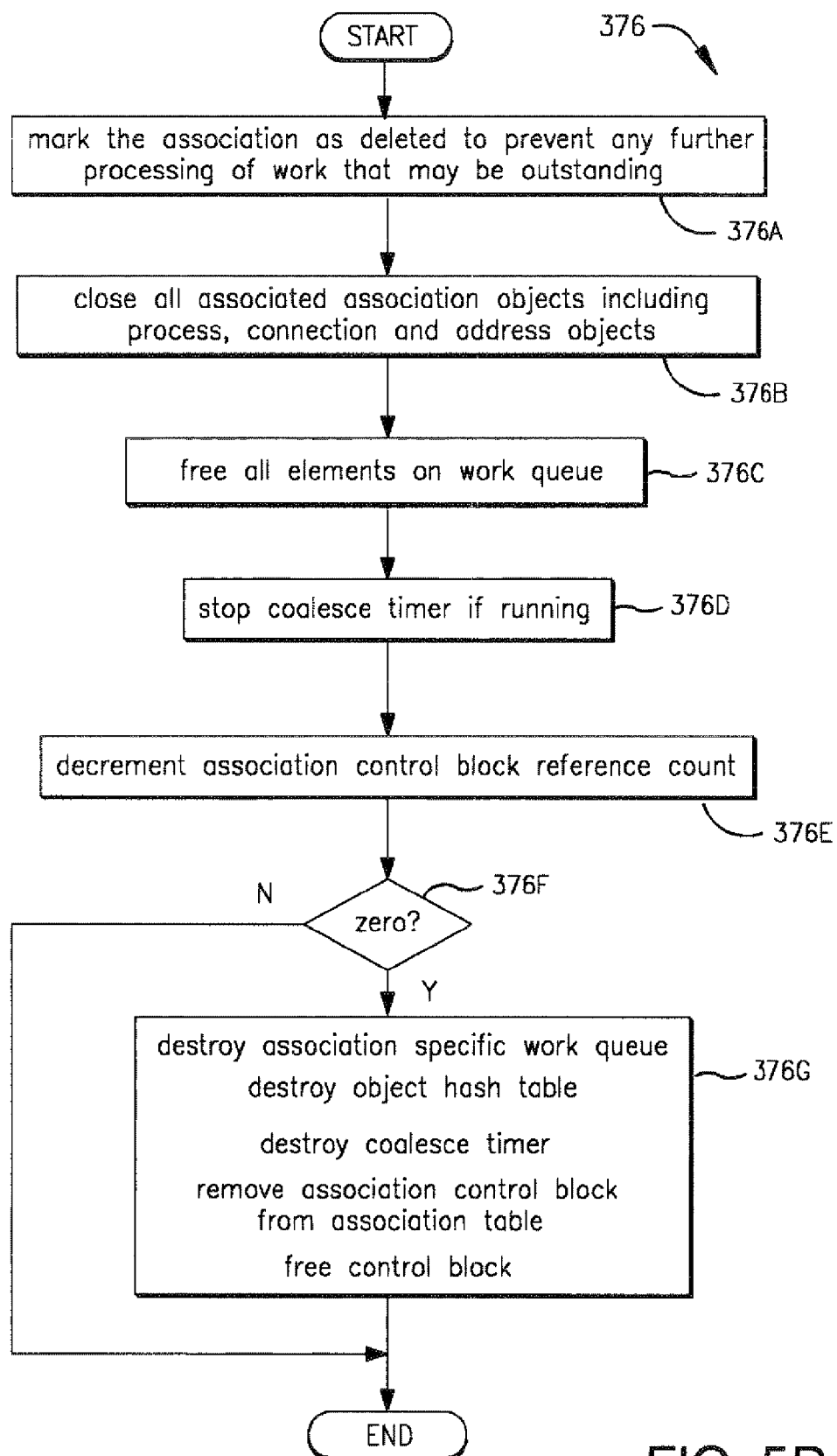

A "disconnect indication" is issued by the Internet Mobility Protocol engine 244' to the RPC engine 240' when the Internet Mobility Protocol engine has determined that the association must be terminated. The RPC engine 240' tests for this disconnect indication (block 374), and in response, stops the association and destroys the association control block (block 376). As shown in FIG. 5B, the following steps may be performed:

- mark the association as deleted to prevent any further processing of work that may be outstanding (block 376A);
- close all associated association objects including process, connection and address objects (block 376B);
- free all elements on work queue (block 376C);
- stop coalesce timer if running (block 376D);
- decrement association control block reference count (block 376E); and
- if the reference count is zero (tested for by block 376F):
- destroy association specific work queue,
- destroy object hash table,
- destroy coalesce timer,
- remove association control block from association table, and
- free control block (376G).

A "terminate session" request is issued when system 102 has determined that the association must be terminated. This request is issued by the system administrator, the operating system or an application. RPC engine 240' handles a terminate session request in the same way it handles a disconnect request (decision block 378, block 376).

Figure 5C:
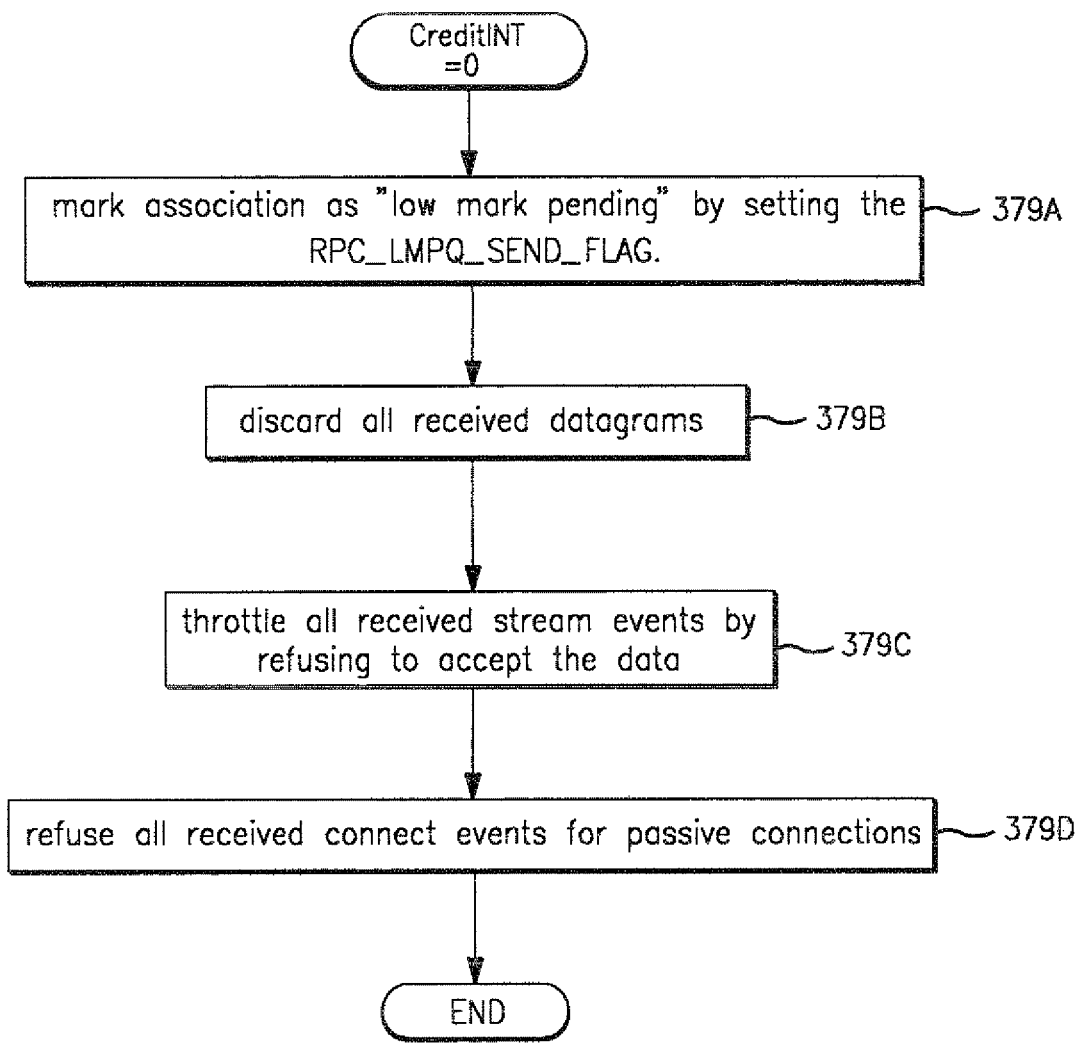

In the preferred embodiment, the interface between the RPC engine 240' and the Internet Mobility Protocol engine 244' specifies a flow control mechanism based on credits. Each time one thread posts a work request to another thread, the called thread returns the number of credits left in the work queue. When a queue becomes full, the credit count goes to zero. By convention, the calling thread is to stop posting further work once the credit count goes to zero. Therefore, it is necessary to have a mechanism to tell the calling thread that "resources are available" once the queued work is processed and more room is available by some user configurable/pre-determined low-water mark in the queue. This is the purpose of the "resources available" work indication (tested for by decision block 380). As shown in FIG. 5C, the following steps may be performed when the credit count goes to zero:

- mark association as "low mark pending" by setting the RPC_LMPQ_SEND_FLAG (block 379A). Once in this state:
- all received datagrams are discarded (block 379B);
- all received stream events are throttled by refusing to accept the data (block 379C) (this causes the TCP or other transport receive window to eventually close, and provides flow control between the Fixed End System 110 and the Mobility Management Server 102; before returning, the preferred embodiment jams a "pending receive request" to the front of the association specific work queue 356 so that outstanding stream receive event processing will continue immediately once resources are made available).
- all received connect events are refused for passive connections (block 379D).

When the "resources available" indication is received by the RPC engine 240' (FIG. 4, decision block 380), the RPC engine determine whether the association has work pending in its associated association work queue 356; if it does, the RPC engine marks the queue as eligible to run by posting the association to the global work queue 358 (block 382). If a pending receive request has been posted during the time the association was in the low mark pending state, it is processed at this time (in the preferred embodiment, the RPC engine 240' continues to accept any received connect requests during this processing).

Referring once again to FIG. 4, if RPC engine 240' determines that the Mobility Management Server 102 channel used for "ping" has been inactive for a specified period of time (decision block 384), the channel is closed and the resources are freed back to the system to be used by other processes (block 386).

RPC Parsing and Priority Queuing

Figure 6:
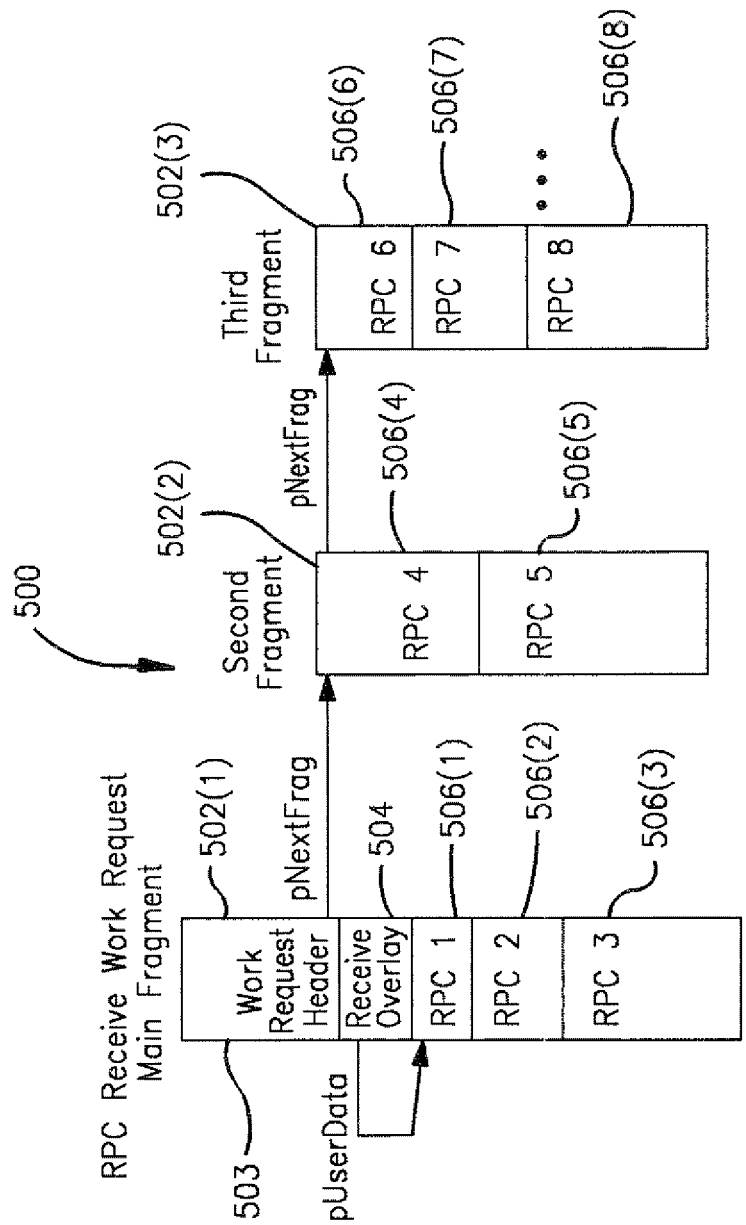
FIG. 6 is a diagram of an example received work request.

Referring back to FIG. 5, it was noted above that RPC engine parsed an RPC receive request upon receipt (see blocks 392, block 394). Parsing is necessary in the preferred embodiment because a single received datagram can contain multiple RPC calls, and because RPC calls can span multiple Internet Mobility Protocol datagram fragments. An example format for an RPC receive work request 500 is shown in FIG. 6. Each RPC receive work request has at least a main fragment 502(1), and may have any number of additional fragments 502(2) . . . 502(N). Main fragment 502(1) contains the work request structure header 503 and a receive overlay 504. The receive overlay 504 is a structure overlay placed on top of the fragment 502(1) by the Internet Mobility Protocol engine 244. Within this overlay 504 is a structure member called pUserData that points to the first RPC call 506(1) within the work request 500.

The FIG. 6 example illustrates a work request 500 that contains several RPC calls 506(1), 506(2) . . . 506(8). As shown in the FIG. 6 example, an RPC work request 500 need not be contained in a contiguous block of memory or in a single fragment 502. In the example shown, a second fragment 502(2) and a third fragment 502(3) that are chained together to the main fragment 502(1) in a linked list.

Thus, RPC parser 394 in this example handles the following boundary conditions:

- each RPC receive request 500 may contain one or more RPC calls;
- one or more RPC calls 506 may exist in a single fragment 502;
- each RPC call 506 may exist completely contained in a fragment 502; and
- each RPC call 506 may span more than one fragment 502.

Figure 7:
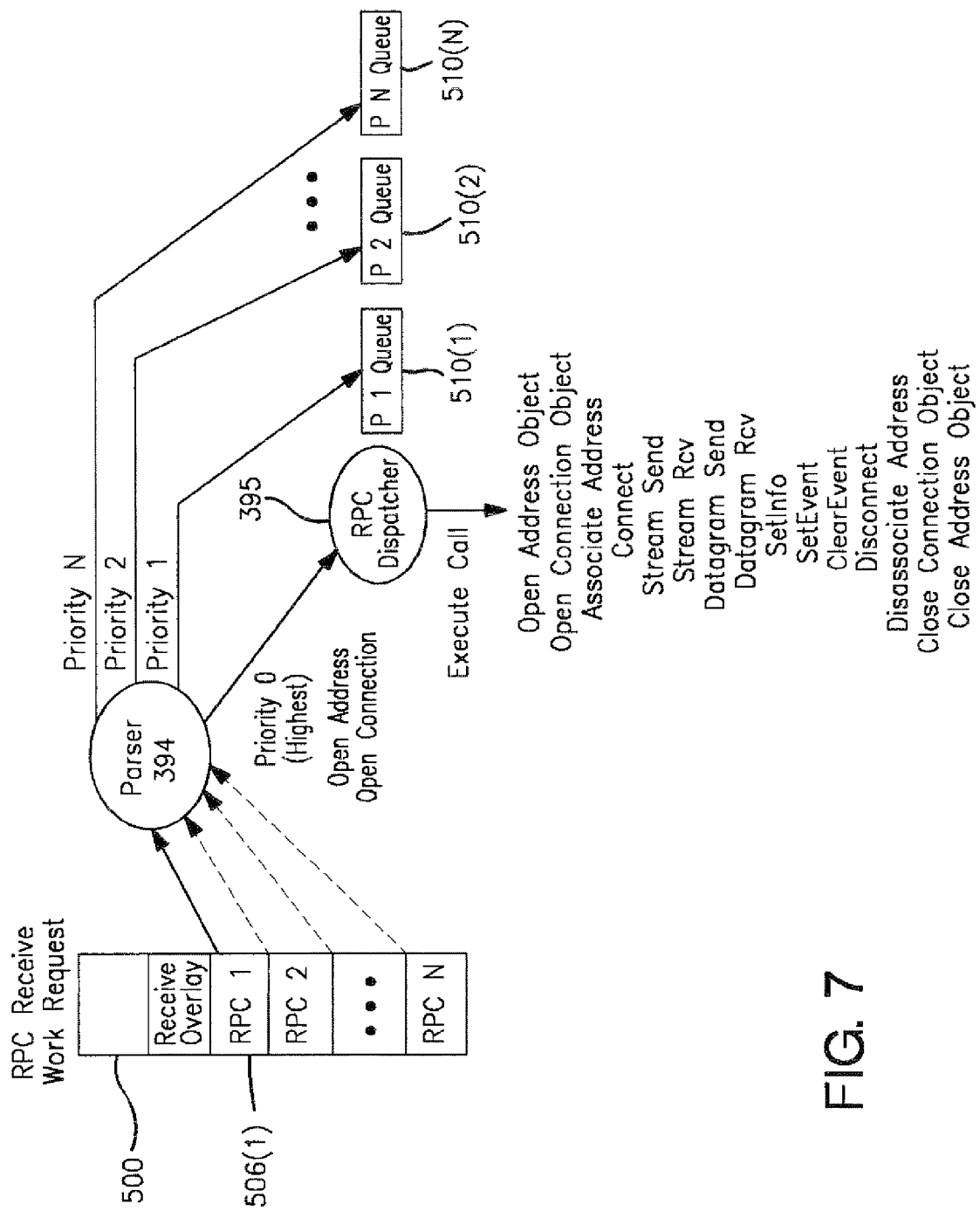
FIG. 7 is a diagram showing how a received work request can be dispatched onto different priority queues.

FIG. 7 shows an example RPC parser process 394 to parse an RPC receive work request 500. In this example, the RPC parser 394 gets the first fragment 502(1) in the work request, gets the first RPC call 506(1) in the fragment, and parses that RPC call. Parser 394 proceeds through the RPC receive work request 500 and processes each RPC call 506 in turn. If the number of fragment bytes remaining in the RPC receive work request 500 fragment 502(1) is greater than the size of the RPC header 503, parser 394 determines whether the RPC call is fully contained within the RPC fragment 502 and thus may be processed (this may be determined by testing whether the RPC call length is greater than the number of fragment bytes remaining). If the RPC call type is a chain exception, then the RPC call will handle the updating of the RPC parser 394 state. In the proxy server 224, the only RPC calls using the chain exception are the "datagram send" and "stream send" calls. This chain exception procedure is done to allow the RPC engine to avoid fragment copies by chaining memory descriptor lists together for the purpose of RPC send calls.

Once the parser 394 identifies an RPC call type, a pointer to the beginning of the RPC information is passed to the RPC engine 240 for execution. The RPC engine divides all TDI procedure calls into different priorities for execution. The highest priority calls are immediately executed by passing them to an RPC dispatcher 395 for immediate execution. All lower priority calls are dispatched to dispatch queues 510 for future processing. Each dispatch queue 510 represents a discrete priority.

In the preferred embodiment, mobile applications call the "open address" object and "open connection" object functions before executing other TDI networking functions. Therefore, the system assigns application level priorities during the "open address" object and "open connection" object calls. In the example embodiment, once an address or connection object is assigned a priority, all calls that are associated with that object are executed within that assigned priority.

If, for example, the RPC call is a TDI Open Address Object request or a TDI Open Connection Object Request, it is sent to the RPC dispatcher 395 for immediate execution. The Open Address and Open Connection object RPC calls provide access to a process ID or process name that are used to match against the information provided by the configuration manager 228 during the configuration requests that occurs within the association connect indication described earlier. This is used to acquire configuration for the address or connection object.

In the preferred embodiment, all RPC calls have at least an address object or connection object as a parameter. When the call is made, the priority assigned to that specific object is used as the priority for the RPC call. The configuration assigned to the address or connection object determines which priority all associated RPC calls will be executed in. For example, if the assigned priority is "high," all RPC calls will be executed immediately without being dispatched to a dispatch queue 510. If the assigned priority is "1," all RPC calls will be placed into dispatch queue 510(1).

Figure 8:
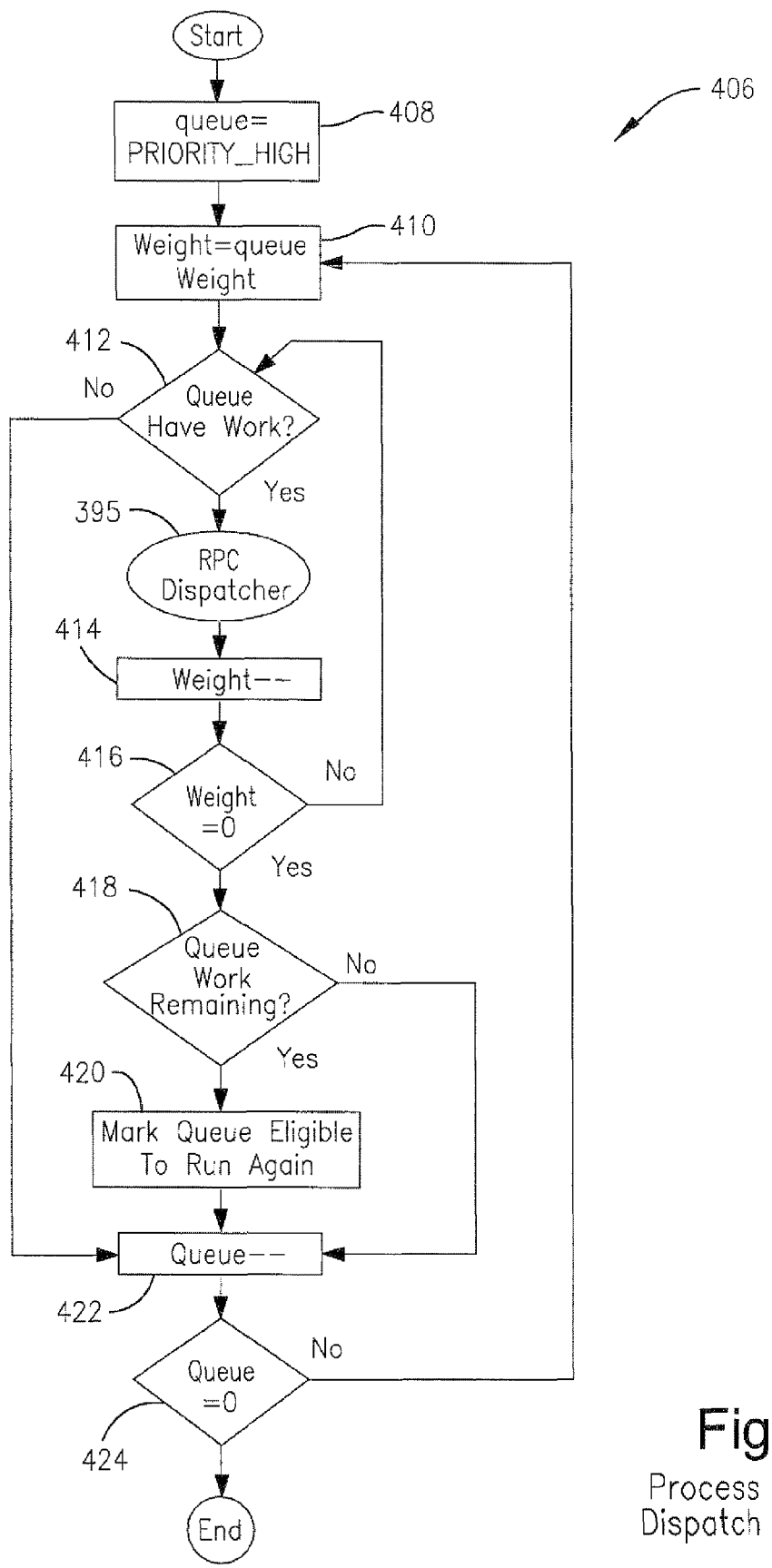
FIGS. 8 and 9 show processing of the contents of the different priority queues.

Referring once again to FIG. 5, once the "process association work" task 364 process has completed executing its scheduled amount of association work (decision block 404), it checks to see if the dispatch queues require servicing (block 406). FIG. 8 is a flowchart of example steps performed by the "process dispatch queues" block 406 of FIG. 5 to process the dispatch queues 510 shown in FIG. 7.

In this example, dispatch queues 510 are processed beginning with the highest priority queue (510(1) in this example) (block 408). Each queue 510 is assigned a weight factor. The weight factor is a configuration parameter that is returned by the configuration manager 228 when a Mobile End System 104 to Mobility Management Server 102 association is created. As one example, low priority dispatch queues 510 can have a weight factor of 4, and medium priority queues can have a weight factor of 8. High priority RPC calls do not, in this example, use weight factors because they are executed immediately as they are parsed.

RPC engine 240' loops through the de-queuing of RPC calls from the current queue until either the queue is empty or the queue weight number of RPC calls has been processed (blocks 412-416). For each de-queued RPC call, the RPC dispatcher 395 is called to execute the call. The RPC dispatcher 395 executes the procedural call on behalf of the Mobile End System 104, and formulates the Mobile End System response for those RPC calls that require responses.

If, after exiting the loop, the queue still has work remaining (decision block 418), the queue will be marked as eligible to run again (block 420). By exiting the loop, the system yields the processor to the next lower priority queue (blocks 424, 410). This ensures that all priority levels are given an opportunity to run no matter how much work exists in any particular queue. The system gets the next queue to service, and iterates the process until all queues have been processed. At the end of processing all queues, the system tests to see if any queues have been marked as eligible to run—and if so, the association is scheduled to run again by posting a schedule request to the global work queue. The association is scheduled to run again in the "process global work" routine shown in FIG. 4 above. This approach yields the processor to allow other associations that have work to process an opportunity run. By assigning each queue a weight factor, the system may be tuned to allow different priority levels unequal access to the Mobility Management Server 102's CPU. Thus, higher priority queues are not only executed first, but may also be tuned to allow greater access to the CPU.

Mobility Management Server RPC Responses

The discussion above explains how remote procedure calls are sent from the Mobile End System 104 to the Mobility Management Server 102 for execution. In addition to this type of RPC call, the Mobility Management Server 102 RPC engine 240' also supports RPC events and RPC receive responses. These are RPC messages that are generated asynchronously as a result of association specific connection peer activity (usually the Fixed End System 110). Mobility Management Server 102 RPC engine 240' completes RPC transactions that are executed by the RPC dispatcher 395. Not all RPC calls require a response on successful completion. Those RPC calls that do require responses on successful completion cause the RPC dispatcher 395 to build the appropriate response and post the response to the Internet Mobile Protocol engine 244' to be returned to the peer Mobile End System 104. All RPC calls generate a response when the RPC call fails (the RPC receive response is the exception to above).

RPC events originate as a result of network 108 activity by the association specific connection (usually the Fixed End System 110). These RPC event messages are, in the preferred embodiment, proxied by the Mobility Management Server 102 and forwarded to the Mobile End System 104. The preferred embodiment Mobility Management Server 102 supports the following RPC event calls:

Disconnect Event (this occurs when association-specific connected peer (usually the Fixed End System 110) issues a transport level disconnect request; the disconnect is received by the proxy server 224 on behalf of the Mobile End System 104, and the proxy server then transmits a disconnect event to the Mobile End System);

Stream Receive Event (this event occurs when the association-specific connected peer (usually the Fixed End System 110) has sent stream data to the Mobile End System 104; the proxy server 224 receives this data on behalf of the Mobile End System 104, and sends the data to the Mobile End System in the form of a Receive Response);

Receive Datagram Event (this event occurs when any association-specific portal receives datagrams from a network peer (usually the Fixed End System 110) destined for the Mobile End System 104 through the Mobility Management Server 102; the proxy server 224 accepts these datagrams on behalf of the Mobile End System, and forwards them to the Mobile End System in the form of receive datagram events; and Connect Event (this event occurs when the association-specific listening portal receives a transport layer connect request (usually from the Fixed End System 110) when it wishes to establish a transport layer end-to-end connection with a Mobile End System 104; the proxy server 224 accepts the connect request on behalf of the Mobile End System, and then builds a connect event RPC call and forwards it to the Mobile End System).

Figure 9:
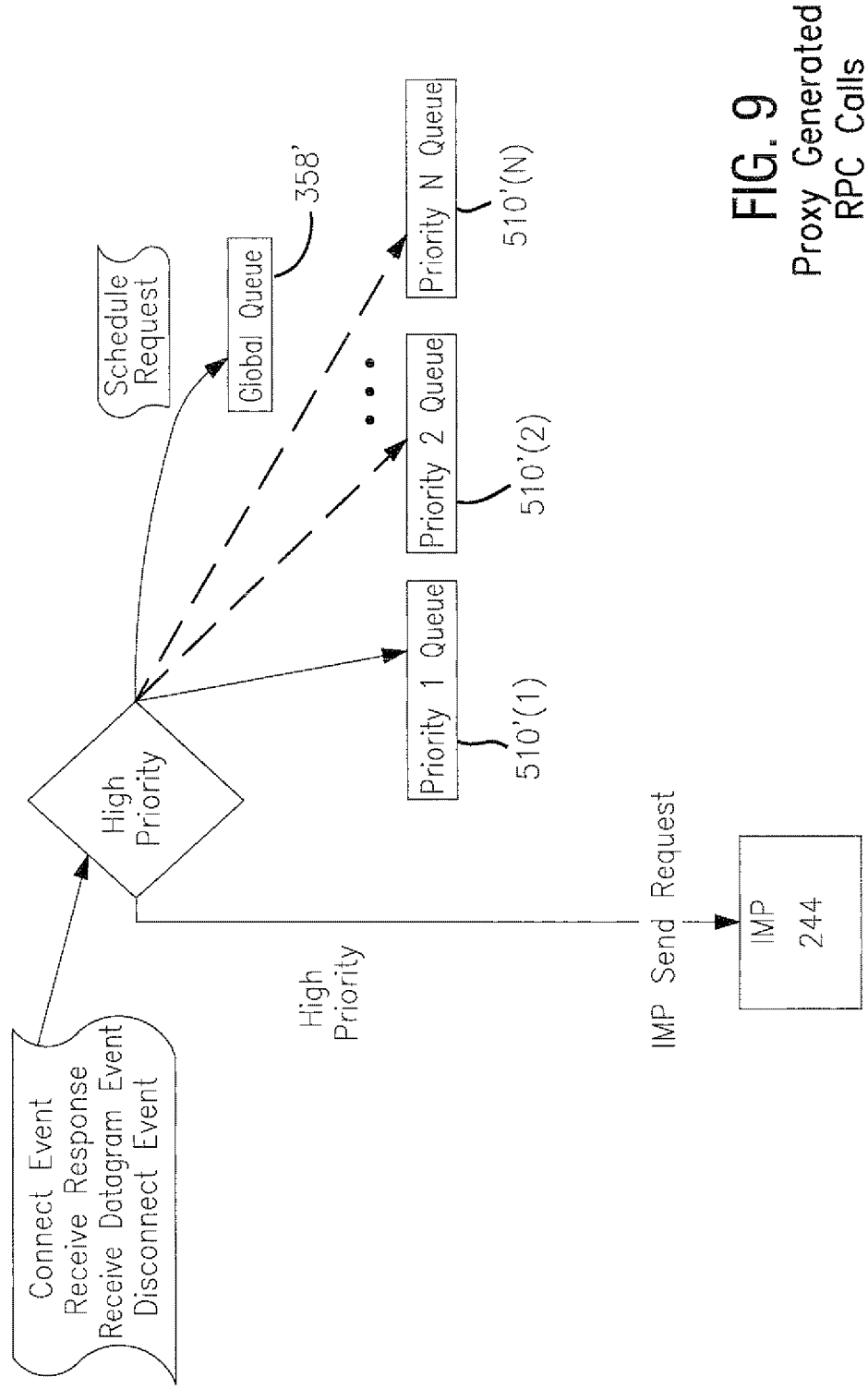

FIG. 9 shows how the RPC engine 240' handles proxy server-generated RPC calls. For high priority address and connection objects, the RPC engine 240' dispatches a send request to the Internet Mobility Protocol engine 244' immediately. The send request results in forwarding the RPC message to the peer Mobile End System 104. For lower priority objects, the Internet Mobility Protocol engine 244 send request is posted to an appropriate priority queue 510'. If the association is not scheduled to run, a schedule request is also posted to the global queue 358'. The Internet Mobility Protocol send request is finally executed when the dispatch queues are processed as described earlier in connection with FIGS. 5 & 8.

Internet Mobility Protocol

Internet Mobility Protocol provided in accordance with the present invention is a message oriented connection based protocol. It provides guaranteed delivery, (re)order detection, and loss recovery. Further, unlike other conventional connection oriented protocols (i.e. TCP), it allows for multiple distinct streams of data to be combined over a single channel; and allows for guaranteed, unreliable, as well as new message oriented reliable data to traverse the network through the single virtual channel simultaneously. This new message oriented level of service can alert the requester when the Internet Mobility Protocol peer has acknowledged a given program data unit.

The Internet Mobility Protocol provided in accordance with the present invention is designed to be an overlay on existing network topologies and technologies. Due to its indifference to the underlying network architecture, it is transport agnostic. As long as there is a way for packetized data to traverse between two peers, Internet Mobility Protocol can be deployed. Each node's network point of presence (POP) or network infrastructure can also be changed without affecting the flow of data except where physical boundary, policy or limitations of bandwidth apply.

With the help of the layer above, Internet Mobility Protocol coalesces data from many sources and shuttles the data between the peers using underlying datagram facilities. As each discrete unit of data is presented from the upper layer, Internet Mobility Protocol combines into a single stream and subsequently submits it for transmission. The data units are then forwarded to the peer over the existing network where upon reception, with the help from the layer above, the stream is demultiplexed back into multiple distinct data units. This allows for optimum use of available bandwidth, by generating the maximum sized network frames possible for each new transmission. This also has the added benefit of training the channel once for maximum bandwidth utilization and have its parameters applied to all session level connections.

In rare instances where one channel is insufficient, the Internet Mobility Protocol further allows multiple channels to be established between the peers—thus allowing for data prioritization and possibly providing a guaranteed quality of service (if the underlying network provides the service).

The Internet Mobility Protocol also provides for dynamically selectable guaranteed or unreliable levels of service. For example, each protocol data unit that is submitted for transmission can be queued with either a validity time period or a number of retransmit attempts or both. Internet Mobility Protocol will expire a data unit when either threshold is reached, and remove it from subsequent transmission attempts.

Internet Mobility Protocol's additional protocol overhead is kept minimal by use of variable length header. The frame type and any optional fields determine the size of the header. These optional fields are added in a specific order to enable easy parsing by the receiving side and bits in the header flag field denote their presence. All other control and configuration information necessary for the peers to communicate can be passed through the in-band control channel. Any control information that needs to be sent is added to the frame prior to any application level protocol data unit. The receiving side processes the control information and then passes the rest of the payload to the upper layer.

Designed to run over relatively unreliable network links where the error probability is relatively high, Internet Mobility Protocol utilizes a number of techniques to insure data integrity and obtain optimum network performance. To insure data integrity, a Fletcher checksum algorithm is used to detect errant frames. This algorithm was selected due to the fact of its efficiency as well as its detection capability. It can determine not only bit errors, but also bit reordering.

Sequence numbers are used to insure ordered delivery of data. Internet Mobility Protocol sequence numbers do not, however, represent each byte of data as in TCP. They represent a frame of data that can be, in one example implementation, as large as 65535 bytes (including the Internet Mobility Protocol header). They are 32 bits or other convenient length in one example to insure that wrap-around does not occur over high bandwidth links in a limited amount of time.

Combining this capability along with the expiration of data, retransmitted (retried) frames may contain less information than the previous version that was generated by the transmitting side. A frame id is provided to enable detection of the latest versioned frame. However, since data is never added in the preferred embodiment and each element removed is an entire protocol data unit, this is not a necessity for sequence assurance. In one example, the Internet Mobility Protocol will only process the first instance of a specific frame it receives—no matter how many other versions of that frame are transmitted. Each frame created that carries new user payload is assigned its own unique sequence number.

Performance is gained by using of a sliding window technique—thus allowing for more then one frame to be outstanding (transmitted) at a time before requiring the peer to acknowledge reception of the data. To insure timely delivery of the data, a positive acknowledgement and timer based retransmit scheme is used. To further optimize the use of the channel, a selective acknowledgement mechanism is employed that allows for fast retransmission of missing frames and quick recovery during lossy or congested periods of network connectivity. In one example, this selective acknowledgement mechanism is represented by an optional bit field that is included in the header.

A congestion avoidance algorithm is also included to allow the protocol to back off from rapid retransmission of frames. For example, a round trip time can be calculated for each frame that has successfully transfer between the peers without a retransmit. This time value is averaged and then used as the basis for the retransmission timeout value. As each frame is sent, a timeout is established for that frame. If an acknowledgement for that frame is not received, and the frame has actually been transmitted, the frame is resent. The timeout value is then increased and then used as the basis for the next retransmission time. This retransmit time-out is bounded on both the upper and lower side to insure that the value is within a reasonable range.

Internet Mobility Protocol also considers the send and receive paths separately. This is especially useful on channels that are asymmetric in nature. Base on hysteresis, the Internet Mobility Protocol automatically adjusts parameters such as frame size (fragmentation threshold), number of frames outstanding, retransmit time, and delayed acknowledgement time to reduce the amount of duplicate data sent through the network.

Due to the fact that Internet Mobility Protocol allows a node to migrate to different points of attachment on diverse networks, characteristics (e.g., frame size) of the underlying network may change midstream. An artifact of this migration is that frames that have been queued for transmission on one network may no longer fit over the new medium the mobile device is currently attached to. Combining this issue with the fact that fragmentation may not be supported by all network infrastructures, fragmentation is dealt with at the Internet Mobility Protocol level. Before each frame is submitted for transmission, Internet Mobility Protocol assesses whether or not it exceeds the current fragmentation threshold. Note that this value may be less than the current maximum transmission unit for performance reason (smaller frames have a greater likelihood of reaching its ultimate destination then larger frames). The tradeoff between greater protocol overhead versus more retransmissions is weighed by Internet Mobility Protocol, and the frame size may be reduced in an attempt to reduce overall retransmissions). If a given frame will fit, it is sent in its entirety. If not, the frame is split into maximum allowable size for the given connection. If the frame is retransmitted, it is reassessed, and will be refragmented if the maximum transmission unit has been reduced (or alternatively, if the maximum transmission unit actually grew, the frame may be resent as a single frame without fragmentation).

The protocol itself is orthogonal in its design as either side may establish or terminate a connection to its peer. In a particular implementation, however, there may be a few minor operational differences in the protocol engine depending on where it is running. For example, based on where the protocol engine is running, certain inactivity detection and connection lifetime timeouts may be only invoked on one side. To allow administrative control, Internet Mobility Protocol engine running on the Mobility Management Server 102 keeps track of inactivity periods. If the specified period of time expires without any activity from the Mobile End System 104, the Mobility Management Server 102 may terminate a session. Also, an administrator may want to limit the overall time a particular connection may be established for, or when to deny access base on time of day. Again these policy timers may, in one example implementation, be invoked only on the Mobility Management Server 102 side.

In one example implementation, the software providing the Internet Mobility Protocol is compiled and executable under Windows NT, 9x, and CE environments with no platform specific modification. To accomplish this, Internet Mobility Protocol employs the services of a network abstraction layer (NAL) to send and receive Internet Mobility Protocol frames. Other standard utility functions such as memory management, queue and list management, event logging, alert system, power management, security, etc are also used. A few runtime parameters are modified depending on whether the engine is part of a Mobile End System 104 or Mobility Management Server 102 system. Some examples of this are:

Certain timeouts are only invoked on the Mobility Management Server 102

Direction of frames are indicated within each frame header for echo detection

Inbound connections may be denied if Mobile End System 104 is so configured

Alerts only signaled on Mobility Management Server 102

Power management enabled on Mobile End System 104 but is not necessary on the Mobility Management Server 102

The Internet Mobility Protocol interface may have only a small number of "C" callable platform independent published API functions, and requires one O/S specific function to schedule its work (other then the aforementioned standard utility functions). Communications with local clients is achieved through the use of defined work objects (work requests). Efficient notification of the completion of each work element is accomplished by signaling the requesting entity through the optional completion callback routine specified as part of the work object.

The Internet Mobility Protocol engine itself is queue based. Work elements passed from local clients are placed on a global work queue in FIFO order. This is accomplished by local clients calling a published Internet Mobility protocol function such as "ProtocolRequestwork( )". A scheduling function inside of Internet Mobility Protocol then removes the work and dispatches it to the appropriate function. Combining the queuing and scheduling mechanisms conceal the differences between operating system architectures—allowing the protocol engine to be run under a threaded based scheme (e.g., Windows NT) or in a synchronous fashion (e.g., Microsoft Windows 9x & Windows CE). A priority scheme can be overlaid on top of its queuing, thus enabling a guaranteed quality of service to be provided (if the underlying network supports it).

From the network perspective, the Internet Mobility Protocol uses scatter-gather techniques to reduce copying or movement of data. Each transmission is sent to the NAL as a list of fragments, and is coalesced by the network layer transport. If the transport protocol itself supports scatter-gather, the fragment list is passed through the transport and assembled by the media access layer driver or hardware. Furthermore, this technique is extensible in that it allows the insertion or deletion of any protocol wrapper at any level of the protocol stack. Reception of a frame is signaled by the NAL layer by calling back Internet Mobility Protocol at a specified entry point that is designated during the NAL registration process.

Internet Mobility Protocol Engine Entry Points

Internet Mobility Protocol in the example embodiment exposes four common entry points that control its startup and shutdown behavior. These procedures are:

1. Internet Mobility ProtocolCreate( )
2. Internet Mobility ProtocolRun( )
3. Internet Mobility ProtocolHalt( )
4. Internet Mobility ProtocolUnload( )

Internet Mobility ProtocolCreate( )

The Internet Mobility ProtocolCreate( ) function is called by the boot subsystem to initialize the Internet Mobility Protocol. During this first phase, all resource necessary to start processing work must be acquired and initialized. At the completion of this phase, the engine must be in a state ready to accept work from other layers of the system. At this point, Internet Mobility Protocol initializes a global configuration table. To do this, it employs the services of the Configuration Manager 228 to populate the table.

Next it registers its suspend and resume notification functions with the APM handler. In one example, these functions are only invoked on the Mobile End System 104 side—but in another implementation it might be desirable to allow Mobility Management Server 102 to suspend during operations. Other working storage is then allocated from the memory pool, such as the global work queue, and the global NAL portal list.

To limit the maximum amount of runtime memory required as well as insuring Internet Mobility Protocol handles are unique, Internet Mobility Protocol utilizes a 2-tier array scheme for generating handles. The globalConnectionArray table is sized based on the maximum number of simultaneous connection the system is configured for, and allocated at this time. Once all global storage is allocated and initialized, the global Internet Mobility Protocol state is change to _STATE_INITIALIZE_.

Internet Mobility ProtocolRun( )

The Internet Mobility ProtocolRun( ) function is called after all subsystems have been initialized, and to alert the Internet Mobility Protocol subsystem that it is okay to start processing any queued work. This is the normal state that the Internet Mobility Protocol engine is during general operations. A few second pass initialization steps are taken at this point before placing the engine into an operational state.

Internet Mobility Protocol allows for network communications to occur over any arbitrary interface(s). During the initialization step, the storage for the interface between Internet Mobility Protocol and NAL was allocated. Internet Mobility Protocol now walks through the global portal list to start all listeners at the NAL. In one example, this is comprised of a two step process:

Internet Mobility Protocol requests the NAL layer to bind and open the portal based on configuration supplied during initialization time; and Internet Mobility Protocol then notifies the NAL layer that it is ready to start processing received frames by registering the Internet Mobility ProtocolRCVFROMCB call back.

A local persistent identifier (PID) is then initialized.

The global Internet Mobility Protocol state is change to _STATE_RUN_.

Internet Mobility ProtocolHalt

The Internet Mobility ProtocolHalt( ) function is called to alert the engine that the system is shutting down. All resources acquired during its operation are to be release prior to returning from this function. All Internet Mobility Protocol sessions are abnormally terminated with the reason code set to administrative. No further work is accepted from or posted to other layers once the engine has entered into _STATE_HALTED_state.

Internet Mobility ProtocolUnload( )

The Internet Mobility ProtocolUnload( ) function is the second phase of the shutdown process. This is a last chance for engine to release any allocated system resources still being held before returning. Once the engine has returned from this function, no further work will be executed as the system itself is terminating Internet Mobility Protocol Handles In at least some examples, using just the address of the memory (which contains the Internet Mobility Protocol state information) as the token to describe an Internet Mobility Protocol connection may be insufficient. This is mainly due to possibility of one connection terminating and a new one starting in a short period of time. The probability that the memory allocator will reassign the same address for different connections is high—and this value would then denote both the old connection and a new connection. If the original peer did not hear the termination of the session (i.e. it was off, suspended, out of range, etc.), it could possibly send a frame on the old session to the new connection. This happens in TCP and will cause a reset to be generated to the new session if the peer's IP addresses are the same. To avoid this scenario, Internet Mobility Protocol uses manufactured handle. The handles are made up of indexes into two arrays and a nonce for uniqueness. The tables are laid out as follows.

Table 1: an array of pointers to an array of connection object

Table 2: an array of connection objects that contains the real pointers to the Internet Mobility Protocol control blocks.

This technique minimizes the amount of memory being allocated at initialization time. Table 1 is sized and allocated at startup. On the Mobile End System 104 side this allows allocation of a small amount of memory (the memory allocation required for this Table 1 on the Mobility Management Server 102 side is somewhat larger since the server can have many connections).

Table 1 is then populated on demand. When a connection request is issued, Internet Mobility Protocol searches through Table 1 to find a valid pointer to Table 2. If no entries are found, then Internet Mobility Protocol will allocate a new Table 2 with a maximum of 256 connection objects—and then stores the pointer to Table 2 into the appropriate slot in Table 1. The protocol engine then initializes Table 2, allocates a connection object from the newly created table, and returns the manufactured handle. If another session is requested, Internet Mobility Protocol will search Table 1 once again, find the valid pointer to Table 2, and allocate the next connection object for the session. This goes on until one of two situations exist:

If all the connection objects are exhausted in Table 2, a new Table 2 will be allocated, initialized, and a pointer to it will be placed in the next available slot in Table 1; and If all connection objects have been released for a specific Table 2 instance and all elements are unused for a specified period of time, the storage for that instance of Table 2 is released back to the memory pool and the associated pointer in Table 1 is zeroed to indicate that that entry is now available for use when the next connection request is started (if and only if no other connection object are available in other instances of Table 2).

Two global counters are maintained to allow limiting the total number of connections allocated. One global counter counts the number of current active connections; and the other keeps track of the number of unallocated connection objects. The second counter is used to govern the total number of connection object that can be created to some arbitrary limit. When a new Table 2 is allocated, this counter is adjusted downward to account for the number of objects the newly allocated table represents. On the flip side, when Internet Mobility Protocol releases a Table 2 instance back to the memory pool, the counter is adjusted upward with the number of connection objects that are being released.

Work Flow

Work is requested by local clients through the Internet Mobility ProtocolRequestWork( ) function. Once the work is validated and placed on the global work queue, the Internet Mobility ProtocolWorkQueueEligible( ) function is invoked. If in a threaded environment, the Internet Mobility Protocol worker thread is signaled (marked eligible) and control is immediately returned to the calling entity. If in a synchronous environment, the global work queue is immediately run to process any work that was requested. Both methods end up executing the Internet Mobility Protocol-ProcessWork( ) function. This is the main dispatching function for processing work.

Since only one thread at a time may be dispatching work from the global queue in the example embodiment, a global semaphore may be used to protect against reentrancy. Private Internet Mobility Protocol work can post work directly to the global work queue instead of using the Internet Mobility ProtocolRequestWork( ) function.

A special case exists for SEND type work objects. To insure that the semantics of Unreliable Datagrams is kept, each SEND type work object can be queued with an expiry time or with a retry count. Work will be aged based on the expiry time. If the specified timeout occurs, the work object is removed from the connection specific queue, and is completed with an error status. If the SEND object has already been coalesced into the data path, the protocol allows for the removal of any SEND object that has specified a retry count. Once the retry count has been exceeded, the object is removed from the list of elements that make up the specific frame, and then returned to the requestor with the appropriate error status.

Connection Startup

Internet Mobility Protocol includes a very efficient mechanism to establish connections between peers. Confirmation of a connection can be determined in as little as a three-frame exchange between peers. The initiator sends an IMP SYNC frame to alert its peer that it is requesting the establishment of a connection. The acceptor will either send an IMP ESTABLISH frame to confirm acceptance of the connection, or send an IMP ABORT frame to alert the peer that its connection request has been rejected. Reason and status codes are passed in the IMP ABORT frame to aid the user in deciphering the reason for the rejection. If the connection was accepted, an acknowledgement frame is sent (possibly including protocol data unit or control data) and is forwarded to the acceptor to acknowledge receipt of its establish frame.

To further minimize network traffic, the protocol allows user and control data to be included in the initial handshake mechanism used at connection startup. This ability can be used in an insecure environment or in environments where security is dealt with by a layer below, such that the Internet Mobility Protocol can be tailored to avert the performance penalties due to double security authentication and encryption processing being done over the same data path.

Data Transfer

Internet Mobility Protocol relies on signaling from the NAL to detect when a frame has been delivered to the network. It uses this metric to determine if the network link in question has been momentarily flow controlled, and will not submit the same frame for retransmission until the original request has been completed. Some network drivers however lie about the transmission of frames and indicate delivery prior to submitting them to the network. Through the use of semaphores, the Internet Mobility Protocol layer detects this behavior and only will send another datagram until the NAL returns from the original send request Once a frame is received by Internet Mobility Protocol, the frame is quickly validated, then placed on an appropriate connection queue. If the frame does not contain enough information for Internet Mobility Protocol to discern its ultimate destination, the frame is placed on the Internet Mobility Protocol socket queue that the frame was received on, and then that socket queue is place on the global work queue for subsequence processing. This initial demultiplexing allows received work to be dispersed rapidly with limited processing overhead.

Acquiescing

To insure minimal use of network bandwidth during periods of retransmission and processing power on the Mobility Management Server 102, the protocol allows the Mobility Management Server 102 to "acquiesce" a connection. After a user configurable period of time, the Mobility Management Server 102 will stop retransmitting frames for a particular connection if it receives no notification from the corresponding Mobile End System 104. At this point, the Mobility Management Server 102 assumes that the Mobile End System 104 is in some unreachable state (i.e. out of range, suspended, etc), and places the connection into a dormant state. Any further work destined for this particular connection is stored for future delivery. The connection will remain in this state until one of the following conditions are met:

Mobility Management Server 102 receives a frame from the Mobile End System 104, thus returning the connection to its original state;
a lifetime timeout has expired;
an inactivity timeout has expired; or
the connection is aborted by the system administrator.

In the case that the Mobility Management Server 102 receives a frame from the Mobile End System 104, the connection continues from the point it was interrupted. Any work that was queued for the specific connection will be forwarded, and the state will be resynchronized. In any of the other cases, the Mobile End System 104 will be apprised of the termination of the connection once it reconnects; and work that was queued for the Mobile End System 104 will be discarded.

Connect and Send Requests

Figure 10B:
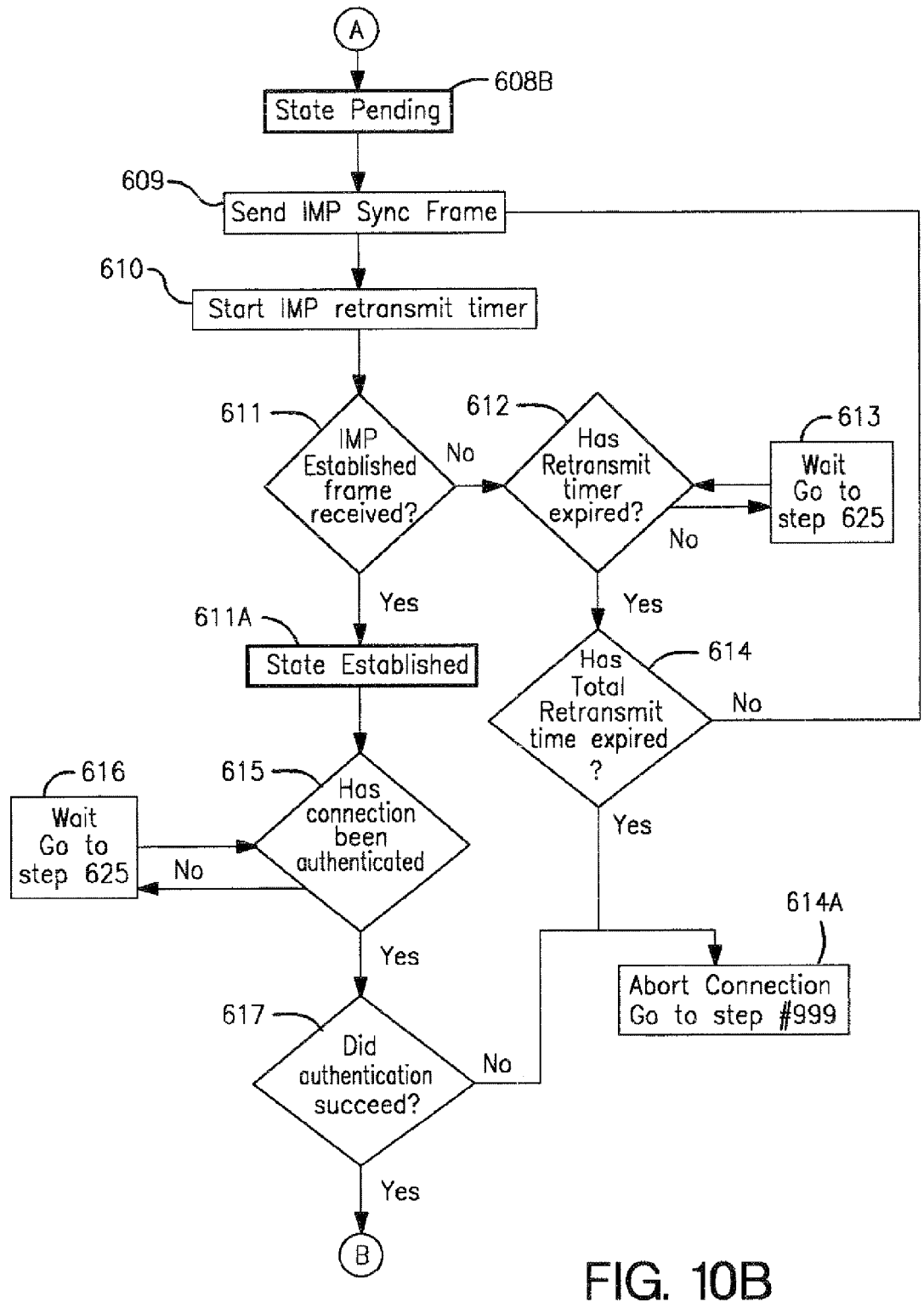
FIGS. 10A-15B show example steps performed to provide an Internet Mobility Protocol.
Figure 10C:
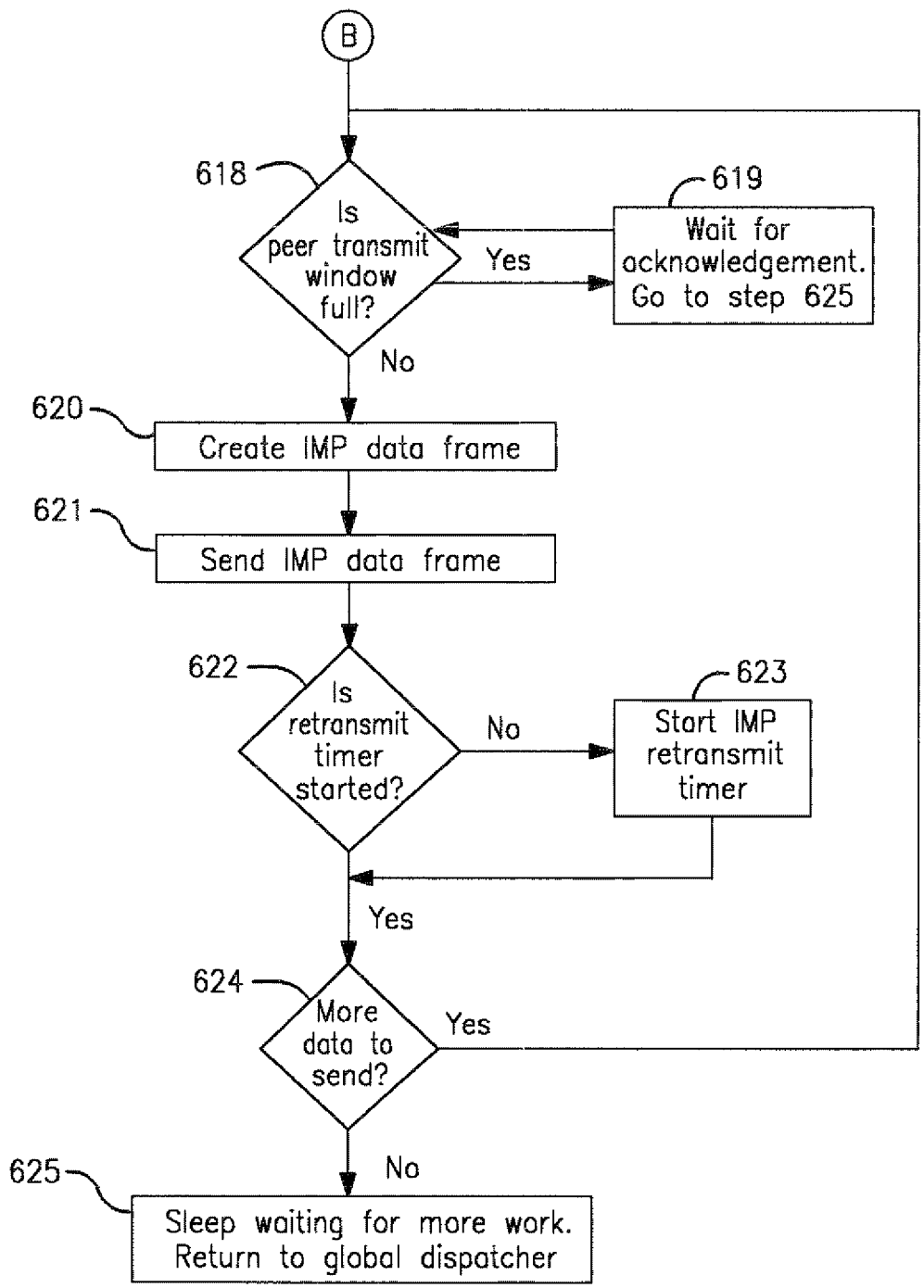

FIGS. 10A-10C together are a flowchart of example connect and send request logic formed by Internet mobility engine 244. In response to receipt from a command from RPC engine 240, the Internet Mobility Protocol engine 244 determines whether the command is a "connect" request (decision block 602). If it is, engine 244 determines whether connection resources can be allocated (decision block 603). If it is not possible to allocate sufficient connection resources ("no" exit to decision block 603), engine 244 declares an error (block 603a) and returns. Otherwise, engine 244 performs a state configuration process in preparation for handling the connect request (block 603b).

For connect and other requests, engine 244 queues the connect or send request and signals a global event before return to the calling application (block 604).

To dispatch a connect or send request from the Internet Mobility Protocol global request queue, engine 244 first determines whether any work is pending (decision block 605). If no work is pending ("no" exit to decision block 605), engine 244 waits for the application to queue work for the connection by going to FIG. 10C, block 625 (block 605a). If there is work pending ("yes" exit to decision block 605), engine 244 determines whether the current state has been established (block 606). If the state establish has been achieved ("yes" exit to decision block 606), engine 244 can skip steps used to transition into establish state and jump to decision block 615 of FIG. 10B (block 606a). Otherwise, engine 244 must perform a sequence of steps to enter establish state ("no" exit to decision block 606).

In order to enter establish state, engine 244 first determines whether the address of its peer is known (decision block 607). If not, engine 244 waits for the peer address while continuing to queue work and transitions to FIG. 10C block 625 (block 607a). If the peer address is known ("yes" exit to decision block 607), engine 244 next tests whether the requisite security context has been acquired (decision block 608). If not, engine 244 must wait for the security context while continuing to queue work and transitioning to block 625 (block 608a). If security context has already been acquired ("yes" exit to decision block 608), engine 244 declares a "state pending" state (block 608b), and then sends an Internet Mobility Protocol sync frame (block 609) and starts a retransmit timer (block 610). Engine 244 determines whether the corresponding established frame was received (block 611). If it was not ("no" exit to decision block 611), engine 244 tests whether the retransmit time has expired (decision block 612). If the decision block has not expired ("no" exit to decision block 612), engine 244 waits and may go to step 625 (block 613). Eventually, if the established frame is never received (as tested for by block 611) and a total retransmit time expires (decision block 614), the connection may be aborted (block 614a). If the established is eventually received ("yes" exit to decision block 611), engine 244 declares a "state established" state (block 611a).

Once state establish has been achieved, engine 244 tests whether the new connection has been authenticated (decision block 615). If it has not been, engine 244 may wait and transition to step 625 (block 616). If the connection has been authenticated ("yes" exit to decision block 615), engine 244 tests whether authentication succeeded (decision block 617). If it did not ("no" exit to decision block 617), the connection is aborted (block 614a). Otherwise, engine 244 tests whether the peer transmit window is full (decision block 618). If it is ("yes" exit to decision block 618), engine 244 waits for acknowledgment and goes to step 625 (decision block 619). If the window is not full ("no" exit to decision block 618), engine 244 creates an Internet Mobility Protocol data frame (block 620) and sends it (block 621). Engine 244 then determines if the retransmit timer has started (decision block 622). If no, engine 244 starts the retransmit timer (block 623). Engine 244 loops through blocks 618-623 until there is no more data to send (as tested for by decision block 624). Engine 244 then returns to a sleep mode waiting for more work and returns to the global dispatcher (block 625).

Termination

Figure 11:
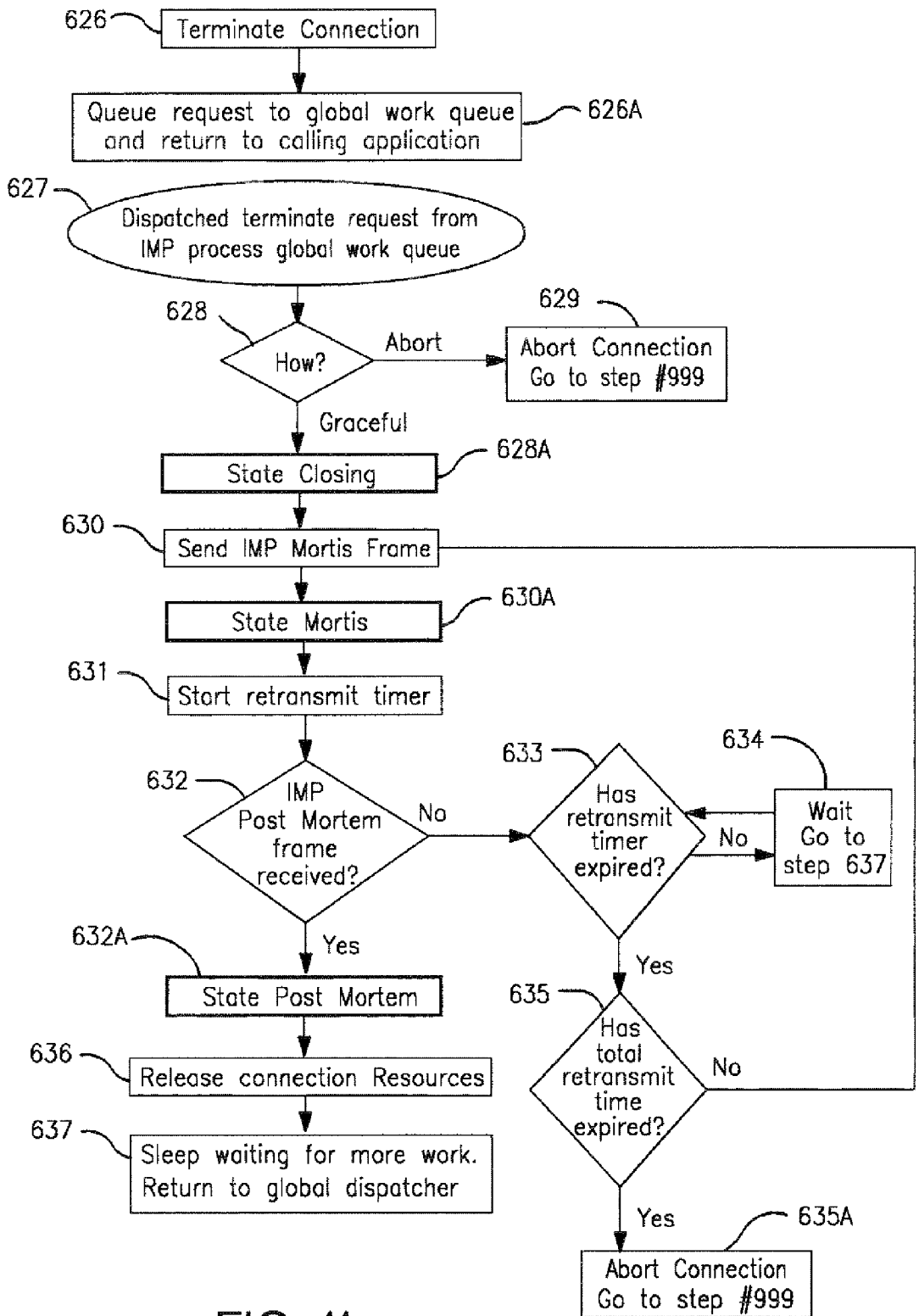

FIG. 11 is a flowchart of example steps performed by Internet Mobility Protocol engine 244 to terminate a connection. In response to a "terminate connection" request (block 626), the engine queues the request to its global work queue and returns to the calling application (block 626a). The terminate request is eventually dispatched from the Internet Mobility Protocol process global work queue for execution (block 627). Engine 244 examines the terminate request and determines whether the terminate request should be immediate or graceful (decision block 628). If immediate ("abort" exit to decision block 628), engine 244 immediately aborts the connection (block 629). If graceful ("graceful" exit to decision block 628), engine 244 declares a "state close" state (block 628a), and sends an Internet Mobility Protocol "Mortis" frame (block 630) to indicate to the peer that the connection is to close. Engine 244 then declares a "Mortis" state (block 630a) and starts the retransmit timer (block 631). Engine 244 tests whether the response of "post mortem" frame has been received from the peer (decision block 632). If not ("no" exit to decision block 632), engine 244 determines whether a retransmit timer has yet expired (decision block 633). If the retransmit timer is not expired ("no" exit to decision block 633), engine 244 waits and proceeds to step 637 (block 634). If the retransmit timer has expired ("yes" exit to decision block 633), engine 244 determines whether the total retransmit time has expired (decision block 635). If the total time is not yet expired ("no" exit to decision block 635), control returns to block 630 to resent the Mortis frame. If the total retransmit time has expired ("yes" exit to decision block 635), engine 244 immediately aborts the connection (block 635a).

Once a "post mortem" responsive frame has been received from the peer ("yes" exit to decision block 632), engine 244 declares a "post mortem" state (block 632a), releases connection resources (block 636), and returns to sleep waiting for more work (block 637).

Retransmission

Figure 12:
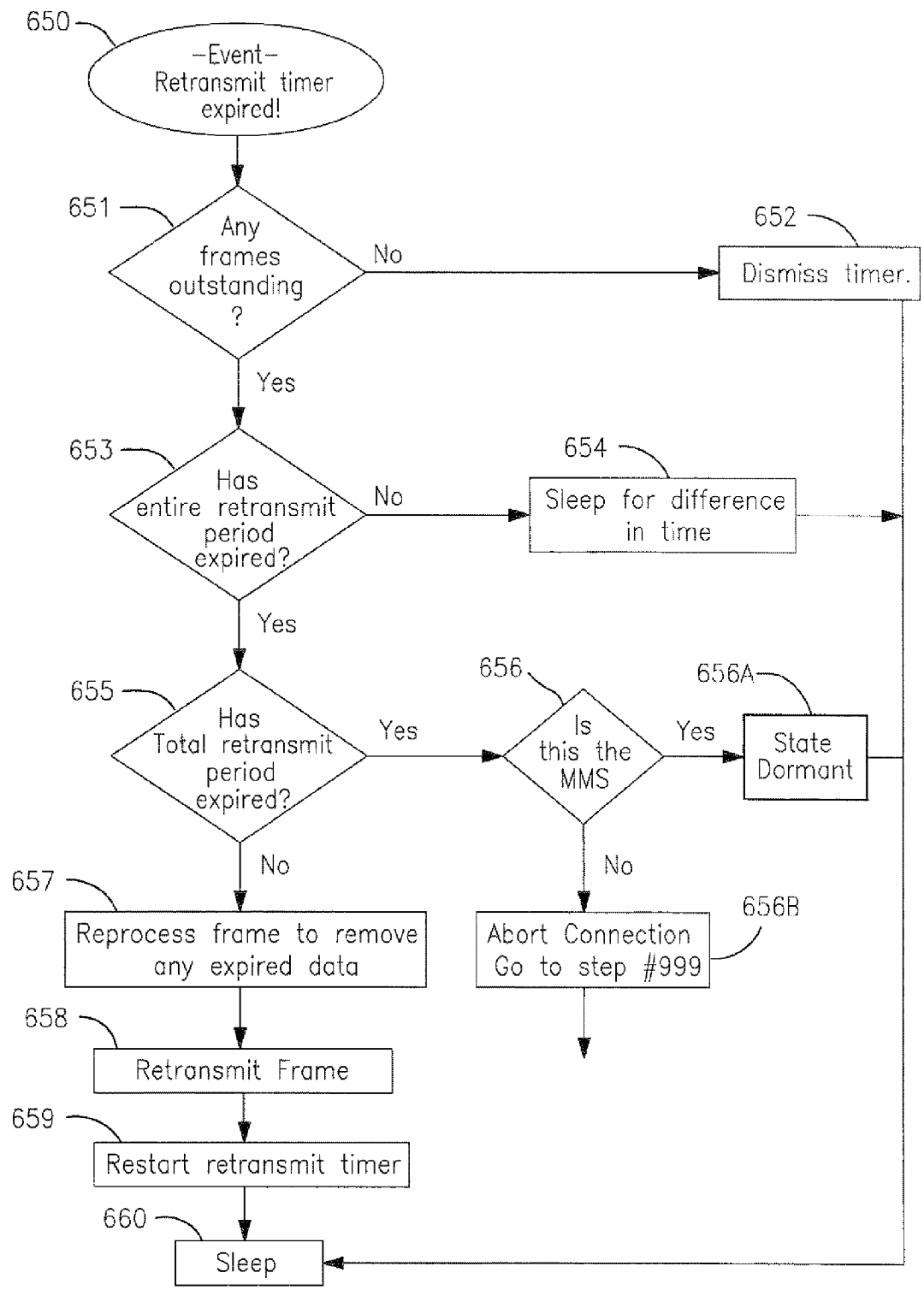

FIG. 12 is a flowchart of example "retransmit" events logic performed by Internet Mobility Protocol engine 244. In the event that the retransmit timer has expired (block 650), engine 244 determines whether any frames are outstanding (decision block 651). If no frames are outstanding ("no" exit to decision block 651), engine 244 dismisses the timer (block 652) and returns to sleep (block 660). If, on the other hand, frames are outstanding ("yes" exit to decision block 651), engine 244 determines whether the entire retransmit period has expired (decision block 653). If it has not ("no" exit to decision block 653), the process returns to sleep for the difference in time (block 654). If the entire retransmit time period has expired ("yes" exit to decision block 653), engine 244 determines whether a total retransmit period has expired (decision block 655). If it has ("yes" exit to decision block 655) and this event has occurred in the Mobility Management Server engine 244' (as opposed to the Mobile End System engine 244), a dormant state is declared (decision block 656, block 656a). Under these same conditions, the Internet Mobility Protocol engine 244 executing on the Mobile End System 104 will abort the connection (block 656b).

If the total retransmit period is not yet expired ("no" exit to decision block 655), engine 244 reprocesses the frame to remove any expired data (block 657) and then retransmits it (block 658)—restarting the retransmit timer as it does so (block 659). The process then returns to sleep (block 660) to wait for the next event.

Internet Mobility Protocol Expiration of a PDU

FIG. 12 block 657 allows for the requesting upper layer interface to specify a timeout or retry count for expiration of any protocol data unit (i.e. a SEND work request) submitted for transmission to the associated peer. By use of this functionality, Internet Mobility Protocol engine 244 maintains the semantics of unreliable data and provides other capabilities such as unreliable data removal from retransmitted frames. Each PDU (protocol data unit) 506 submitted by the layer above can specify a validity timeout and/or retry count for each individual element that will eventually be coalesced by the Internet Mobility Protocol engine 244. The validity timeout and/or retry count (which can be user-specified for some applications) are used to determine which PDUs 506 should not be retransmitted but should instead be removed from a frame prior to retransmission by engine 244.

The validity period associated with a PDU 506 specifies the relative time period that the respective PDU should be considered for transmission. During submission, the Internet Mobility Protocol RequestWork function checks the expiry timeout value. If it is non-zero, an age timer is initialized. The requested data is then queued on the same queue as all other data being forwarded to the associated peer. If the given PDU 506 remains on the queue for longer than the time period specified by the validity period parameter, during the next event that the queue is processed, the given (all) PDU(s) that has an expired timeout is removed and completed locally with a status code of "timeout failure" rather than being retransmitted when the frame is next retransmitted. This algorithm ensures that unreliable data being queued for transmission to the peer will not grow stale and/or boundlessly consume system resources.

Figure 12A:
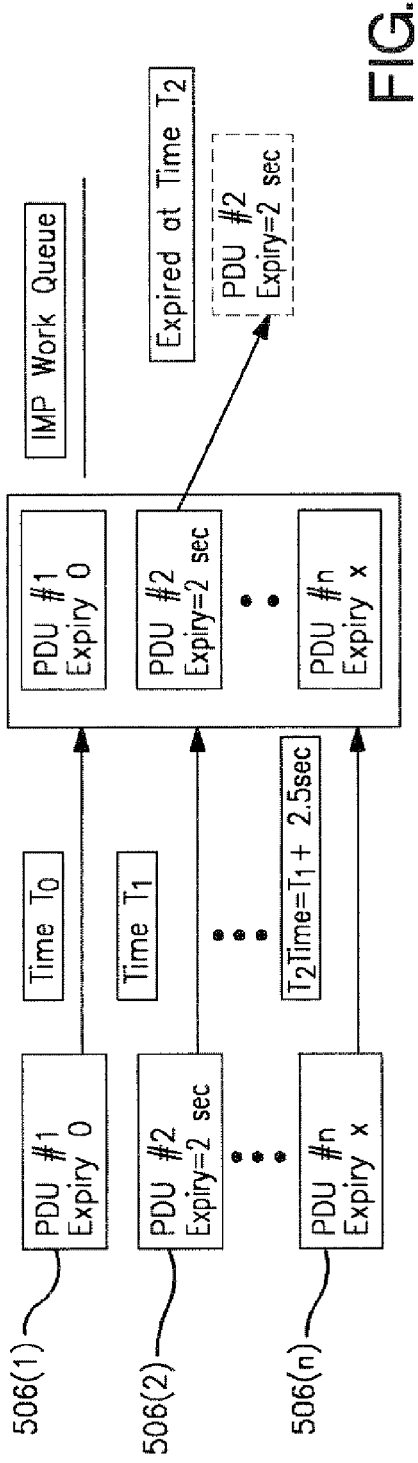

In the example shown in FIG. 12A, at least three separate PDUs 506 are queued to Internet Mobility Protocol engine 244 for subsequent processing. PDU 506(1) is queued without an expiry time denoting no timeout for the given request. PDU 506(2) is specified with a validity period of 2 seconds and is chronologically queued after PDU 506(1). PDU 506(n) is queued 2.5 seconds after PDU 506(2) was queued. Since the act of queuing PDU 506(n) is the first event causing processing of the queue and PDU 506(2) expiry time has lapsed, PDU 506(2) is removed from the work queue, completed locally and then PDU 506(n), is placed on the list. If a validity period was specified for PDU 506(n) the previous sequence of events would be repeated. Any event (queuing, dequeuing, etc) that manipulates the work queue will cause stale PDUs to be removed and completed.

As described above, PDUs 506 are coalesced by the Internet Mobility Protocol Engine 244 transmit logic and formatted into a single data stream. Each discrete work element, if not previously expired by the validity timeout, is gathered to formulate Internet Mobility Protocol data frames. Internet Mobility Protocol Engine 244 ultimately sends these PDUs 506 to the peer, and then places the associated frame on a Frames-Outstanding list. If the peer does not acknowledge the respective frame in a predetermined amount of time (see FIG. 12 showing the retransmission algorithm), the frame is retransmitted to recover from possibly a lost or corrupted packet exchange. Just prior to retransmission, the PDU list that the frame is comprised of is iterated through to determine if any requests were queued with a retry count. If the retry count is non zero, and the value is decremented to zero, the PDU 506 is removed from the list, and the frames header is adjusted to denote the deletion of data. In this fashion, stale data, unreliable data, or applications employing their own retransmission policy are not burdened by engine 244's retransmission algorithm.

Figure 12B:
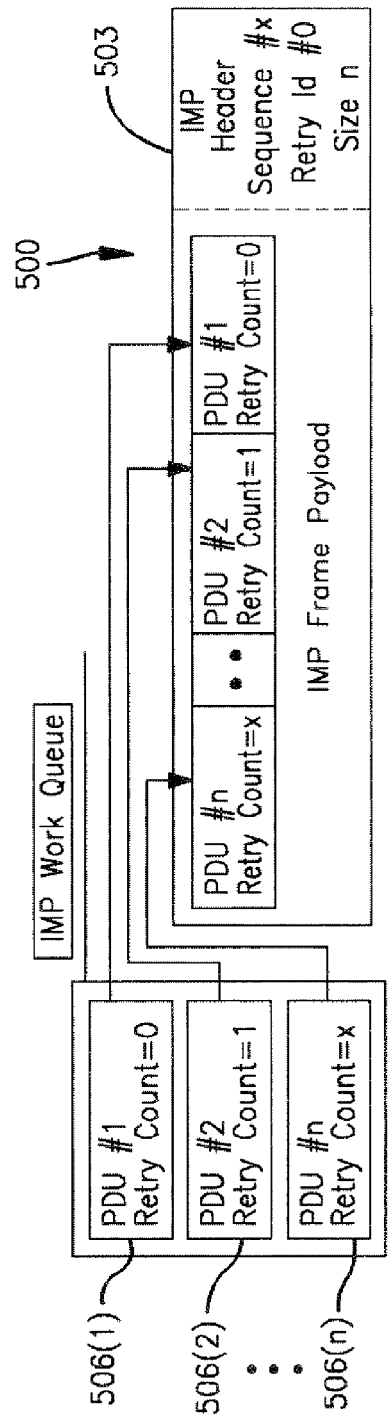
Figure 12C:
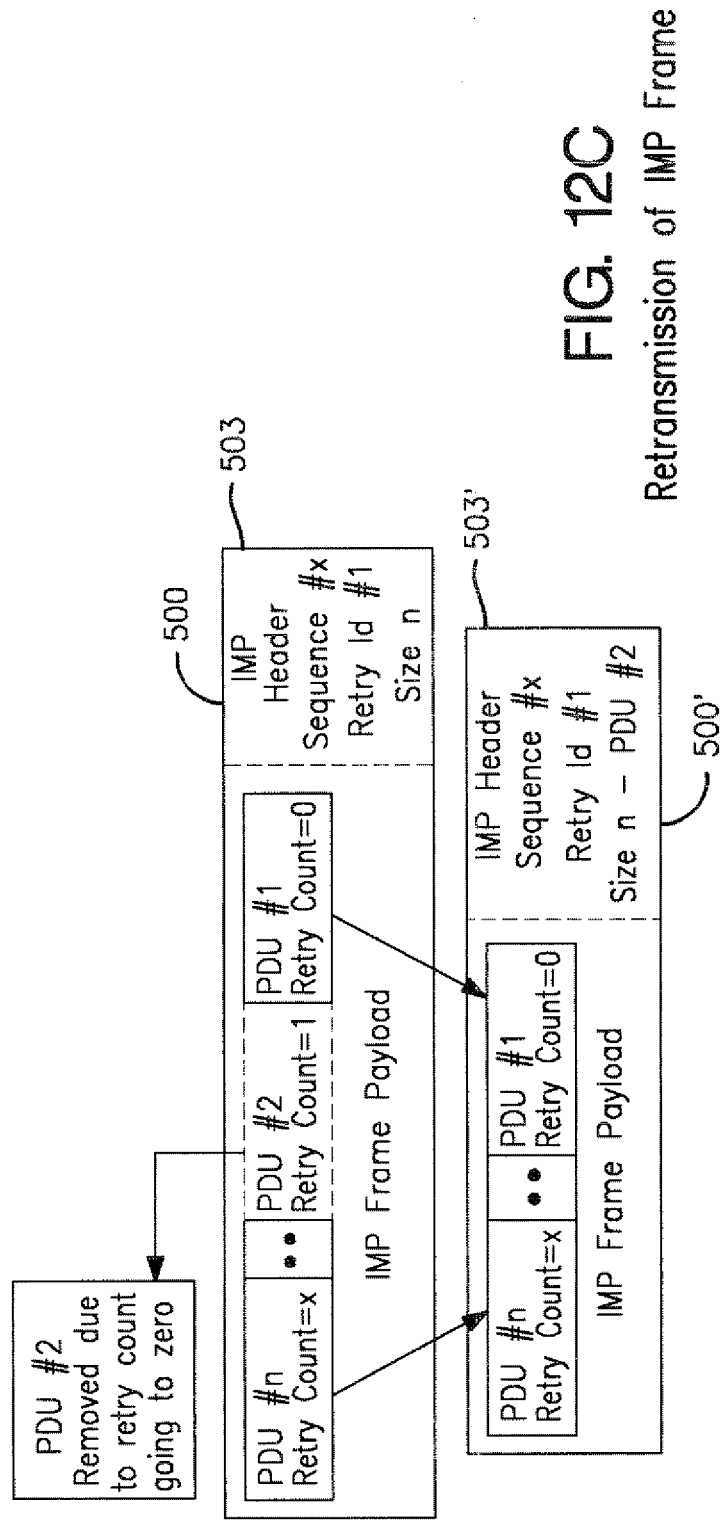
Figure 13A:
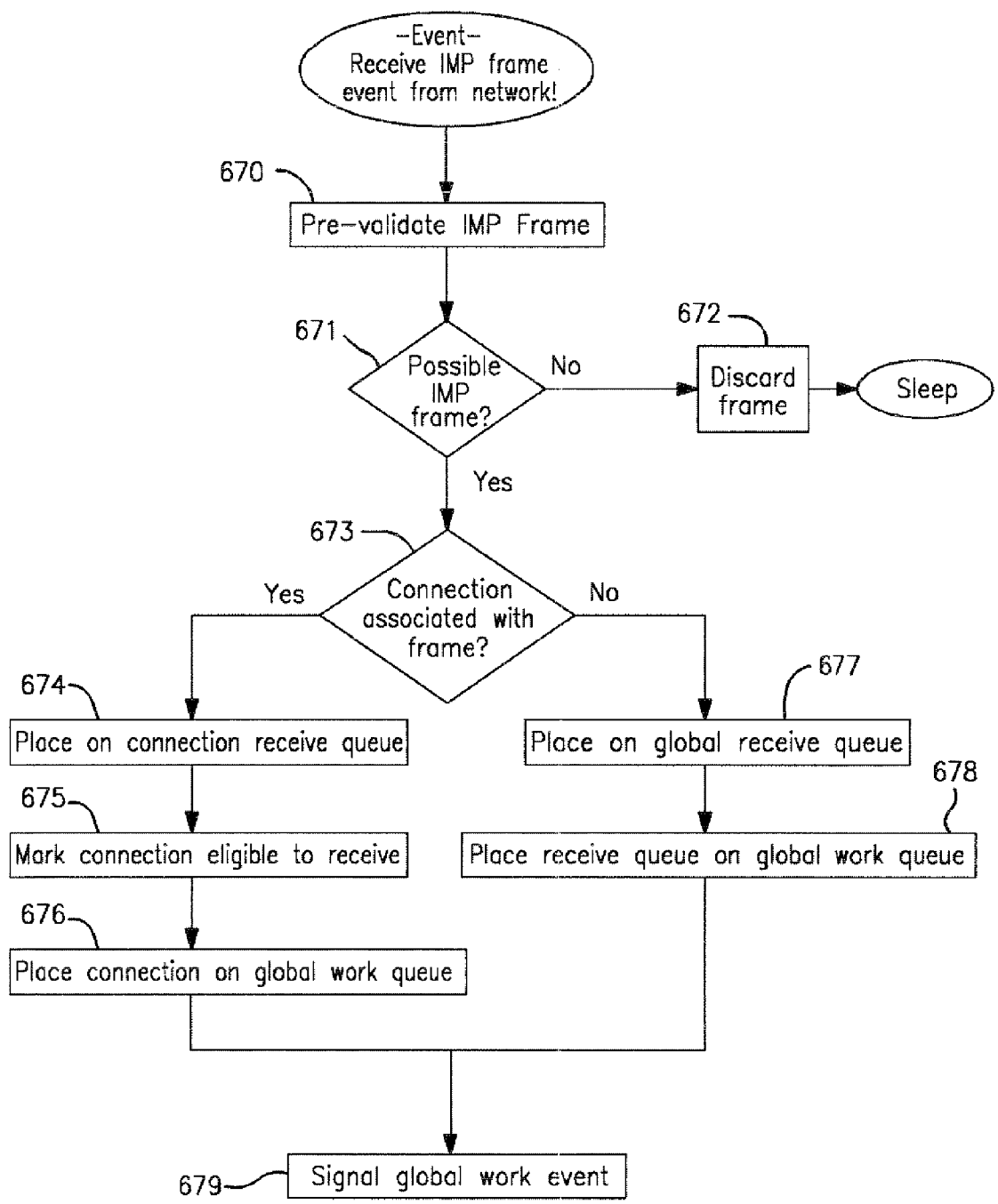
Figure 13B:
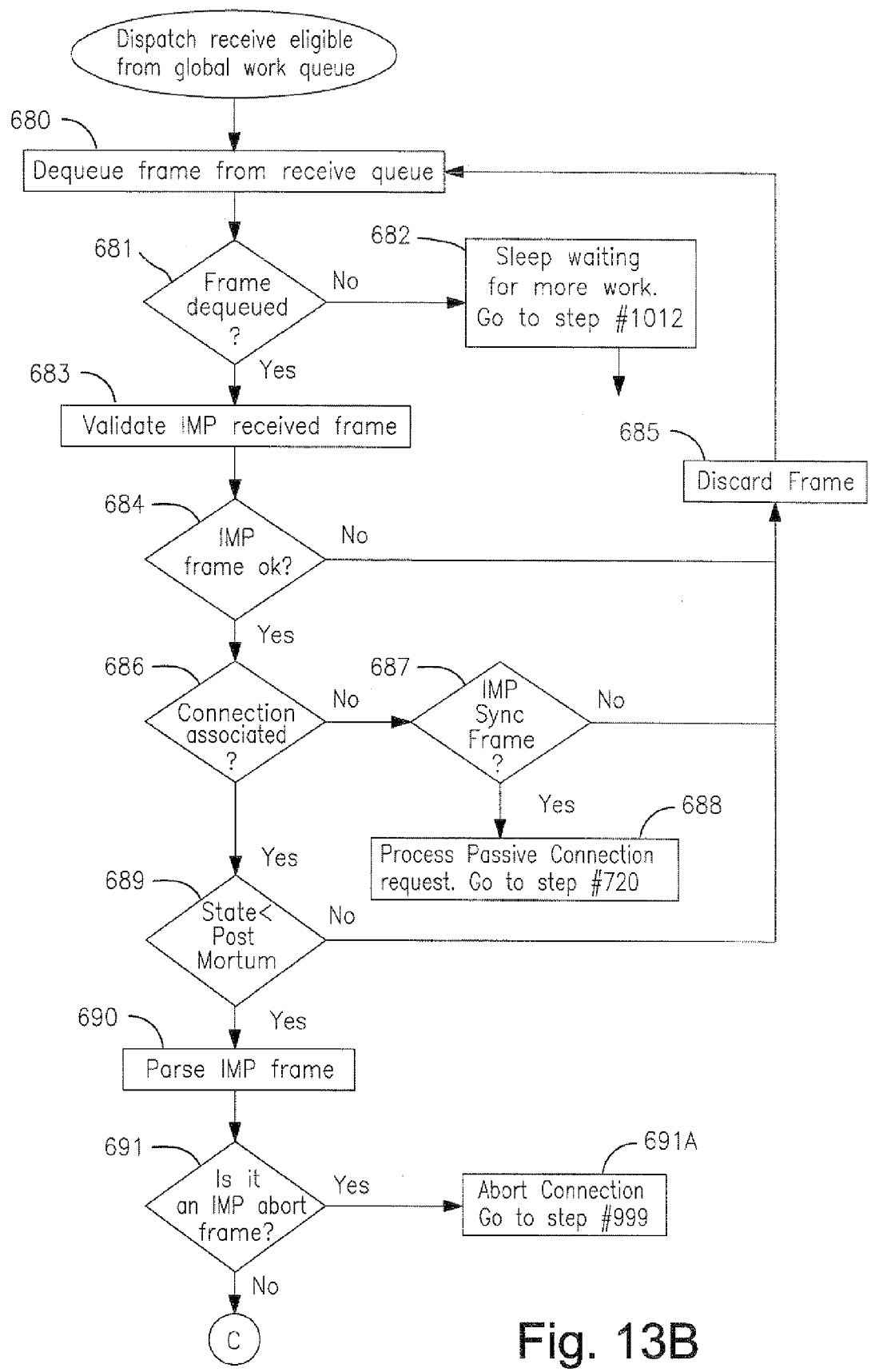
Figure 13C:
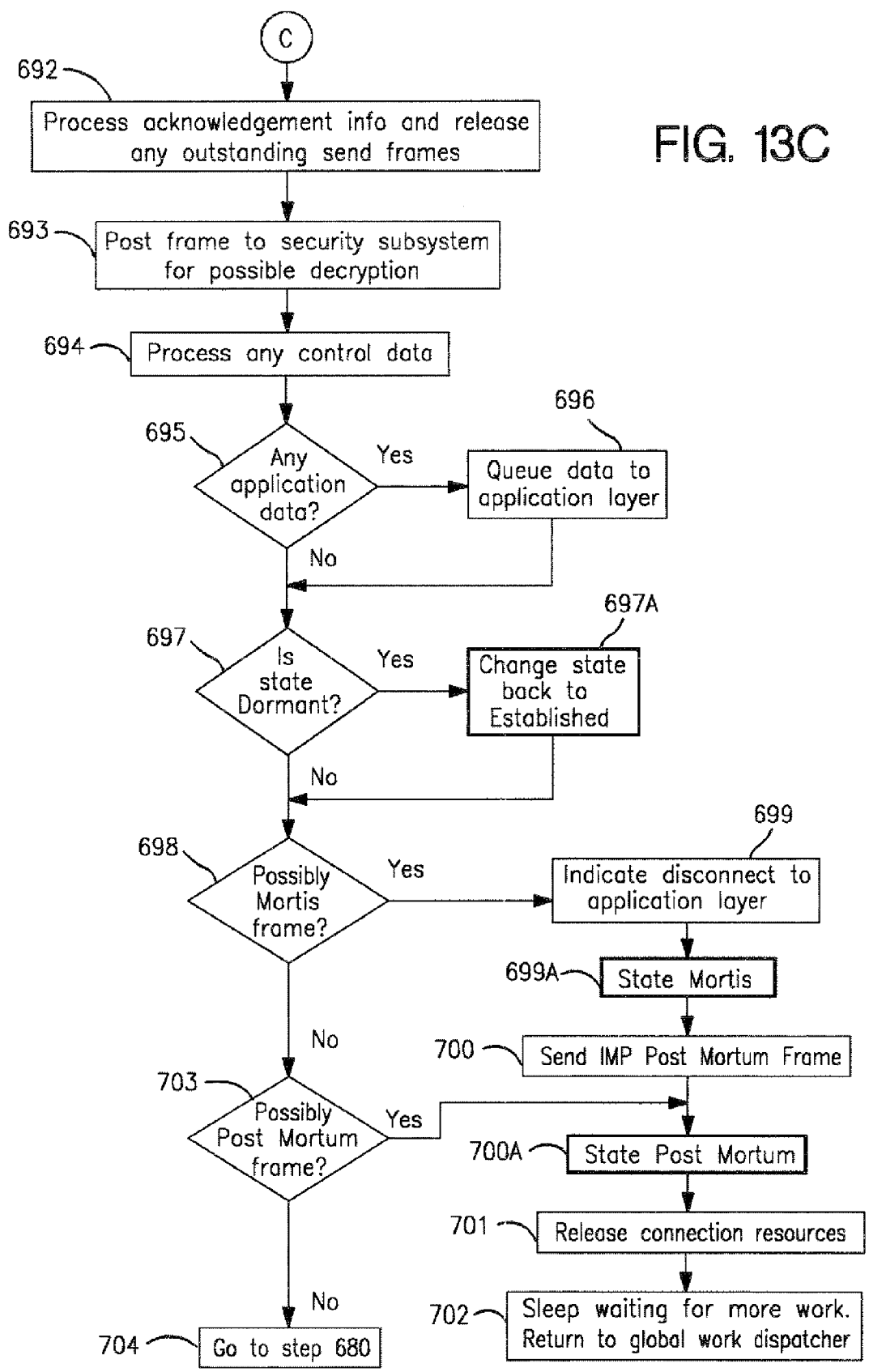

In the FIG. 12B example, again three separate PDUs 506 are queued to Internet Mobility Protocol engine 244 for subsequent processing. PDU 506(1) is queued without a retry count. This denotes continuous retransmission attempts or guaranteed delivery level of service. PDU 506(2) is queued with a retry count of 1 and is chronologically queued after PDU 506(1). PDU 506(n) is queued sometime after PDU 506(2). At this point, some external event (e.g., upper layer coalesce timer, etc.) causes engine 244's send logic to generate a new frame by gathering enough PDUs 506 from the work queue to generate an Internet Mobility Protocol data frame 500. The frame header 503 is calculated and stamped with a retry ID of 0 to denote that this is the first transmission of the frame. The frame is then handed to the NAL layer for subsequent transmission to the network. At this point a retransmit timer is started since the frame in question contains a payload. For illustration purposes it is assumed that an acknowledgement is not received from the peer for a variety of possible reasons before the retransmit timer expires. The retransmit logic of engine 244 determines that the frame 500 in question is now eligible for retransmission to the network. Prior to resubmitting the frame to the NAL layer, engine 244's retransmit logic iterates through the associated list of PDUs 506. Each PDU's retry count is examined and if non-zero, the count is decremented. In the process of decrementing PDU 506(2)'s retry count, the retry count becomes zero. Because PDU 506(2)'s retry count has gone to zero, it is removed from the list and completed locally with a status of "retry failure." The frame header 503 size is then adjusted to denote the absence of the PDU 506(2)'s data. This process is repeated for all remaining PDUs. Once the entire frame 500 is reprocessed to produce an "edited" frame 500', the retry ID in the header is incremented and the resultant datagram is then handed to the NAL layer for subsequent (re)transmission.

Reception

Figure 14A:
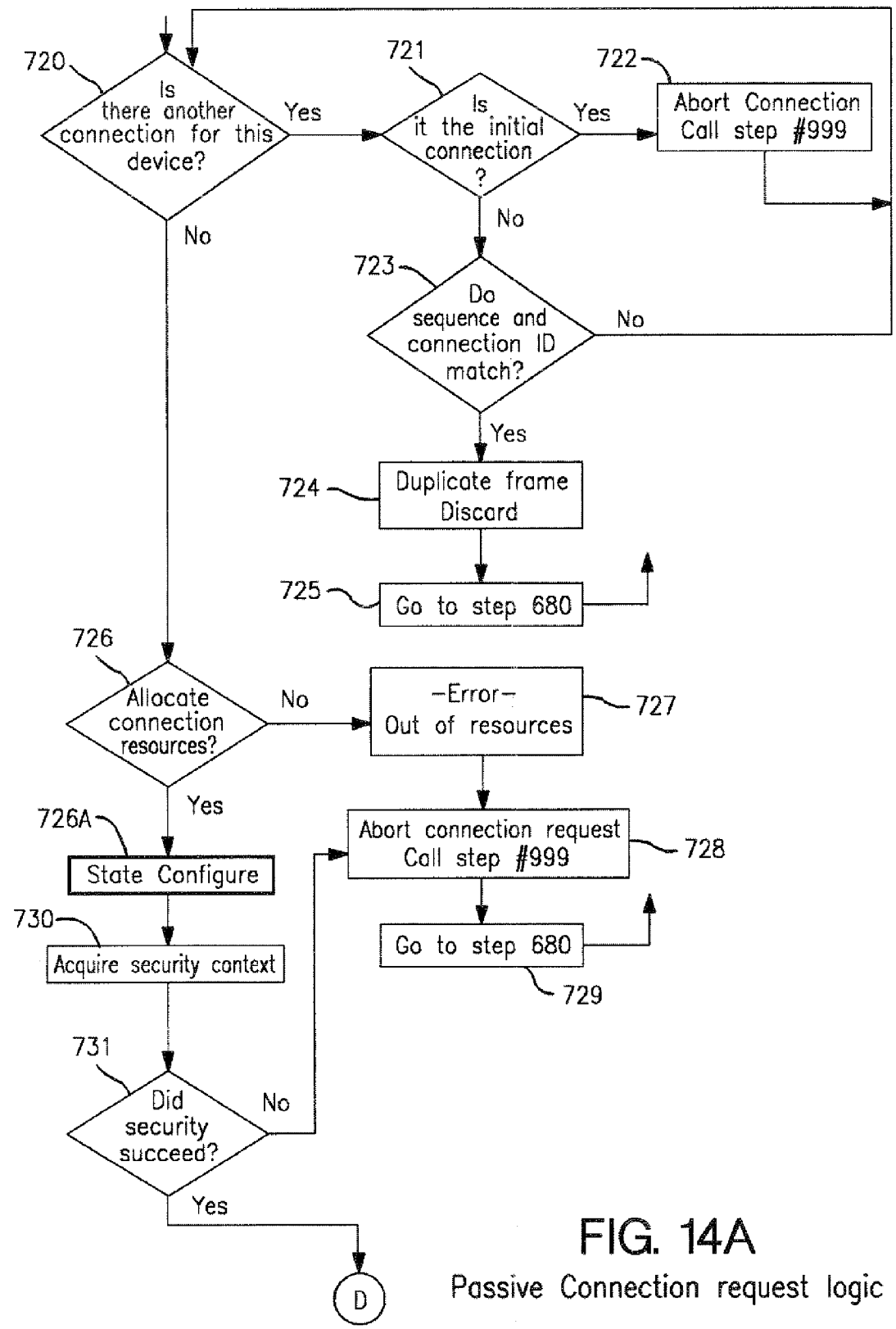
Figure 14B:
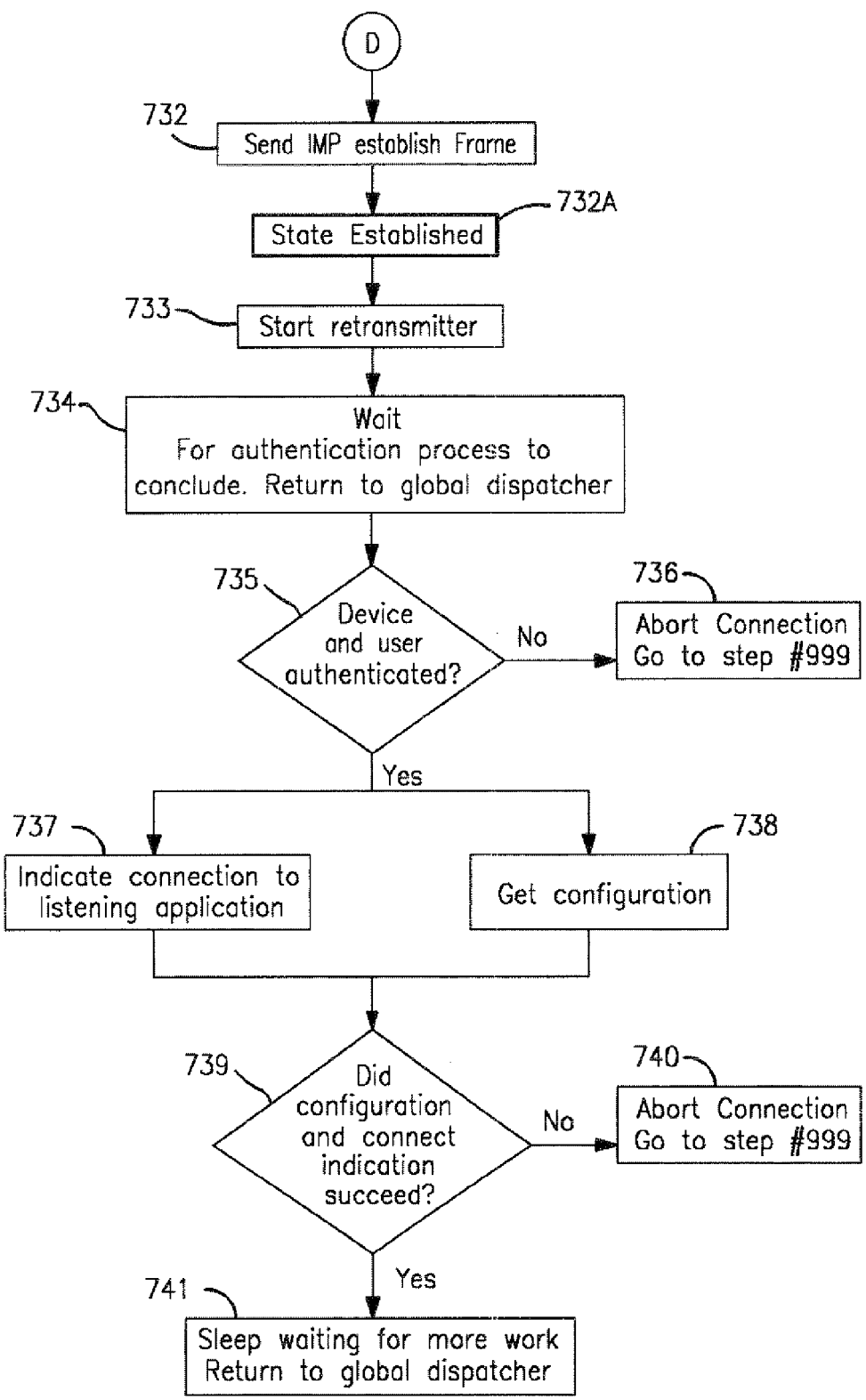

FIGS. 13A-13D are a flowchart of example steps performed by Internet Mobility Protocol engine 244 in response to receipt of a "receive" event. Such receive events are generated when an Internet Mobility Protocol frame has been received from network 108. In response to this receive event, engine 244 pre-validates the event (block 670) and tests whether it is a possible Internet Mobility Protocol frame (decision block 671). If engine 244 determines that the received frame is not a possible frame ("no" exit to decision block 671), it discards the frame (block 672). Otherwise ("yes" exit to decision block 671), engine 244 determines whether there is a connection associated with the received frame (decision block 673). If there is a connection associated with the received frame ("yes" exit to decision block 673), engine 244 places the work on the connection receive queue (block 674), marks the connection as eligible to receive (block 675), and places the connection on the global work queue (block 676). If no connection has yet been associated with the received frame ("no" exit to decision block 673), engine 244 places the received frame on the socket receive queue (block 677) and places the socket receive queue on the global work queue (block 678). In either case, engine 244 signals a global work event (block 679). Upon dispatching of a "receive eligible" event from the global work queue (see FIG. 13B), engine 244 de-queues the frame from the respective receive queue (block 680). It is possible that more then one IMP frame is received and queued before the Internet Mobility Protocol engine 244 can start de-queuing the messages. Engine 244 loops until all frames have been dequeue (blocks 681, 682). Once a frame has been de-queued ("yes" exit to decision block 681), engine 244 validates the received frame (block 683) and determines whether it is okay (decision block 684). If the received frame is invalid, engine 244 discards it (block 685) and de-queues the next frame from the receive queue (block 680). If the received frame is valid ("yes" exit to decision block 684), engine 244 determines whether it is associated with an existing connection (block 686). If it is not ("no" exit to decision block 686), engine 244 tests whether it is a sync frame (decision block 687). If it is not a sync frame ("no" exit to decision block 687), the frame is discarded (block 685). If, on the other hand, a sync frame has been received ("yes" exit to decision block 687), engine 244 processes it using a passive connection request discussed in association with FIGS. 14A and 14B (block 688).

If the frame is associated with a connection ("yes" exit to decision block 686), engine 244 determines whether the connection state is still active and not "post mortem" (decision block 689). If the connection is already "post mortem," the frame is discarded (block 685). Otherwise, engine 244 parses the frame (block 690) and determines whether it is an abort frame (decision block 691). If the frame is an abort frame, engine 244 immediately aborts the connection (block 691a). If the frame is not an abort frame ("yes" exit to decision block 691), engine 244 processes acknowledgment information and releases any outstanding send frames (block 692). Engine 244 then posts the frame to any security subsystem for possible decryption (block 693). Once the frame is returned from the security subsystem engine 244 processes any control data (block 694). Engine 244 then determines whether the frame contains application data (decision block 695). If it does, this data is queued to the application layer (block 696). Engine 244 also determines whether the connection's state is dormant (block 697 and 697a—this can happen on Mobility Management Server engine 244' in the preferred embodiment), and returns state back to established.

If the frame is possibly a "Mortis" frame ("yes" exit to decision block 698), engine 244 indicates a "disconnect" to the application layer (block 699) and enters the "Mortis" state (block 699a). It sends a "post mortem" frame to the peer (block 700), and enters the "post mortem" state (block 700a). Engine 244 then releases connection resources (block 701) and returns to sleep waiting for more work (block 702). If the parsed frame is a "post mortem" frame ("yes" exit to decision block 703), blocks 700a, 701, 702 are executed. Otherwise, control returns to block 680 to dequeue the next frame from the receive queue (block 704).

Passive Connections

Blocks 14A-14B are together a flowchart of example steps performed by Internet Mobility Protocol engine 244 in response to a "passive connection" request. Engine 244 first determines whether there is another connection for this particular device (block 720). If there is ("yes" exit to decision block 720), the engine determines whether it is the initial connection (decision block 721). If peer believes the new connection is the initial connection ("yes" exit to decision block 721), engine 244 aborts the previous connections (block 722). If not the initial connection ("no" exit to decision block 721), engine 244 tests whether the sequence and connection ID match (decision block 723). If they do not match ("no" exit to decision block 723), control returns to decision block 720. If the sequence and connection ID do match ("yes" exit to decision block 723), engine 244 discards duplicate frames (block 724) and returns to step 680 of FIG. 13B (block 725).

If there is no other connection ("no" exit to decision block 720), engine 244 determines whether it can allocate connection resources for the connection (decision block 726). If it cannot, an error is declared ("no" exit to decision block 726, block 727), and the connection is aborted (block 728). If it is possible to allocate connection resources ("yes" exit to decision block 726), engine 244 declares a "configure" state (block 726a) and acquires the security context for the connection (block 730). If it was not possible to acquire sufficient security context ("no" exit to decision block 731), the connection is aborted (block 728). Otherwise, engine 244 sends an established frame (block 732) and declares the connection to be in state "establish" (block 732a). Engine 244 then starts a retransmitter (block 733) and waits for the authentication process to conclude (block 734). Eventually, engine 244 tests whether the device and user have both been authenticated (block 735). If either the device or the user is not authenticated, the connection is aborted (block 736). Otherwise, engine 244 indicates the connection to the listening application (block 737) and gets the configuration (block 738). If either of these steps do not succeed, the connection is aborted (decision block 739, block 740). Otherwise, the process returns to sleep waiting for more work (block 741).

Abnormal Termination

Figure 15A:
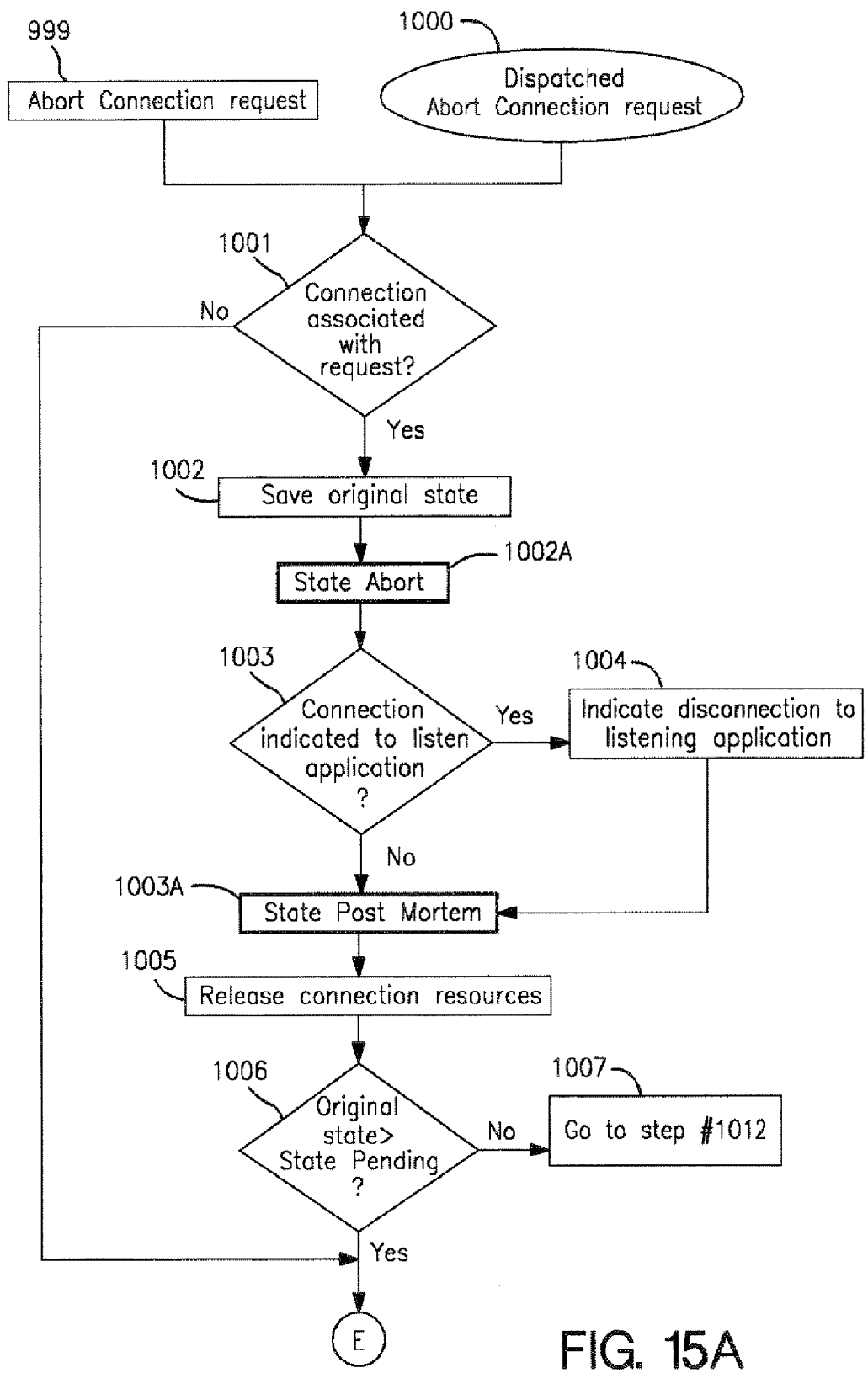
Figure 15B:
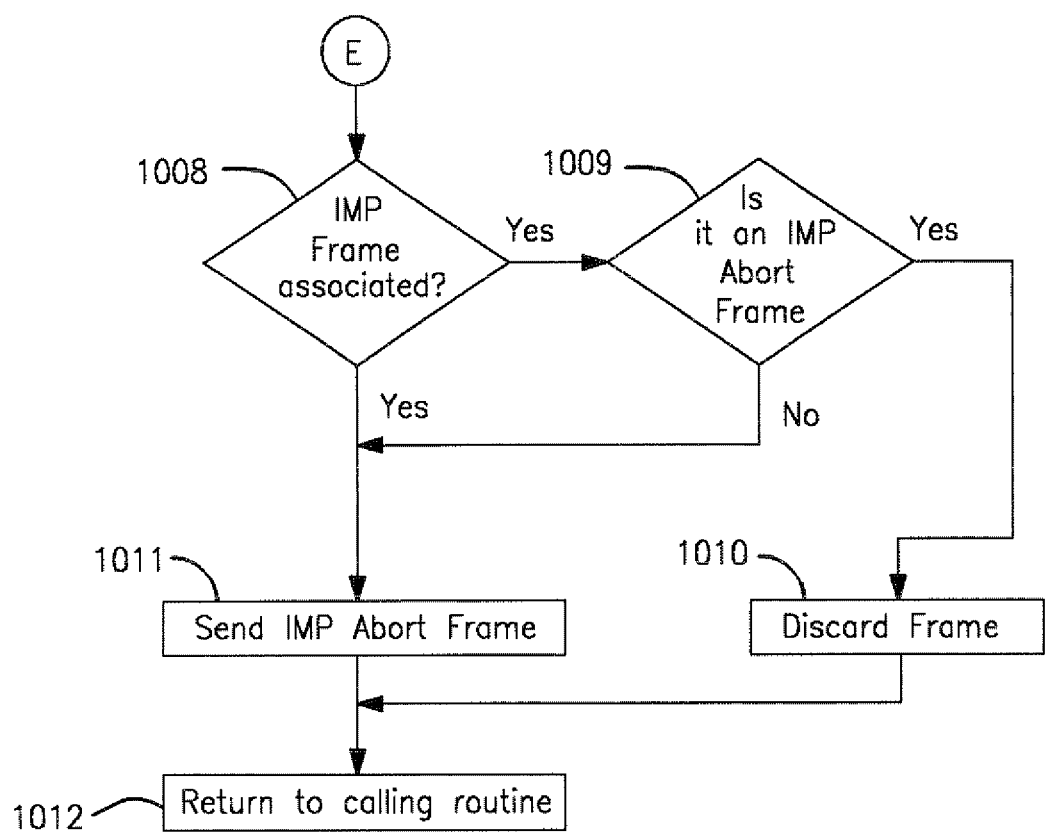

FIGS. 15A and 15B are a flowchart of example steps performed by the Internet Mobility Protocol engine 244 in response to an "abort" connection request. Upon receipt of such a request from another process (block 999) and are dispatched via the queue (block 1000), engine 244 determines whether a connection is associated with the request (decision block 1001). If it is ("yes" exit to decision block 1001), engine 244 saves the original state (block 1002) and declares an "abort" state (block 1002a). Engine 244 then determines whether the connection was indicated to the RPC engine (decision block 1003)—and if so, indicates a disconnect event (block 1004). Engine 244 then declares a "post mortem" state (block 1003a), releases the resources previously allocated to the particular connection (block 1005), and tests whether the original state is greater than the state pending (decision block 1006). If not ("no" exit to decision block 1006), the process transitions to block 1012 to return to the calling routine (block 1007). Otherwise, engine 244 determines whether the request is associated with a received frame (decision block 1008). If the abort request is associated with a received frame, and the received frame is an abort frame (decision block 1009), the received frame is discarded (block 1010). Otherwise engine 244 will send an abort frame (block 1011) before returning to the calling routine (block 1012).

Roaming Control

Referring once again to FIG. 1, mobile network 108 may comprise a number of different segments providing different network interconnects (107a-107k corresponding to different wireless transceivers 106a-106k). In accordance with another aspect of the present invention, network 108 including Mobility Management Server 102 is able to gracefully handle a "roaming" condition in which a Mobile End System 104 has moved from one network interconnect to another. Commonly, network 108 topographies are divided into segments (subnets) for management and other purposes. These different segments typically assign different network (transport) addresses to the various Mobile End Systems 104 within the given segment.

It is common to use a Dynamic Host Configuration Protocol (DHCP) to automatically configure network devices that are newly activated on such a subnet. For example, a DHCP server on the sub-net typically provides its clients with (among other things) a valid network address to "lease". DHCP clients may not have permanently assigned, "hard coded" network addresses. Instead, at boot time, the DHCP client requests a network address from the DHCP server. The DHCP server has a pool of network addresses that are available for assignment. When a DHCP client requests an network address, the DHCP server assigns, or leases, an available address from that pool to the client. The assigned network address is then owned" by the client for a specified period ("lease duration"). When the lease expires, the network address is returned to the pool and becomes available for reassignment to another client. In addition to automatically assigning network addresses, DHCP also provides netmasks and other configuration information to clients running DHCP client software. More information concerning the standard DHCP protocol can be found in RFC2131.

Thus, when a Mobile End System 104 using DHCP roams from one subnet to another, it will appear with a new network address. In accordance with one aspect of the present invention, Mobile End Systems 104 and Mobility Management Server 102 take advantage of the automatic configuration functionality of DHCP, and coordinate together to ensure that the Mobility Management Server recognizes the Mobile End System's "new" network address and associates it with the previously-established connection the Mobility Management Server is proxying on its behalf.

One example embodiment uses standard DHCP Discover/Offer client-server broadcast messaging sequences as an echo request-response, along with other standard methodologies in order to determine if a Mobile End System 104 has roamed to a new subnet or is out of range. In accordance with the standard DHCP protocol, a Mobile End System 104 requiring a network address will periodically broadcast client identifier and hardware address as part of a DHCP Discover message. The DHCP server will broadcast its Offer response (this message is broadcast rather than transmitted specifically to the requesting Mobile End System because the Mobile End System doesn't yet have a network address to send to). Thus, any Mobile End System 104 on the particular subnet will pick up any DHCP Offer server response to any other Mobile End System broadcast on the same subnet.

Figure 16:
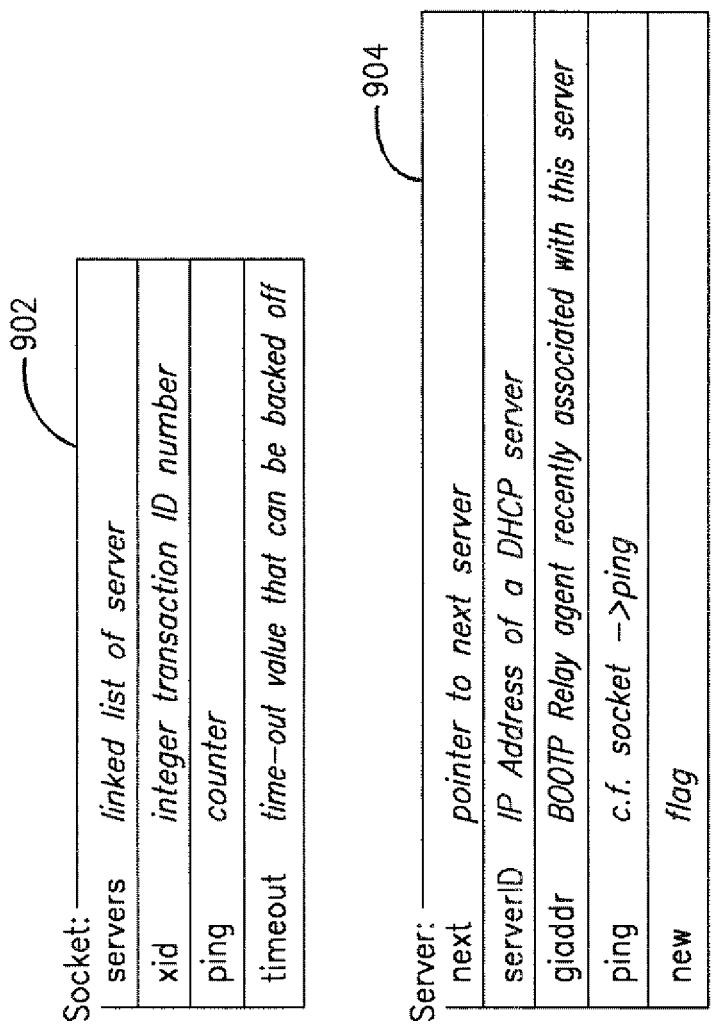
FIG. 16 shows example listener data structures.

This example embodiment provides DHCP listeners to monitor the DHCP broadcast messages and thereby ascertain whether a particular Mobile End System 104 has roamed from one subnet to another and is being offered the ability to acquire a new network address by DHCP. FIG. 16 shows example DHCP listener data structures. For example, a Mobile End System listener data structure 902 may comprise:
 a linked list of server data structures,
 an integer transaction ID number (xid),
 a counter ("ping"), and
 a timeout value.
A server data structure 904 may comprise a linked list of data blocks each defining a different DHCP server, each data block comprising:
 a pointer to next server,
 a server ID (network address of a DHCP server),
 an address (giaddr) of a BOOTP relay agent recently associated with this DHCP server,
 a "ping" value (socket→ping), and
 a flag.
These data structures are continually updated based on DHCP broadcast traffic appearing on network 108. The following example functions can be used to maintain these data structures:
 roamCreate( ) [initialize variables]
 roamDeinitialize( ) [delete all listeners]
 roamStartIndications( ) [call a supplied callback routine when a Mobile End System has roamed or changed interfaces, to give a registrant roaming indications]
 roamStopIndications( ) [remove the appropriate callback from the list, to stop giving a registrant roaming indications]
 Interface Change [callback notification from operating system indicating an interface has changed its network address]
 Listener Signal [per-interface callback from a Listener indicating a roaming or out-of-range or back-in-range condition].

Additionally, a refresh process may be used to update Listeners after interface changes.

In the preferred embodiment, all Mobile End Systems 104 transmit the same Client Identifier and Hardware Address in DHCP Discover requests. This allows the listener data structures and associated processes to distinguish Mobile End System-originated Discover requests from Discover requests initiated by other network devices. Likewise, the DHCP server will broadcast its response, so any Mobile End System 104 and/or the Mobility Management Server 102 will be able to pick up the DHCP server Offer response to any other Mobile End System. Since multiple DHCP servers can respond to a single DHCP Discover message, the listener data structures shown in FIG. 16 store each server response in a separate data block, tied to the main handle via linked list.

Upon receiving a Discover request having the predetermined Client Hardware Address and Client Identifier, the preferred embodiment recognizes this request as coming from a Mobile End System 104. If the message also has a BOOTP relay address set to zero, this indicates that the message originated on the same subnet as the listener. Listeners may ignore all DHCP Offers unless they have a transaction ID (xid) matching that of a Discover message recently sent by a Mobile End System 104. The listener can determine that a Mobile End System 104 has roamed if any response comes from a known server with a new BOOTP relay agent ID and/or offered network address masked with an offered subnet mask. Listeners add new servers to the FIG. 16 data structures only after receiving a positive response from an old server. If a listener receives responses from new server(s) but none from an old server, this may indicate roaming (this can be a configurable option). If the listener fails to receive responses from new or old servers, the listener is out of range (this determination can be used to signal an upper layer such as an application to halt or reduce sending of data to avoid buffer overflow).

If the listener never receives a response from any server, there is no point of reference and thus impossible to determine whether roaming has occurred. This condition can be handled by signaling an error after a timeout and allowing the caller to retry the process. The preferred embodiment determines that a Mobile End System 104 has roamed if any response has come from a known server with a new BOOTP relay agent ID (or a new offered network address when masked with offered subnet mask). If the listener data structures see responses from new servers but none from an old server, it is possible that roaming has occurred, but there must be a delay before signaling, in order to wait for any potential responses from the old servers. If there are no responses from new or old servers, then the Mobile End System 104 is probably out of range and Mobility Management Server 102 waits for it to come back into range.

Figure 17:
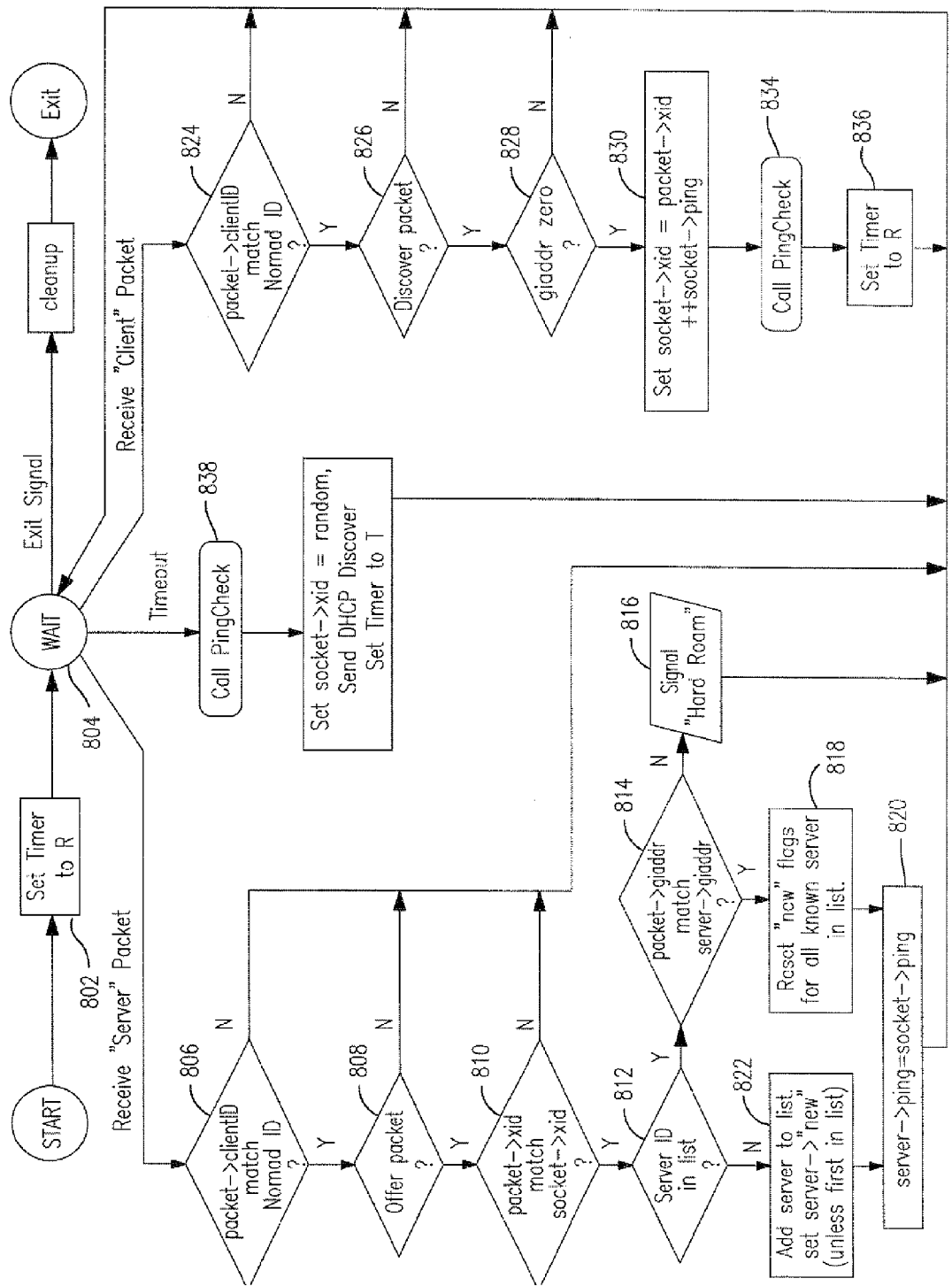
FIGS. 17, 17A and 18 are flowcharts of example steps performed to provide for mobile interconnect roaming.

FIG. 17 is a flowchart of example steps of a Listener process of the preferred embodiment. Referring to FIG. 17, a DHCP listener process is created by allocating appropriate memory for the handle, opening NAL sockets for the DHCP client and server UDP ports, and setting receive callbacks for both. A timer is then set (block 802) and then the process enters the "Wait" state to wait for a roaming related event (block 804). Three external inputs can trigger an event:
 a DHCP server packet is received;
 a DHCP client packet sent by another Mobile End System is received
 a timer timeout occurs.

If a DHCP server packet has been received, the packet is examined to determine whether its client identifier matches the predetermined client ID (decision block 806). If it does not, it is discarded. However, if the packet does contain the predetermined ID, a test is performed to determine whether the packet is a DHCP Offer packet (decision block 808). Offer packets are rejected unless they contain a transaction ID matching a recently sent DHCP Discover sequence.

If the packet transaction ID matches (block 810), then a test is made as to whether the server sending the DHCP offer packet is known (i.e., the server ID is in the listener data structure shown in FIG. 16) (block 812). If the server ID is not on the list ("no" exit to decision block 812), it is added to the list and marked as "new" (or "first" if it is the first server on the list) (block 822). If the server is already on the list ("Y" exit to decision block 812), a further test is performed to determine whether the packet BOOTP relay address ("GIADDR") matches the server address ("GIADDR") (decision block 814). If there is no match, then the Offer packet must be originating from a different subnet, and it is determined that a "hard roam" has occurred (block 816). The caller application is signaled that there has been a roam. If, on the other hand, decision block 814 determines there is a match in BOOTP relay addresses, then no roam has occurred, the listener process stamps the server receive time, resets "new" flags for all other servers on the list, and stores the current ping number with the server (block 818, 820). The process then returns to "wait" period.

If the event is a received client packet, the listener process determines whether the packet has the predetermined client ID, is a DHCP Discover packet and has a BOOTP relay address (GIADDR) of 0 (blocks 824, 826, 828). These steps determine whether the received packet is DHCP Discover message sent by another Mobile End System 104 on the same sub-net as the listener. If so, the listener process then sets the transaction ID to the peer's transaction ID (block 830) for use in comparing with later-received DHCP Offer packets, calls a ping check (block 834) and resets the timer (block 836).

Figure 17A:
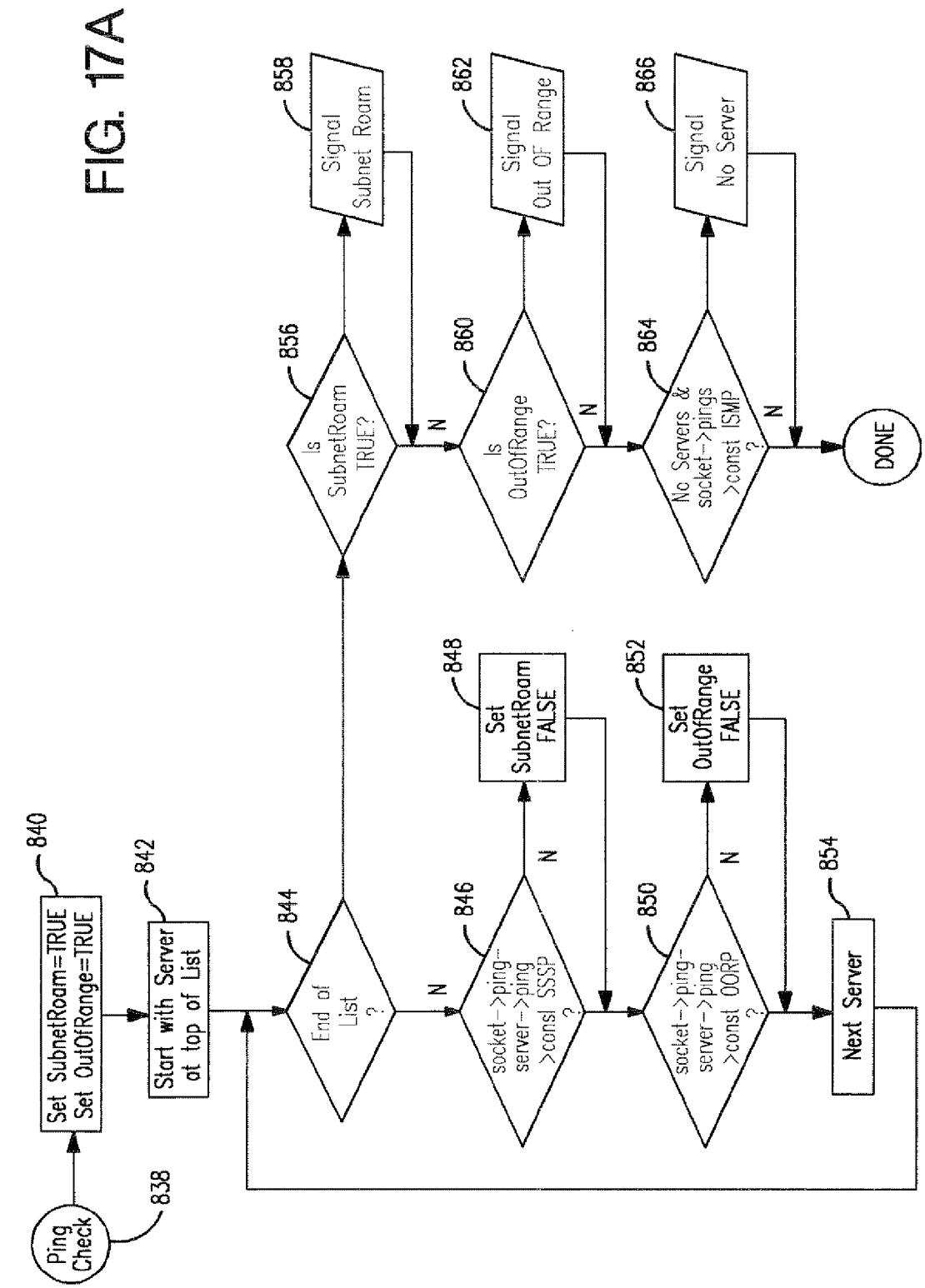

In response to a timer timeout, the process calls a "ping check" (block 838). "Pings" in the preferred embodiment are DHCP Discover packets with a random new xid. Example steps for this ping check 838 are shown in FIG. 17A. The purpose of the ping check routine is to determine if a "soft roam" condition has occurred (i.e., a Mobile End System has temporarily lost and then regained contact with a sub-net, but has not roamed to a different sub-net). The process determines whether there is a sub-net roam condition, an out-of-range condition, or a "no server" condition. In other words:

Has a Mobile End System roamed from one sub-net to another?
Is a Mobile End System out of range?
Is a DHCP server absent?

These conditions are determined by comparing Mobile End System prior "ping" response with the current "ping" response (decision blocks 846, 850). For example, if the current ping number minus the old server's last ping response is greater than the sub-net server pings and there is at least one server marked "new," there has been a sub-net roam to a different server. The result of this logic is to either signal a subset roam, and out of range condition or a no server condition (or none of these) to the calling process.

Figure 18:
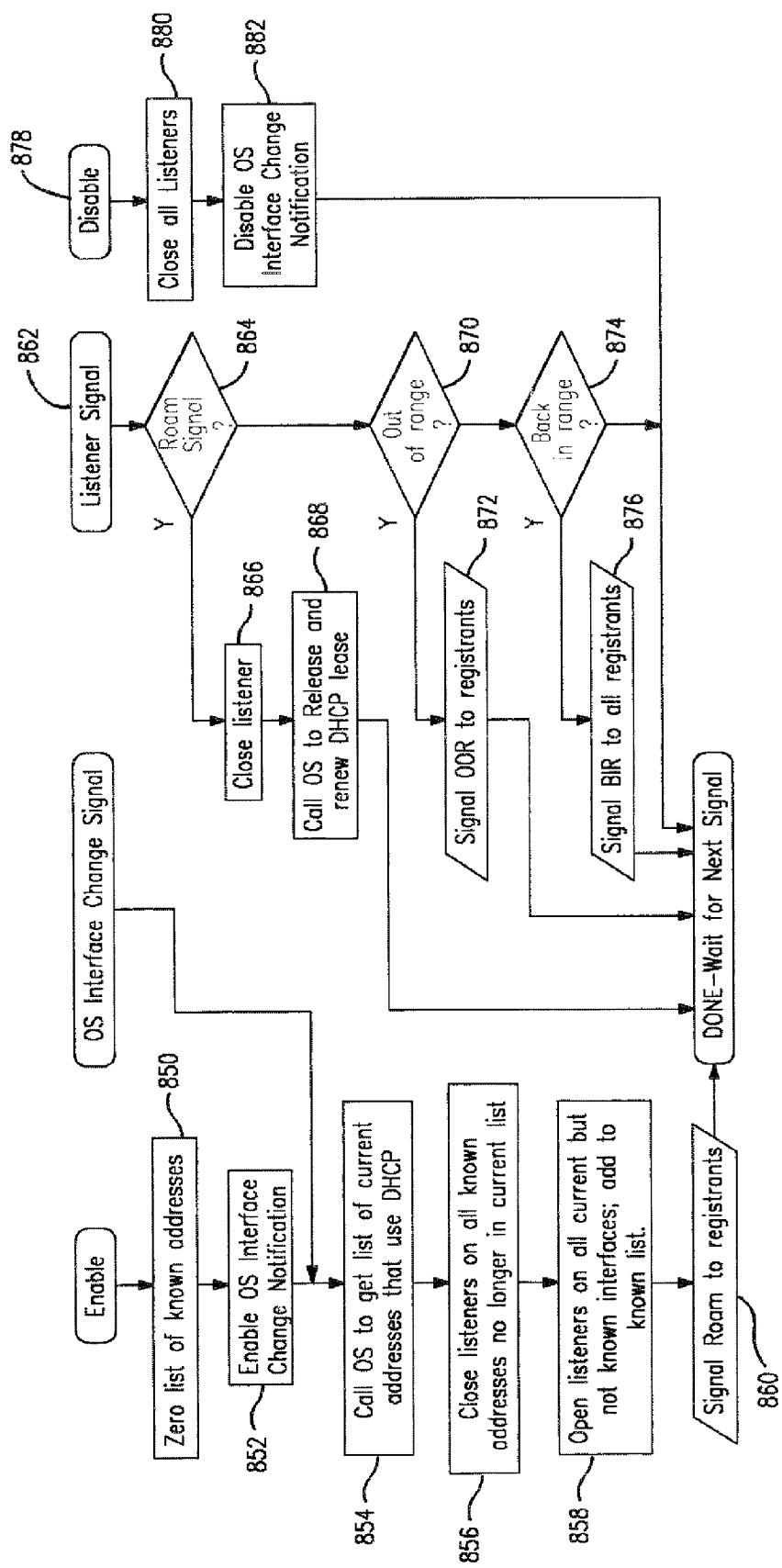

FIG. 18 shows a flowchart of example steps performed by a Mobile End System 104 roaming control center. To enable roaming at the Mobile End System 104, the list of known addresses is initialized to zero (block 850) and an operating system interface change notification is enabled (block 852). The process then calls the operating system to get a list of current addresses that use DHCP (block 854). All known addresses no longer in the current list have their corresponding listeners closed (block 856). Similarly, the process opens listeners on all current but not known interfaces (block 858). The process then signals "roam" to registrants (block 860).

When the listener process of FIG. 17 signals (block 862), the process determines whether the signal indicates a "roam", "out of range" or "back in range" condition (decision block 864, 870, 874). A roam signal ("yes" exit to decision block 864) causes the process to close corresponding listener 866 and call the operating system to release and renew DHCP lease to a network address (block 868). If the listener signals "out of range" (decision block 870), the process signals this condition to registrants (block 872). If the signal is a "back in range" (decision block 874), then this condition is signaled to all registrants (block 876). Upon receiving a disabled roam command (block 878), the process closes all listeners (block 880) and disables the operating system interface change notification (block 882).

Interface Assisted Roaming Listener

A further, interface-based listener feature enables roaming across network points of attachment on the same network or across different network media. This interface-based listener feature operates without requiring the beaconing techniques described above, while permitting the system to fall back on beaconing if the underlying interface(s) is unable to support the appropriate signaling.

Figure 19A:
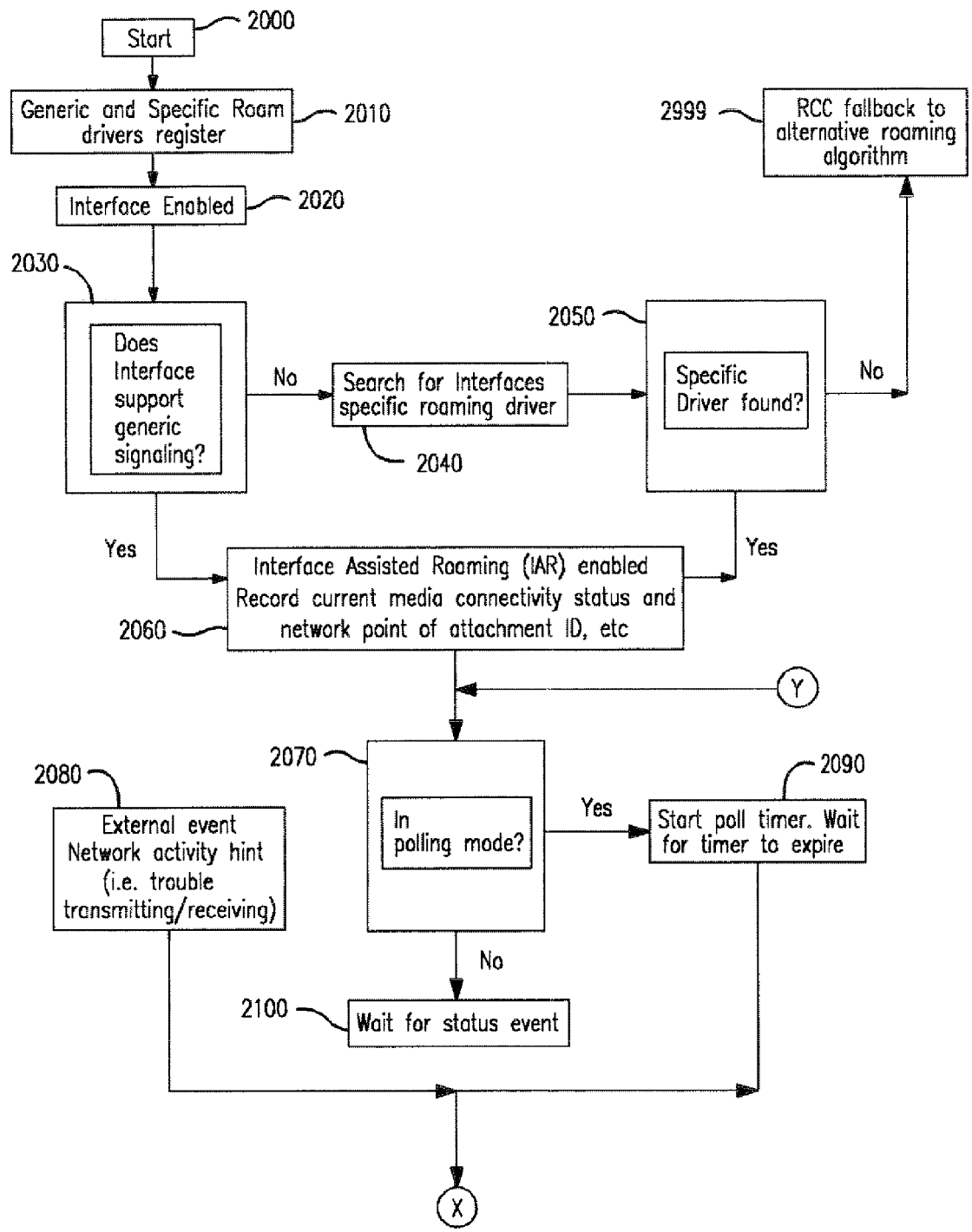
FIGS. 19A and 19B are together a flowchart of an example interface-assisted roaming process.
Figure 19B:
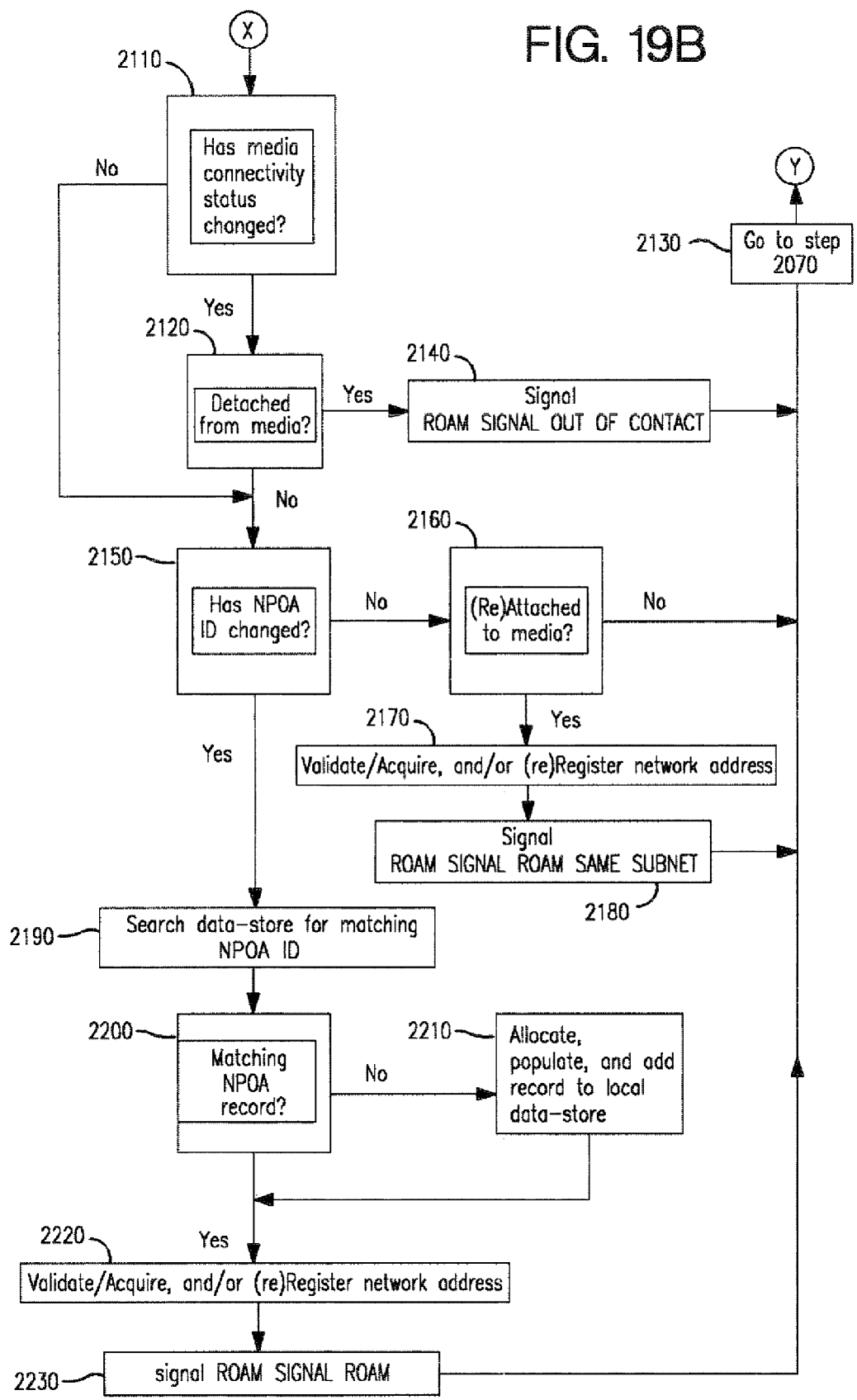

In this further embodiment, an interface-based listener integrates information from network interface adapters (e.g., via a low level interface roaming driver) with information available from network stacks to determine whether a mobile node has moved to a new Network Point of Attachment. FIGS. 19A & 19B show an example listener algorithm that may be used to efficiently determine the migration path of the mobile node. This process is shown using a single network interface connected to a single network medium, but can be used by itself or in conjunction with other roaming algorithms to traverse across many diverse network media and interfaces (e.g., to create a self-healing infrastructure using redundant paths).

Referring to FIG. 19A, at system initialization time or when the network adapter driver loads (FIG. 19A, block 2000), low-level interface roaming drivers register with the roaming control center module of FIG. 18 (block 2010). Such registration (which is made via the function crRegisterCardHandler( ) in the example embodiment) provides entry points for:

open,
close,
get status, and
a Boolean set to TRUE if the driver can notify the registrant of changes in status, and FALSE if the roaming control center module should use timer-based (or other) polling to check status.

The example embodiment function crRegisterCardHandler( ) also provides a interface description string or token that can be used by the roaming control center module for preliminary match-ups to the correct roaming driver. A default roaming driver may also be installed for interfaces that use an O/S generic mechanism for signaling/querying media connectivity as well as changes to network point of attachments.

In the example embodiment, when an interface's state becomes enabled (i.e. access to the network is now possible) (block 2020), the roaming control center tries to enable Interface Assisted Roaming (IAR) according to the following steps (please note however, that the steps may be interchanged or either might be omitted based on the design of the operating system (O/S) and/or the hosting device being used in a particular application):

1. If a generic handler is installed, a call to the generic crOpenInstance( ) handler is made. The generic handler queries the low-level adapter driver to see if it can generically support signaling the status of media connectivity as well as any changes to the network point of attachment (block 2030). If the interface driver is unable to support this functionality generically ("no" exit to block 2030), an error status is returned to the caller to indicate that it should use an alternative mechanism for acquiring signaling information.

2. If the generic handler returns an error ("no" exit to block 2030), a search is made with the token of the activated interface through the currently registered roaming drivers (block 2040). If the interface matches one of the tokens that was registered during crRegisterCardHandler( ) phase (block 2050), the roaming control center calls the specific crOpenInstance( ) for that instance of the adapter. This function attempts to open the low level driver, poll once for status (media connectivity, and the network point of attachment ID), and set the periodic polling timer (if applicable). If the low-level driver does not support the requests for some reason, an error is returned indicating that the roaming control center should use and alternate mechanism for acquiring signaling information.

3. If either of the previous steps is unable to achieve the required functionality, an error is returned to the roaming control center to signal that it should not use the IAR functionality and fall back to other roaming algorithms, such as the beaconing listener shown in FIGS. 17 & 17A, Mobile IP, or in some cases the currently attached network itself deals with roaming ("no" exit to block 2050, block 2999). Otherwise Interface Assisted Roaming is enabled (block 2060) and the roaming control center follows the algorithm outlined below.

Initially, the interface-assisted listener records current media connectivity status and network point of attachment identification information in a local data store (block 2060). Assuming the interface assisted subsystem is successful in providing roaming feedback, the subsystem waits for a status event (block 2100). The event can comprise, for example:

a callback from the low level roaming driver,
a timed poll interval (blocks 2070, 2090), or
a hint from network level activity (i.e. trouble transmitting/receiving) (block 2080).

If the status of the interface signifies either a change in medium connectivity has occurred, or a change in network point of attachment ("yes" exit to block 2110 or 2120 of FIG. 19B), any clients of the roaming control center are notified of the state change using the following rules:

1. If the status signifies a change from being connected to the underlying network medium to being detached ("yes" exit to block 2120) and there are no other paths to the peer, the listener concludes that the mobile end system has lost its connection, and the roaming control center signals its clients with a status of ROAM_SIGNAL_OUT_OF_CONTACT (block 2140).

2. If the status signifies that the interface has been reconnected to the medium, and the network point of attachment has not changed ("no" exit to block 2150 after "no" exit to block 2120) and a ROAM_SIGNAL_OUT_OF_CONTACT was previously signaled, this indicates that the mobile end system had previously lost but has now reestablished contact with a particular network point of attachment. In this case, the roaming control center will revalidate any network address it may have registered or acquired for proper access (block 2170), and signals ROAM_SIGNAL_ROAM_SAME_SUBNET (block 2180) to alert the roaming control center clients that a reattachment has occurred and that they should take whatever steps necessary to quickly reestablish transport level communications. For example, during the disruption in service it is possible that some data may have been lost—and the clients may need to act to recover such lost data.

3. If the status signifies that the interface is attached to the medium but the network point of attachment has changed ("yes" exit to block 2150), the roaming control center will signal its clients that a roaming condition has occurred. To more efficiently support handoffs between network point of attachments, the roaming control center in this example employs the use of a learning algorithm along with a local data-store. The data-store is normally populated dynamically (i.e. learning), but it can be seeded with static information (i.e., already learned information) to improve performance. The data-store itself maintains a list of network points of attachment identifiers, along with information such as network and media access address, network mask, etc. This "network topology map" assists the roaming control center in deciding the correct signal to generate to its clients.

Determination of the correct signal is done in the following manner in the example embodiment:

a) A search is made through the network topology map data-store to determine if the interface has already visited this particular network point of attachment (block 2190). If a match is found ("yes" exit to block 2200), a further check is made to see if the network point of attachment is on the same network segment as the one that the interface was previously associated with. If the network segment is the same, the roaming control center generates a ROAM_SIGNAL_ROAM_SAME_SUBNET. This alerts the roaming control center clients that a handoff occurred and it should take whatever steps necessary to quickly reestablish transport level communications as during the handoff it is possible that some data may have been lost.

b) If during the search a match is found, but the new network point of attachment is not on the same network segment, then the listener concludes that the mobile end system has roamed to a different subnetwork. In this case, the roaming control center:

acquires an address that is usable on the new network segment (block 2220). This may entail registering the current address to be valid on the new segment, (re)acquiring an address from a local server, having one statically defined, or using heuristics to determine that an address that was previously assigned is still valid. In the latter case, the roaming control center may determine that the interface is changing between a given set of network point of attachments and may not immediately relinquish or de-register the network address for performance reasons. In this example, there is a difference between acquiring an address on the network (e.g., via DHCP) or registering the address on the local network (e.g., via a foreign agent in Mobile IP). The roaming entity either (re)acquires (e.g., possibly establishing/updating a lease with the DHCP server) or registers the current address with a foreign agent (Mobile IP).

Generates a ROAM_SIGNAL_ROAM signal to its clients (block 2230) indicating roaming to a different subnet.

c) If the search yields no match ("no" exit to block 2200), a new record is created in the local data-store populated with the network point of attachment's identifier, media access address, network mask and other ancillary information (block 2210). The roaming control center then executes blocks 2220 and 2230 to acquire and register a network address, and to generate a "roam" signal.

Since the interface-assisted roaming technique described above gives access to the underlying interface information, it is possible to employ an additional set of policy parameters (possibly defined by the user) that can enable automatic efficient selection of alternate valid network paths. If there is more than one network available at a time, the subsystem can choose the path(s) with the least cost associated with it (i.e., a wide area network connection versus a local area connection). This can be done by a number of metrics such as, for example, bandwidth, cost (per byte), and/or quality of service. Such "least cost routing" techniques can provide advantages in terms of network connection quality, efficiency, and reduction in frame loss. It can even provide for the possibility of a "make before break" handoff scheme based on other heuristics available (media connectivity, signal strength, retransmission rate, etc.), thus allowing continuous packet flow with minimal loss to and from the roaming node.

FIG. 20 shows an example interface assisted roaming topology node data structure. FIG. 20 shows this data structure implemented as a linked list, but it could alternatively be represented as an array where the next and previous fields are omitted. In a wireless network infrastructure, the "NPOA" may, for example, be the MAC address of the access point or base station that the mobile node is associated with. In other networks, it may be the unique identifier of an intervening network interconnect (e.g., gateway, IWF, etc.). The data structure may be seeded with static information or dynamically learned. Other information may also be associated with each node (e.g., MTU size, latency, cost, availability, etc.)

FURTHER EXEMPLARY ILLUSTRATIVE NON-LIMITING IMPLEMENTATIONS TO HANDLE CERTAIN RACE CONDITIONS

Through further experimentation evidence has shown that some network adapters may erroneously signal that they are (re)connected to the medium before they are totally registered on the network segment. In some instances during roaming events the storage area of where the network identifier is kept may not yet been updated, and thus it is possible for the system to incorrectly believe that these adapters have roamed back onto the same subnet. Eventually, when the device finishes registering, the storage area is updated with the new network identifier, causing yet another ROAM signal to be generated. This scenario would correctly work both pieces of information were gated together and only signaled once when the interface was finished registering with the network. However when polling it is difficult to determine when the network ID is valid if the "in contact with network" signal is generated previously.

In essence the roaming node may in fact be in media connectivity state since it can communicate at the media access level with the network, but in fact one cannot yet send any application data across the link since the registration process has not completed. Therefore, it is desirable to compensate for this condition. One way to provide such compensation is to determine peer connectivity by sending link confirmation frames, or what is more commonly known as an echo request/response packets. These echo or ping frames are generated by one peer (most likely the roaming node), to determine if two-way peer-to-peer connectivity is achievable. If the requesting peer receives a response frame to its request, it can be concluded that a duplex path has been achieved. At this point, the NPOA information can be regarded as valid until the next disconnect situation is realized. Other information, such as the reception of any frame from the peer on the interface in question, also allows the roaming node to assume the registration process has concluded and two-way communications is achievable.

Another race condition between the network interface and the underlying protocol stack situation has arisen that can sometimes cause a problem. It is possible for a device to have roamed to a new network segment and been signaled correctly from the interface below, but the transport stack itself has not made the necessary adjustments to its routing table(s) for application data to flow. To compensate for this condition, an additional signal ROAM_SIGNAL_ROUTE_CHANGE, was added and is generated whenever the underlying transport's routing table changes. When this signal is indicated, the roaming subsystem clients take whatever action is necessary to determine if connectivity to the peer systems is achievable. This may entail the roaming client to enumerate through the underlying transport's routing table to determine if the routing modification has affected the communications path to the peer. Other more intrusive algorithms, such as the ones described above, can also be used to confirm that a two-way communication path exists between the peers.

Roaming Across Disjoint Networks

A further aspect of an example preferred embodiment of our invention provides an algorithm and arrangement for accessing the MMS (Mobility Management Server) in what we call "disjoint networking" mode. The new algorithm allows for dynamic/static discovery of alternate network addresses that can be used to establish/continue communications with an MMS—even in a disjoint network topology in which one network may have no knowledge of network addresses for another network.

In general, the algorithm allows for a list of alternate addresses that the MMS is available at to be forwarded to an MES (Mobile End System) during the course of a conversation. Thus, the MMS uses a connection over one network to send the MES one or more MMS network addresses or other MMS identities corresponding to other networks. As one example, this list can sent during circuit creation. It is also possible for the list to change midstream. In this case, the list can be updated at any time during the connection.

If/when the MES roams to another network, it uses the list of MMS "alias" addresses/identifications to contact the MMS from the new network point of attachment. This allows the MES to re-establish contact with the MMS over the new network connection even though the primary and ancillary networks may not share any address or other information.

Figure 21:
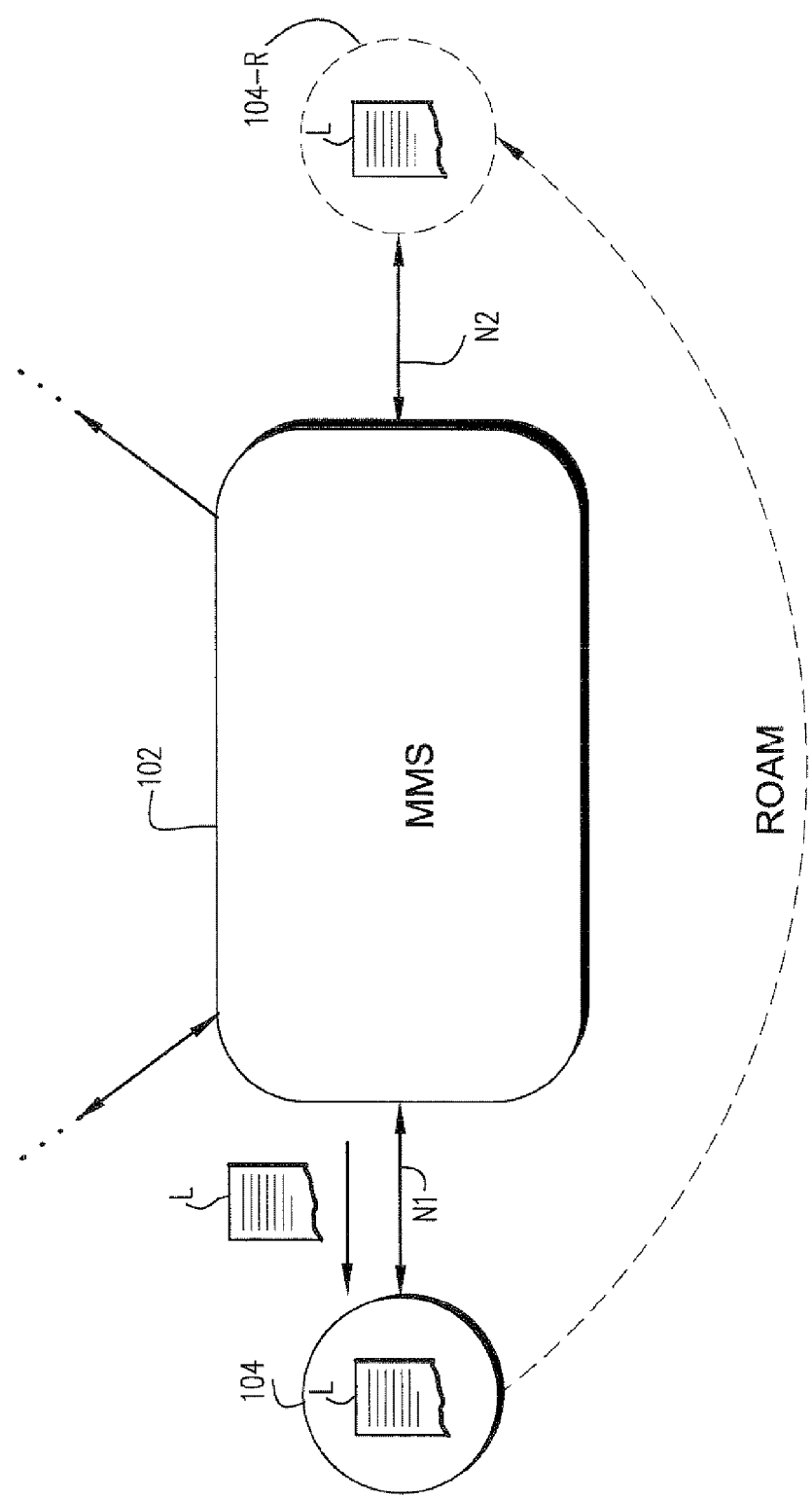
FIG. 21 shows an example technique for distributing mobility management system network addresses to mobile end systems in a disjoint network topology.

FIG. 21 shows a simplified flowchart of this new technique. Suppose that the MMS 102 is connected to two different disjoint networks or network segments N1 and N2. Suppose that the MES 104 is initially coupled to the MES 102 via network N1. Once a connection has been established between the MES 104 and the MMS 102 over network N1, the MMS 102 can send the MES 104 a list L of network addresses or other identifiers that the MMS is called on one or more other networks (e.g., network N2). The MES 104 receives and stores this list L. Then, when the MES 104 roams to another network (N2), it can access this stored list L and use it to efficiently re-establish communication with the MMS 102 over the new network (N2).

There are at least several uses for this new algorithm in addition to the ability to more efficiently obtain an alternative network address or other identifier for communicating with the MMS 102 over a disjoint network. One example usage is secure network operation. For example, using the algorithm shown in FIG. 21, one can setup a secure network where the MMS 102 is used as a secure firewall/gateway from a multitude of networks (some/all may be wireless) and a corporate backbone, and allow for secure and seamless migration of the mobile node 104 between all disassociated networks. Think, for example, of the MMS 102 as a hub, with one fat pipe connecting to the corporate network and many little spokes connecting many logically discrete networks. Since they are logically discrete, traffic on one network segment cannot reach another, except through the MMS 102 (which can act as a router in this example).

Normally for a node to roam from network segment to network segment, there must be routing information/paths provided on each network segment (i.e. default route, etc) specifying how to get back to the "main public or initial address" used to contact the MMS 102. Once a connection is established, that address is used for the life of the connection. When a frame is sent from the MES 104, the IP network (layer 3) infrastructure on the client and intermediary nodes (routers) looks at the destination address of the frame and correctly forwards the packet on to its ultimate destination (the MMS 102). This is done by using what is commonly referred to as IP forwarding, or IP routing. With this functionality turned on, frames (broadcasts, etc) from one network segment can leak onto another. By not using IP forwarding, frames sent on one segment are not forwarded onto the other, thus breaking the communications pipe or creating a disjoint network.

The alternate address list shown in FIG. 21 has the effect of pushing or distributing some of the routing intelligence out to the MES 104. Each segment therefore can be kept discrete and without knowledge of any other segment attached to the MMS 102. The MES 104 can be authenticated by the MMS 102 so that the MMS only sends a list L to authorized MES units 104. When the MES 104 roams onto another networks segment, it can automatically select the correct address to use to initiate/continue communications with the MMS midstream, thus solving the disjoint network problem, and not require any changes to the routing infrastructure. This provides for a more secure computing environment by only letting validated users gain access to the network.

For example, by using the MMS 102 in this manner combined with user level security/encryption, we can limit traffic from and to the corporate backbone to only the frames destined for those nodes on that segment using the roaming techniques described above. Frames can be optionally encrypted to thwart any potential eavesdropping by devices that may be validated by the spoke network infrastructure.

Figure 22:
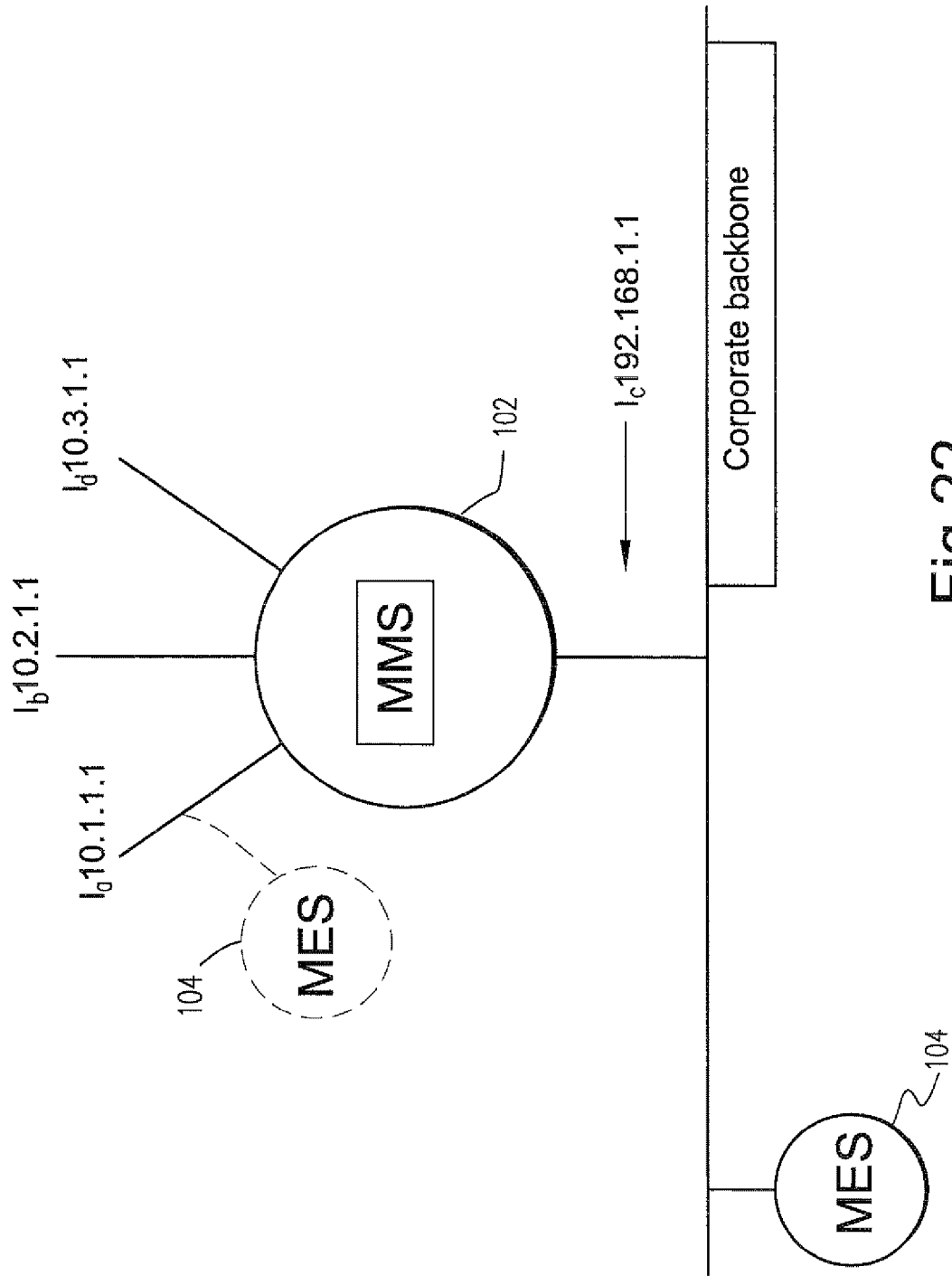
FIG. 22 shows an example use of the FIG. 21 technique to provide secure communications.

FIG. 22 shows an example. In FIG. 22, the MMS 102 is attached to four separate and distinct networks (Ia, Ib, Ic, Id) without any interconnects or route information shared. For all intents and purposes, each network I is an island. Now envision an MES 104 being docked to one of the networks (e.g., Ic) using a wired connection on the corporate backbone. For example, suppose that the MES 104 acquires an address on the 192.168.x.x network to communicate with the MMS 102.

Now suppose that for some reason, the MES now needs to migrate or roam to the 10.1.x.x (Ia) network. Since the 10.1.x.x (Ia) network has no knowledge of the 192.168.x.x (Ib) network (i.e. no routes to it), when the MES 104 moves into its domain, the communication pipe is broken even though the MMS is attached to it. Again, the same thing happens when the mobile node 104 attaches to any of the other 10.x networks depicted.

Now using the algorithm shown in FIG. 21, the MMS 102 at connection initiation time (or by some other method) shares its interfaces address on each of the various disjoint networks Ia, Ib, Ic, Id with the MES 104 and the MES records these. Once recorded, if the MES 104 roams into any one of the networks and detects that it has roamed onto a new network segment, the MES can now select the appropriate network address to communicate with the MMS for that network segment. If more then one address can be used, the MES 104 can select the appropriate address to use based on a number of metrics such as speed, cost, availability, hops, etc. An MES 104 that has not received a list as in FIG. 21 may be effectively prevented from roaming between the various networks because it has no way to contact the MMS over any network other than its "home" network.

Another application for the FIG. 21 technique is in distributed network interfaces. In today's networks, folks have deployed what is known as Network Address Translators (NATs). By use of this conventional technology, one can have many network devices use only one public network address for access to information on the Internet. The technology provides this functionality by funneling all information and queries destined to the Internet through a single/few device(s). The device(s) records the request at the network layer, then remaps the address and port information in the packet to the devices own address/port tuple and sends it onto its destination. Upon reception of a frame from the Internet or other such network, the device(s) does the reverse look and forwards it back to the correct source by replacing its address/port tuple with that of the initiating device. These mappings may be defined statically also at the NAT.

Suppose someone wants to use the MMS 102 for the LAN/WLAN internally and have it sit behind a NAT. Currently, unless the MMS 102 is the NAT, or by using a different proxy for all communications with the MMS, when someone roams outside of the bounds of the intranet, the MMS is no longer accessible since the address to converse with it is no longer accessible. With the FIG. 21 algorithm, one can statically/dynamically define another interface address that is not directly attached to the MMS. Therefore, using the algorithm described above, the MES 104 can now automatically select the appropriate disjoint address to use when attaching to a network that is outside the intranet's domain.

Figure 23:
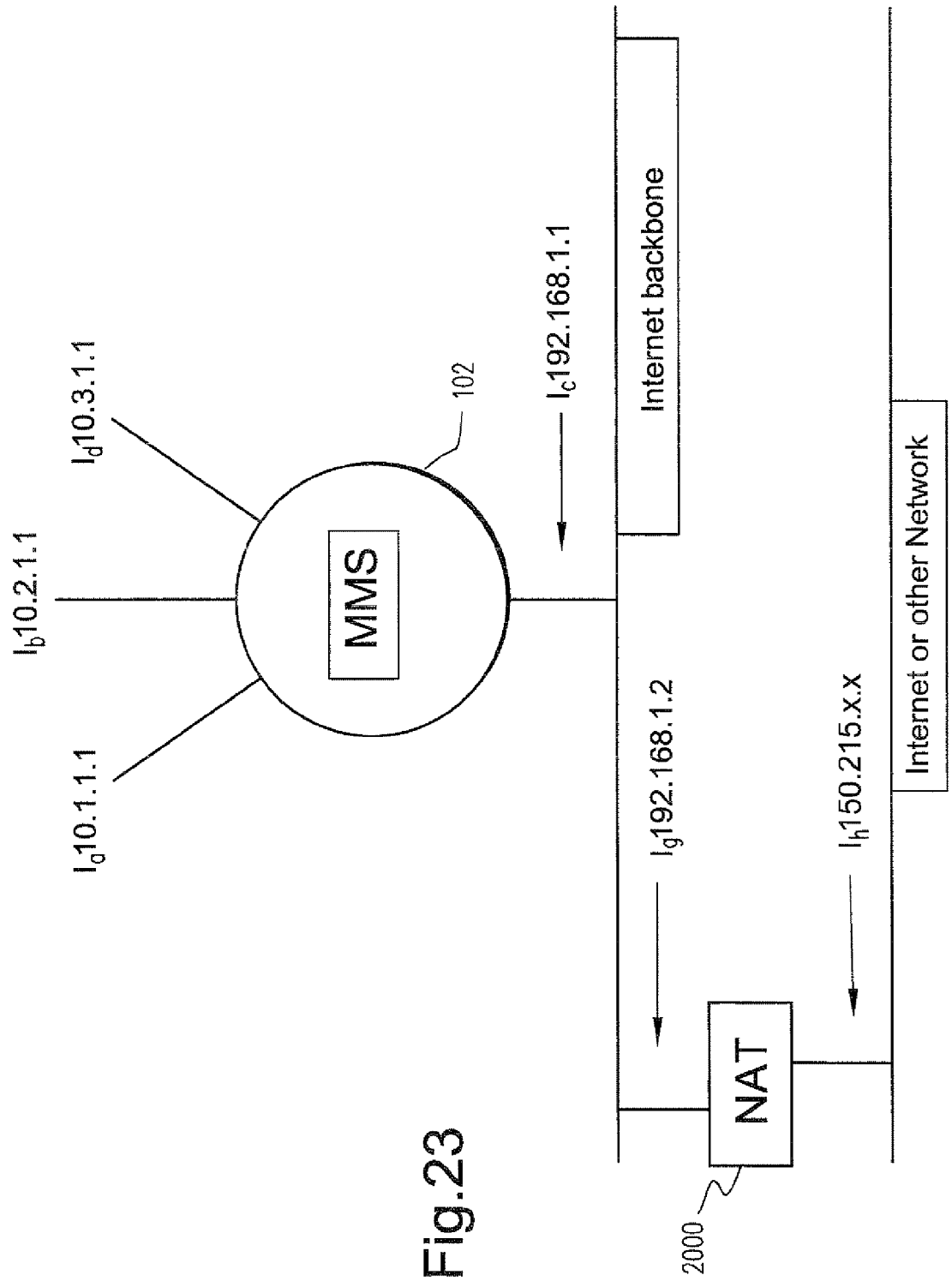
FIG. 23 shows an example use of the FIG. 21 technique to provide network address translation in a distributed network interface scenario.

FIG. 23 illustrates this scenario. Suppose a node migrates from interface "d" to interface "g". Just supplying the MMS 102 local interfaces would not allow access. The MES 104 needs a priori knowledge of the distributed interface. It can then select the necessary address to use on interface "g". The NAT 2000 will then do the appropriate translation of network address/port information on each packet to the internal interface "c" address. The reverse operation will happen on frames sent by the MMS 102 to the MES 104.

EXAMPLES

The present invention finds application in a variety of real-world situations. For example:

Intermittently Connected Portable Computer

Many businesses have employees who occasionally telecommute or work from home. Such employees often use laptop computers to get their work done. While at work, the employees typically connect their laptop computers to a local area network such as an Ethernet through use of a docking port or other connector. The LAN connection provides access to network services (e.g., printers, network drives) and network applications (e.g., database access, email services).

Now suppose an employee working on a project needs to go home for the evening and wants to resume working from home. The employee can "suspend" the operating system and applications running on the laptop computer, pack up the laptop computer, and bring the laptop computer home.

Once home, the employee can "resume" the operating system and applications running on the laptop computer, and reconnect to the office LAN via a dialup connection and/or over the Internet. The Mobility Management Server (which continued to proxy the laptop computer vis-a-vis the network and its applications during the time the laptop computer was temporarily suspended) can re-authenticate the laptop computer and resume communicating with the laptop computer.

From the perspective of the employee now working from home, all of the network drive mappings, print services, email sessions, database queries, and other network services and applications, are exactly where the employee left them at the office. Furthermore, because the Mobility Management Service continued to proxy the laptop computer's sessions, none of those network applications terminated the laptop computer's sessions during the time the employee was traveling from the office to home. The invention thus provides efficient persistence of session across the same or multiple network mediums that is very powerful and useful in this and other contexts.

Mobile Inventory and Warehouse Application

Imagine a large warehouse or retail chain. Within this campus, inventory workers use vehicle mounted (i.e., trucks and forklifts) personal laptop computers and handheld data collection units and terminals to perform inventory management of goods. Warehouse and retail workers are often inexperienced computer users that do not understand network sub-nets and require management supervision. The present invention allows the creation of a turnkey system that hides the complexity of the mobile network from the warehouse users. The users can move in and out of range of access points, suspend and resume their Mobile End Systems 104, and change locations without concern for host sessions, network addresses, or transport connections. In addition, the management software on the Mobility Management Server 102 provides management personnel with metrics such as number of transactions, which may be used to gauge worker productivity. Management can also use the network sub-net and access points to determine worker's last known physical location.

Mobile Medical Application

Imagine a large hospital using radio LAN technology for network communications between several buildings. Each building is on a unique sub-net. The present invention enables nurses and doctors to move from room to room with handheld personal computers or terminals—reading and writing patient information in hospital databases. Access to the most recent articles on medication and medical procedures is readily available through the local database and the World Wide Web. While in the hospital, pagers (one and two way) are no longer required since the present invention allows continuous connection to the Mobile End System 104. Messages can be sent directly to medical personnel via the Mobile End System 104. As in the case with warehouse workers, medical personnel are not required to understand the mobile network they are using. In addition, the Mobile End System 104 allows medical personnel to disable radio transmission in area where radio emissions are deemed undesirable (e.g., where they might interfere with other medical equipment)—and easily resume and reconnect where they left off.

Trucking and Freight

Freight companies can use the present invention to track inventory. While docked at a warehouse, the Mobile End System 104 may use LAN technology to update warehouse inventories. While away from local services, the Mobile End System 104 can use Wide Area WAN services such as CDPD and ARDIS to maintain real time status and location of inventory. The Mobile End System 104 automatically switches between network infrastructures—hiding the complexity of network topology from vehicle personnel.

Mobile Enterprise

Corporate employees may use the system in accordance with the present invention for access to E-mail, web content and messaging services while within an enterprise campus that has invested in an infrastructure such as 802.11. The cost of ownership is reduced since pager service and other mobile device services are no longer required. The purchase of mobile infrastructure is a one time capital expense as opposed to the costly "pay-per-use" model offered by many existing mobile device services.

IP Multiplication

If an organization has a LAN that needs to be connected to the Internet, the administrator of the LAN has two choices: get enough globally assigned addresses for all computers on the LAN, or get just a few globally assigned addresses and use the Mobility Management Server 102 in accordance with the present invention as an address multiplier. Getting a large number of IP addresses tends to be either expensive or impossible. A small company using an Internet Service Provider (ISP) for access to the Internet can only use the IP addresses the ISP assigns—and the number of IP addresses limits the number of computers that can be on the Internet at the same time. An ISP also charges per connection, so the more computers that need to be on the Internet, the more expensive this solution becomes.

Using the Mobility Management Server 102 in accordance with the present invention as an address multiplier could solve many of these problems. The enterprise could put the Mobility Management Server 102 on hardware that is connected to the Internet via an ISP. Mobile End Systems 104 could then easily connect. Because all connection to the Internet would go through the Mobility Management Server 102, only one address from the ISP is required. Thus, using the present invention as an address multiplier allows the enterprise to get just a few (in many cases one) addresses and accounts from the ISP, and allows the entire LAN to have simultaneous connections to the Internet (assuming enough bandwidth is provided).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

What is claimed is:

1. In a mobile computing network including at least one mobile computing device coupled to the network via a network point of attachment, an improvement comprising an interface-assisted listener disposed on the mobile computing device that detects, based at least in part on identification of the network point of attachment, whether said mobile computing device has moved to a different network segment while managing application and transport layer communications endpoints used for data communications, said mobile computing device including a data-store that the mobile computing device dynamically populates with network topology information comprising a plurality of network points of attachment said mobile computing device visits, said mobile computing device dynamically building said network topology information as said mobile computing device visits said network points of attachment, said mobile computing device interface-assisted listener employing said dynamically constructed network topology information to detect mobile computing device location, the interface-assisted listener maintaining the network topology information to assist it in deciding correct roam signaling, the listener, upon detecting that the mobile computing device has moved to a different network point of attachment, signaling a roam condition and if necessary prompting the mobile computing device to acquire or register an address usable on the current network segment.

2. A network as in claim 1 wherein said mobile computing device includes at least one network interface adapter, and said listener obtains said network point of attachment identification from said network interface adapter.

3. A network as in claim 1 wherein said listener maintains a network topology map storing information that correlates said network point of attachment identification with further information concerning a network connection.

4. A network as in claim 1 wherein said listener detects when communications with said network is interrupted or reestablished.

5. A network as in claim 4 wherein said listener generates a roam signal in response to detection of (a) network communications interruption and re-establishment, and/or (b) change of said network point of attachment identification.

6. An interface-based listener for use in a mobile computing device, said interface-based listener integrating information from at least one network interface adapter with information available from at least one network stack to determine whether said mobile computing device has moved to a new network point of attachment while managing application and transport layer communications endpoints used for data communications between the mobile computing device and a peer computing system, said mobile computing device including a data-store that said mobile computing device dynamically populates with a network topology map comprising a plurality of network points of attachment visited by said mobile computing device and associated network addresses, said mobile computing device dynamically building said network topology map as said mobile computing device visits said network points of attachment, said mobile computing device interface-assisted listener employing said dynamically constructed network topology map to detect where said mobile computing device has moved, the interface-assisted listener maintaining the network topology map to assist in deciding correct roam signaling, the listener, upon detecting that the mobile computing device has moved to a different network point of attachment, signaling a roam condition and if necessary prompting the mobile computing device to acquire or register an address usable on the current network segment.

7. The interface-based listener of claim 6 wherein the network topology map provides network connection information including network points of attachment information.

8. The listener of claim 7 wherein said listener dynamically constructs said network topology map based on learned information.

9. The interface-based listener of claim 6 including a status checker that checks status based on occurrence of an event.

10. The interface-based listener of claim 9 wherein said event comprises any of a timer timeout, a low level roaming driver callback, and a network level activity hint.

11. The interface-based listener of claim 6 including a connection information searcher that queries the interface adapter as to whether the mobile computing device has already visited a current network point of attachment.

12. The interface-based listener of claim 6 including a connection arrangement that registers or reacquires a current address to be valid on a new network segment.

13. The interface-based listener of claim 6 including a roam signal generator that generates a roam signal in response to detection, based at least in part on information provided by the interface adapter, that the mobile computing device has roamed to a different network segment.

14. The interface-based listener of claim 13 further including a heuristic analyzer that determines whether a previously assigned network address is still valid.

15. A method of determining whether a mobile computing device node has moved to a new network point of attachment, comprising the following steps performed by the mobile computing device node:
  (a) said mobile computing device node receiving network point of attachment identification information from a network interface;
  (b) the mobile computing device node using said network point of attachment identification information to determine at said mobile computing device node whether said mobile computing device node has moved to a new network point of attachment; and
  (c) said mobile computing device node generating signaling in response to said step (b) while managing application and transport layer communications endpoints used for data communications,
  said using step (b) including the mobile computing device node dynamically populating, at the mobile computing device node, stored network topology comprising a plurality of network points of attachment visited by said mobile computing device node, and dynamically building said stored network topology as said mobile computing device node visits said network points of attachment, wherein said using step (b) further includes employing said dynamically constructed network topology to detect where said mobile computing device node has moved to and to assist in deciding correct roam signaling, and
  upon detecting that the mobile computing device node has moved to a different network point of attachment, signaling a roam condition and if necessary prompting to acquire or register an address usable on the current network segment.

16. A method as in claim 15 further including the mobile computing device node maintaining a network topology map, and using said map to perform step (c).

17. A method as in claim 15 wherein said step (c) includes the mobile computing device node generating a roam signal.

18. A method as in claim 15 wherein said step (b) includes the mobile computing device node obtaining said network point of attachment information from at least one network adapter.

19. A method as in claim 15 further including the mobile computing device node falling back to an alternative location detection mechanism if a network interface is not available that supports generic signaling.

20. A method as in claim 15 further including the mobile computing device node selecting, at least in part in response to said network point of attachment information, between alternate network connection paths.

21. A process for providing least cost routing in a network having plural disjoint segments, comprising:

(a) establishing communications between the network and a temporarily-attached mobile computing device;
(b) using a mechanism on the mobile computing device to allow the mobile computing device to move between said plural disjoint segments; and
(c) enforcing at least one policy parameter to enable the mobile computing device to efficiently automatically select alternate valid network paths for re-establishing communication with the network in response to mobile computing device movement, including the mobile computing device dynamically constructing a network topology at the mobile computing device as said mobile computing device visits network points of attachment, and using said dynamically constructed network topology to determine where said mobile computing device has moved,
(d) maintaining the network topology to assist in deciding correct signaling to send, and
(e) upon the mechanism detecting that the mobile computing device has moved to a different network segment, signaling a roam condition and if necessary prompting the mobile computing device to acquire or register an address usable on the current network segment.

22. The process of claim 21 wherein the policy parameter comprises an element selected from the following group: bandwidth, cost per data unit and quality of service.

* * * * *